United States Patent [19]
Edwards et al.

[11] Patent Number: 5,881,518
[45] Date of Patent: Mar. 16, 1999

[54] MODULAR PARTITION SYSTEM

[75] Inventors: John R. Edwards, Nobleton; Richard J. Palmer, St. John's, both of Canada

[73] Assignee: Hollanding Inc., Newmarkert, Canada

[21] Appl. No.: 655,099

[22] Filed: Jun. 5, 1996

Related U.S. Application Data

[63] Continuation-in-part of Ser. No. 423,650, Apr. 17, 1995, which is a continuation-in-part of Ser. No. 136,809, Oct. 15, 1993, Pat. No. 5,406,760.

[30]  Foreign Application Priority Data

Apr. 16, 1996 [CA] Canada ............... PCT/CA96/00246

[51] Int. Cl.$^6$ ........................................................ E04B 2/82
[52] U.S. Cl. .............................. 52/239; 52/241; 52/242; 52/243; 160/135; 160/351
[58] Field of Search ................... 160/135, 351; 52/239, 241, 242, 243

[56]  References Cited

U.S. PATENT DOCUMENTS

| | | | |
|---|---|---|---|
| 756,749 | 4/1904 | Watts, Jr. ............................... | 52/220.7 |
| 1,500,377 | 7/1924 | Dodson .................................. | 52/223.7 |
| 1,926,925 | 9/1933 | Wescott ................................. | 403/296 |
| 2,525,217 | 10/1950 | Glitsen ............................... | 292/256.73 |
| 3,363,383 | 1/1968 | La Barge ................................ | 52/471 |
| 3,513,606 | 5/1970 | Jones ..................................... | 52/27 |
| 3,592,289 | 7/1971 | Aysta .................................. | 160/351 X |
| 3,696,855 | 10/1972 | Kira ..................................... | 160/135 |
| 3,745,732 | 7/1973 | Pritchard et al. ....................... | 52/238 |
| 3,778,956 | 12/1973 | Martin ................................... | 52/584.1 |
| 3,813,038 | 5/1974 | Pryor et al. ............................. | 238/37 |
| 3,817,396 | 6/1974 | Markson ................................ | 160/135 X |
| 3,884,002 | 5/1975 | Logie ................................... | 52/239 X |
| 3,943,818 | 3/1976 | Pryor et al. ............................. | 403/296 |
| 4,002,261 | 1/1977 | Litchfield ............................... | 52/285 X |
| 4,100,709 | 7/1978 | Good ..................................... | 52/239 |
| 4,121,645 | 10/1978 | Behr ...................................... | 160/135 |
| 4,158,938 | 6/1979 | Meechan et al. ...................... | 52/309.11 |
| 4,197,688 | 4/1980 | Mauer ................................... | 52/718 |
| 4,269,005 | 5/1981 | Timmons ............................... | 52/241 X |
| 4,334,571 | 6/1982 | Heller et al. ........................... | 160/135 |
| 4,344,475 | 8/1982 | Frey ..................................... | 160/351 X |
| 4,373,309 | 2/1983 | Lutz ..................................... | 52/182 |
| 4,416,093 | 11/1983 | Salkeld et al. ......................... | 160/135 |
| 4,515,496 | 5/1985 | McKay ................................... | 403/388 |
| 4,535,577 | 8/1985 | Tenser et al. . | |
| 4,561,229 | 12/1985 | Gartung ................................ | 52/239 |
| 4,615,655 | 10/1986 | Dixon ................................... | 411/339 |
| 4,625,483 | 12/1986 | Zacky et al. ........................... | 52/282.3 X |
| 4,631,881 | 12/1986 | Charman . | |
| 4,685,255 | 8/1987 | Kelley . | |
| 4,744,184 | 5/1988 | Kramer ................................ | 52/227 |
| 4,794,744 | 1/1989 | Young et al. .......................... | 52/282 |

(List continued on next page.)

FOREIGN PATENT DOCUMENTS

| | | |
|---|---|---|
| 0200514 | 11/1986 | European Pat. Off. . |
| 0458264 | 11/1991 | European Pat. Off. . |
| 9212300 | 7/1992 | WIPO . |

*Primary Examiner*—Wynn E. Wood
*Attorney, Agent, or Firm*—Riches, McKenzie & Herbert

[57]  ABSTRACT

This invention relates to an upright partition for use in a modular office furniture system, the partition comprising: a frame comprising: two vertical posts each having outward opposing faces defining spaced apart parallel forward and rearward planes; a plurality of horizontal beams, at least one beam in each said plane, each beam having an inward face and an outward face, the inward face of each beam being connected to one said outward face of an associated post in an overlapping moment resisting connection; and a plurality of cladding panels each connected to one said beam; whereby an internal cavity is defined inward of the outward faces of said beams, and a raceway is defined outward of said outward post faces and inward of the outward faces of said beams. The invention also relates to systems for joining two or more partitions, a system for providing decorative end coverings over the end of a partition and over the converging ends of a plurality of converging partitions, and a system for hanging cladding panels on a partition.

50 Claims, 43 Drawing Sheets

U.S. PATENT DOCUMENTS

| | | | |
|---|---|---|---|
| 4,808,451 | 2/1989 | McCue et al. | 428/31 |
| 4,821,477 | 4/1989 | Rydqvist . | |
| 4,840,342 | 6/1989 | Sweeny, Jr. | 248/475.1 |
| 4,874,027 | 10/1989 | Boundy et al. | 160/230 |
| 4,881,349 | 11/1989 | Brown et al. . | |
| 4,932,177 | 6/1990 | Hinden . | |
| 4,944,122 | 7/1990 | Wendt . | |
| 5,020,290 | 6/1991 | Hajjar | 52/242 |
| 5,038,539 | 8/1991 | Kelley et al. . | |
| 5,054,255 | 10/1991 | Maninfior | 52/239 |
| 5,065,556 | 11/1991 | DeLong et al. | 52/220.7 |
| 5,065,559 | 11/1991 | Zegel et al. | 52/239 |
| 5,067,294 | 11/1991 | McGowan | 52/242 X |
| 5,086,597 | 2/1992 | Kelley et al. . | |
| 5,155,960 | 10/1992 | Shaanan | 52/238.1 X |
| 5,175,969 | 1/1993 | Knauf et al. . | |
| 5,184,441 | 2/1993 | Balfang, Jr. | 52/241 |
| 5,214,889 | 6/1993 | Nienhuis et al. | 52/220.7 |
| 5,214,890 | 6/1993 | Levitan et al. . | |
| 5,219,406 | 6/1993 | Raz | 160/135 |
| 5,241,796 | 9/1993 | Hellwig et al. | 52/36.4 |
| 5,274,970 | 1/1994 | Roberts | 160/135 X |
| 5,277,006 | 1/1994 | Ruster | 52/220.7 |
| 5,287,666 | 2/1994 | Frascaroli et al. | 52/239 |
| 5,341,615 | 8/1994 | Hodges et al. | 52/239 X |
| 5,347,778 | 9/1994 | Bray | 52/239 |
| 5,474,402 | 12/1995 | Wu | 52/239 X |
| 5,479,747 | 1/1996 | Wu | 52/239 X |
| 5,586,593 | 12/1996 | Schwartz | 52/239 |

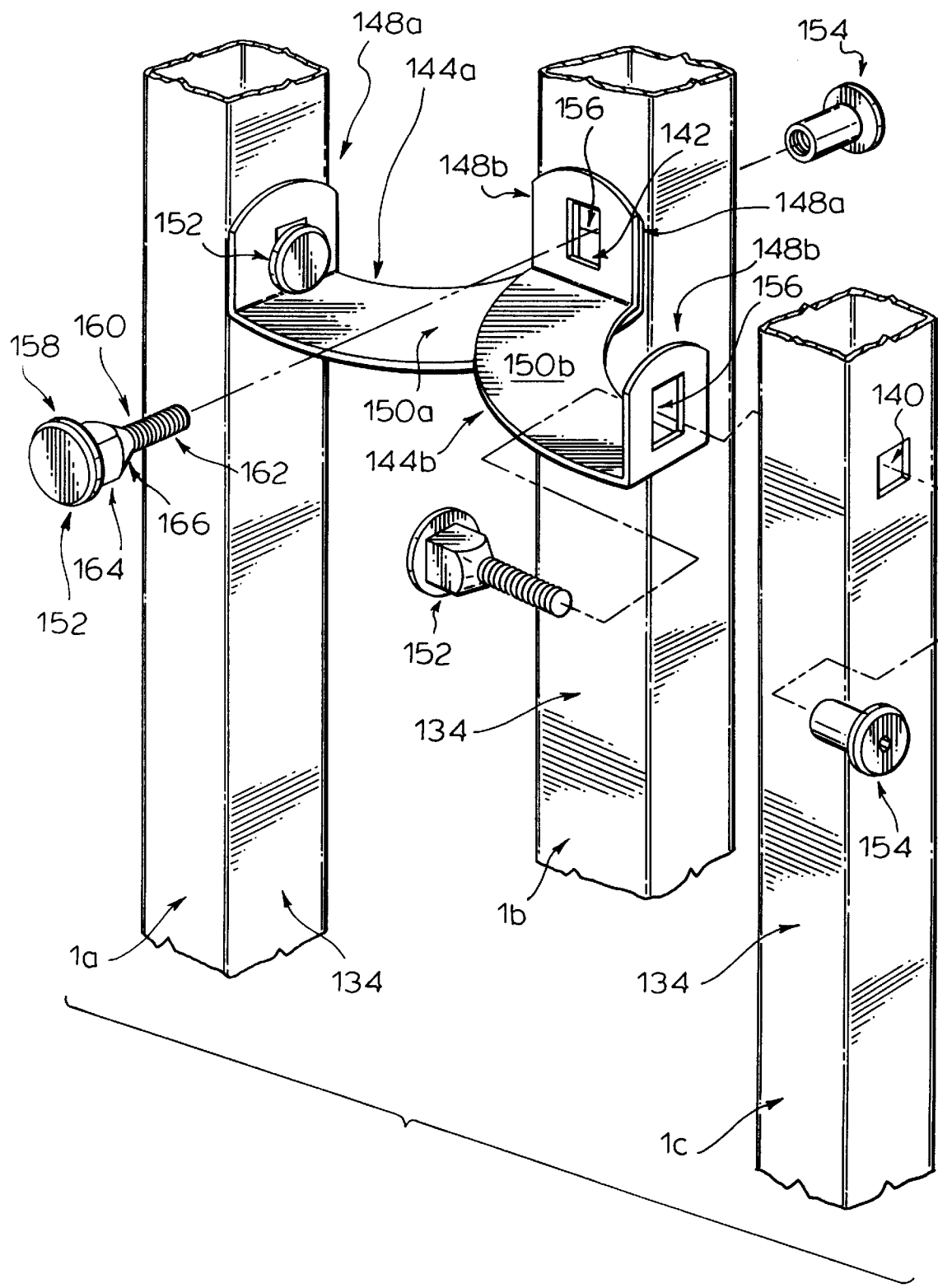

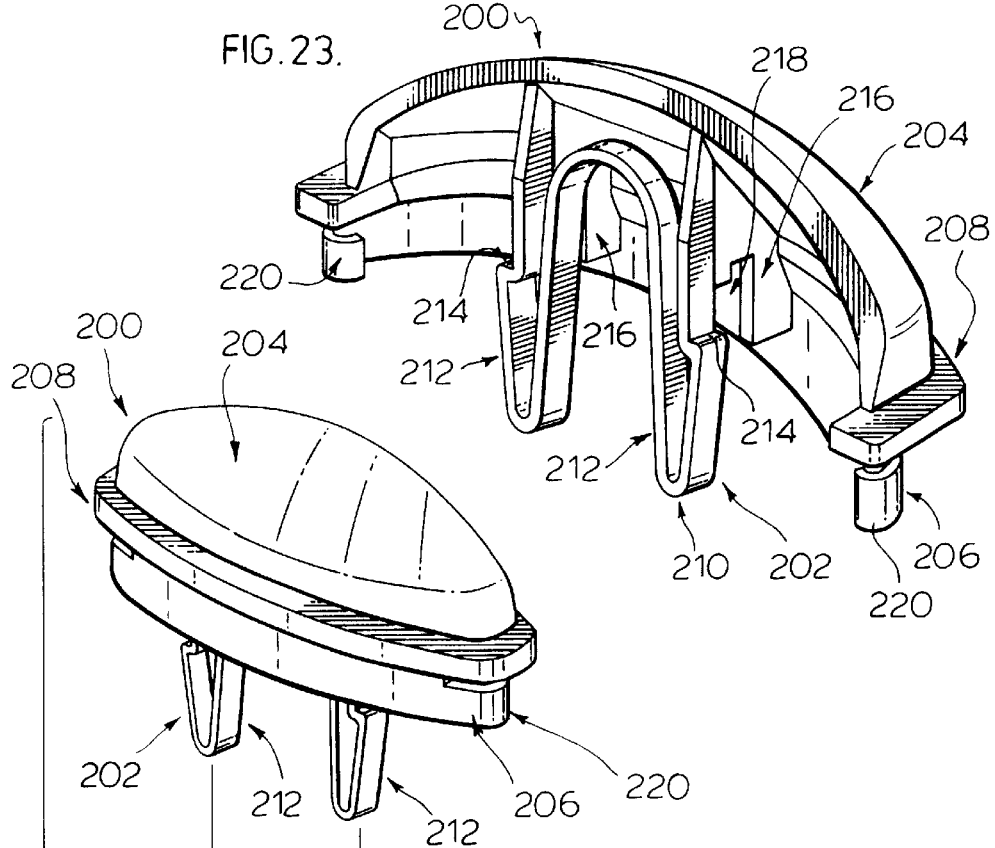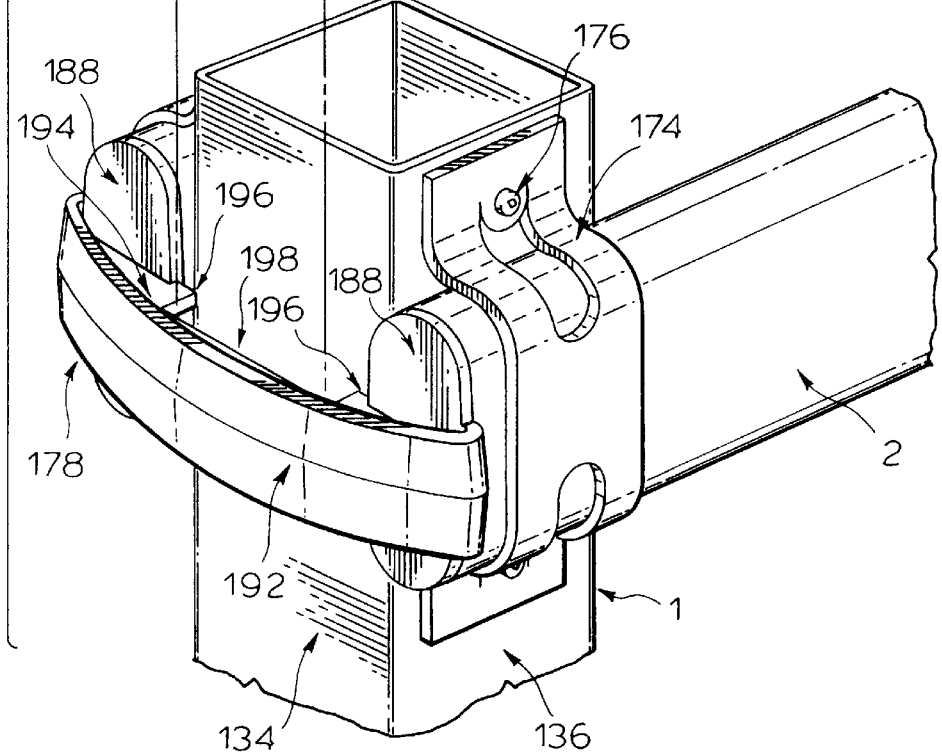

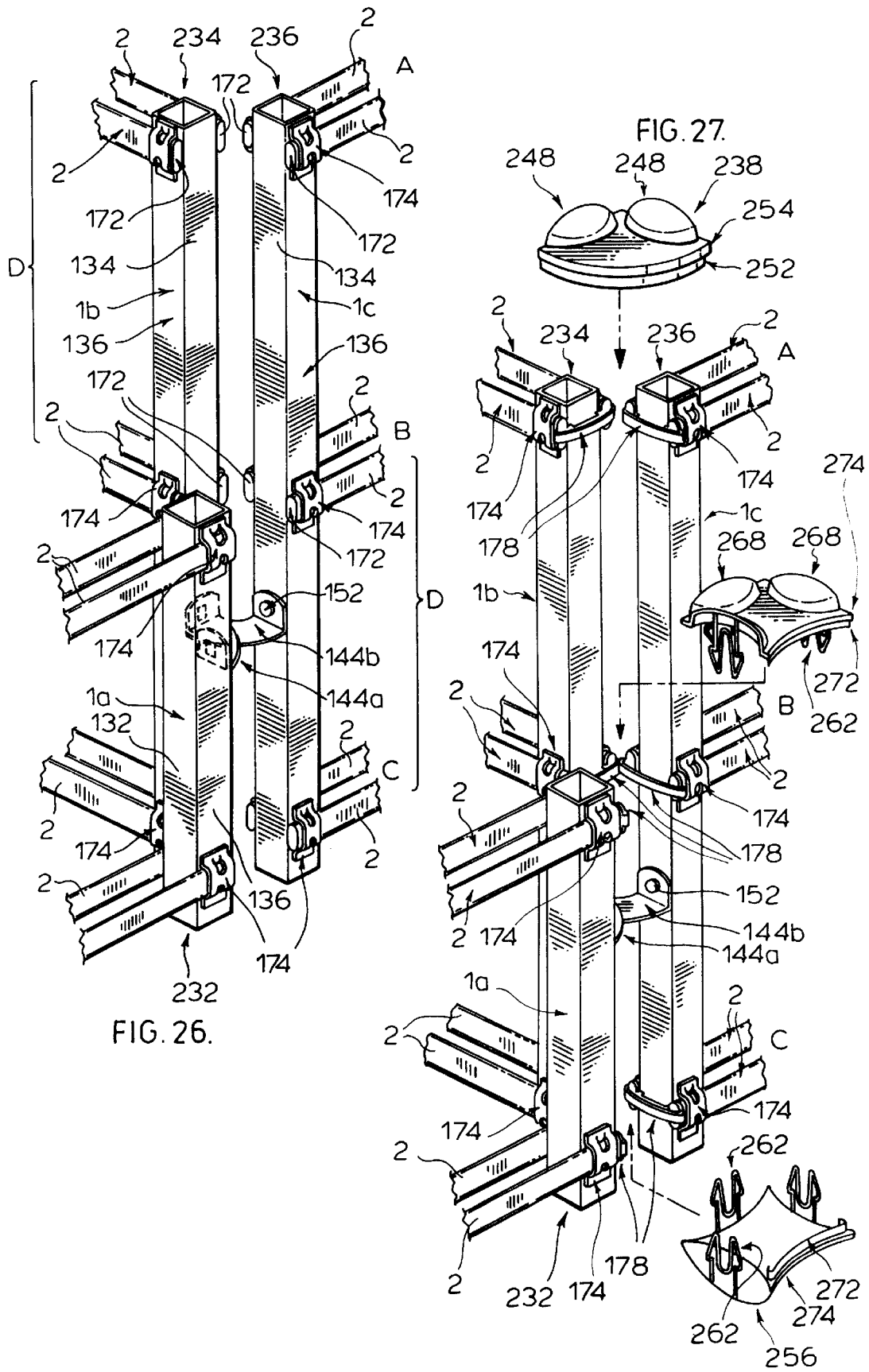

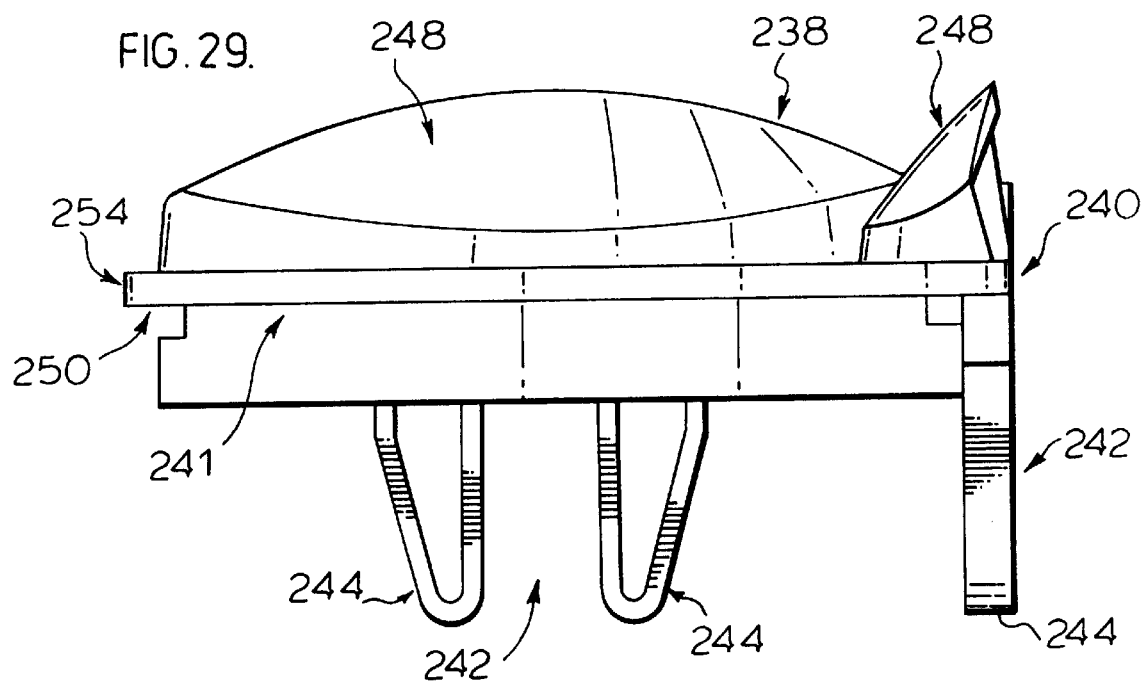
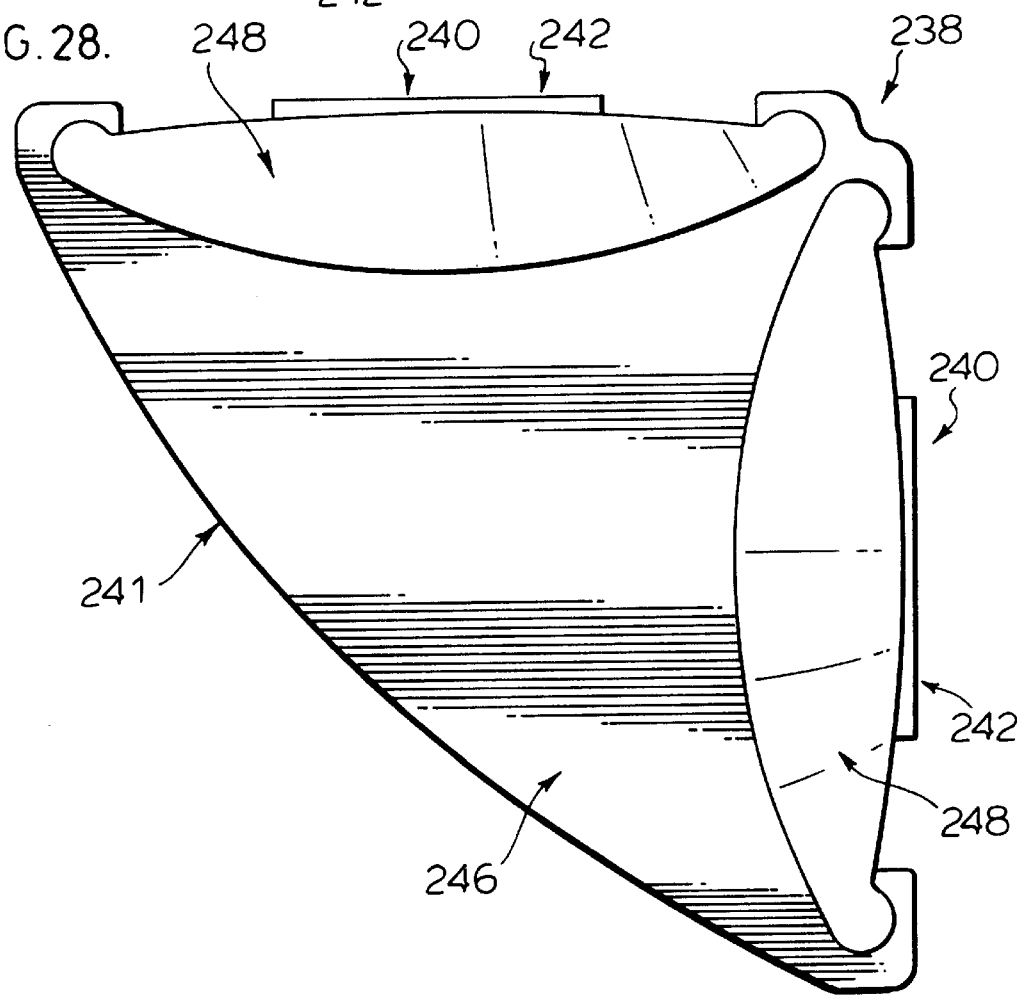

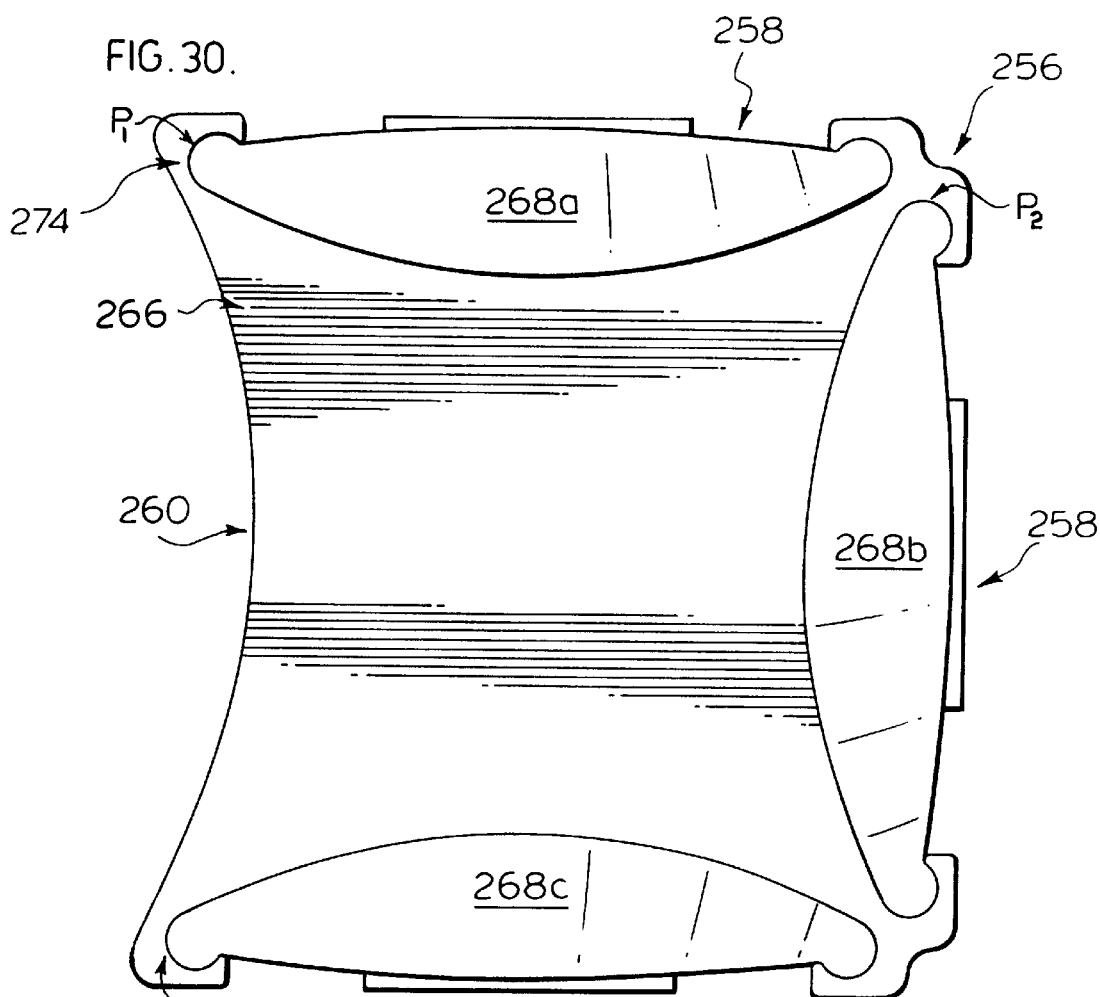
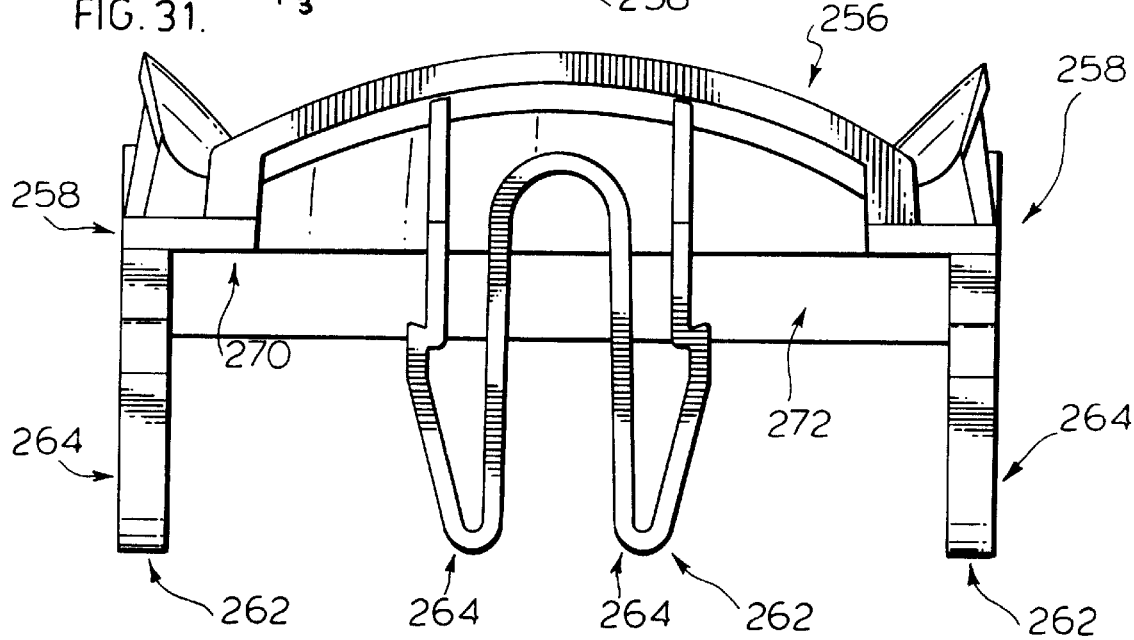

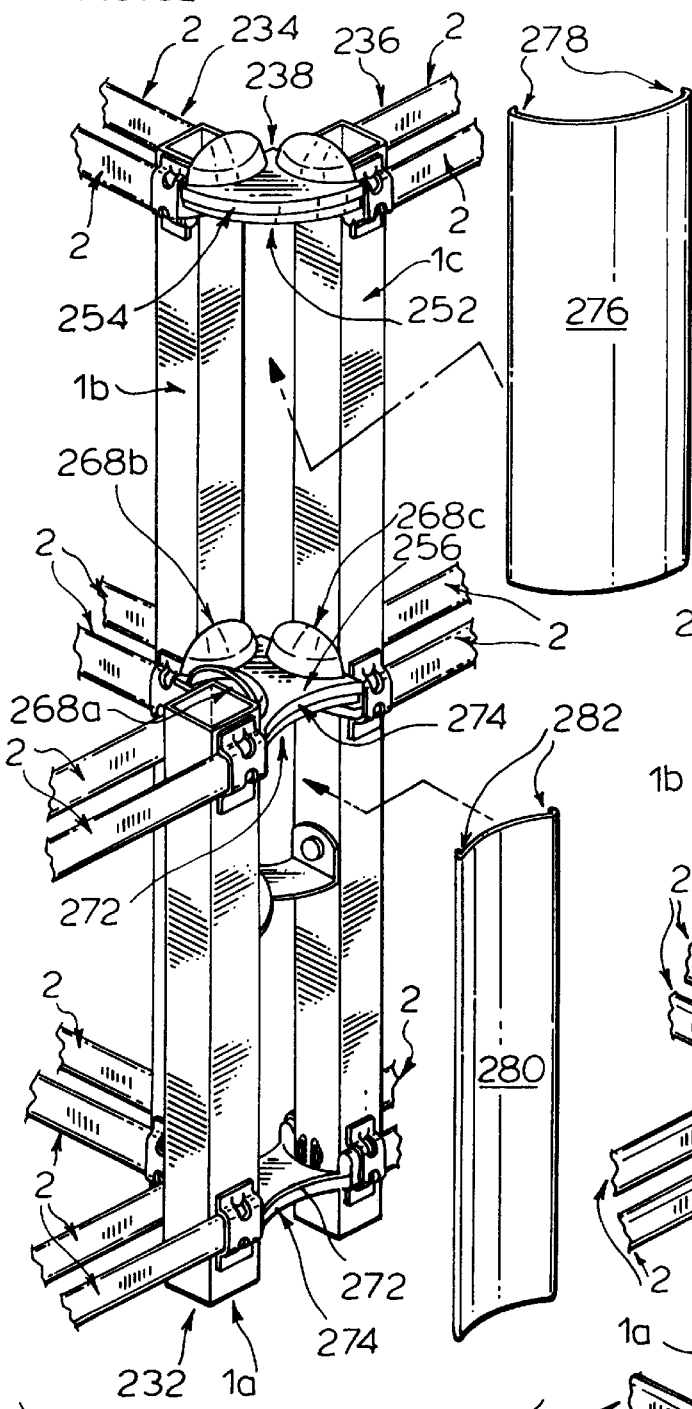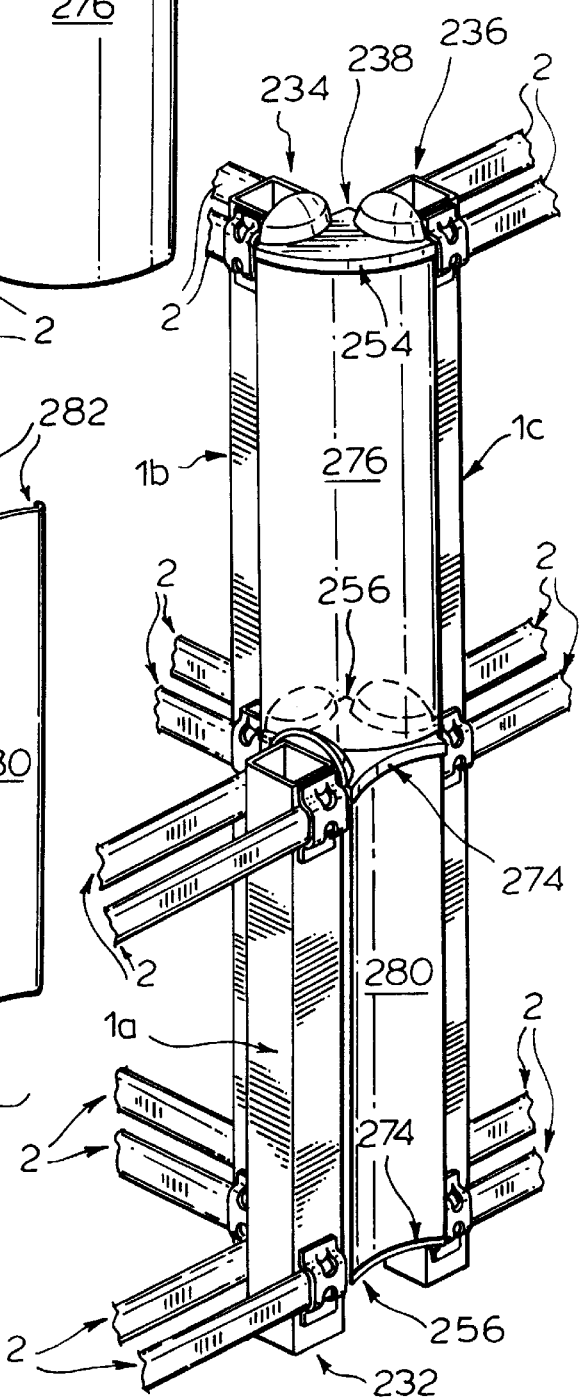

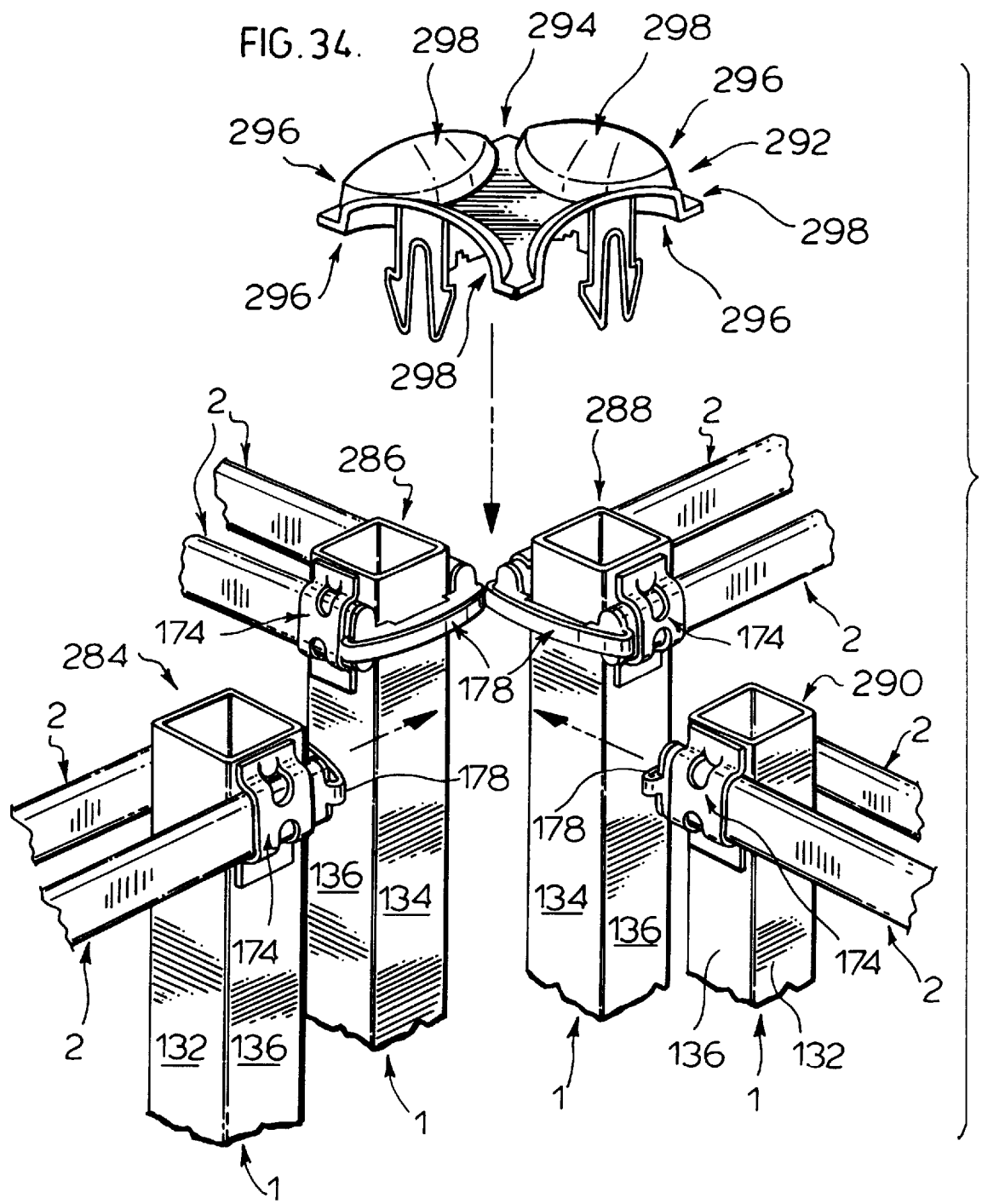

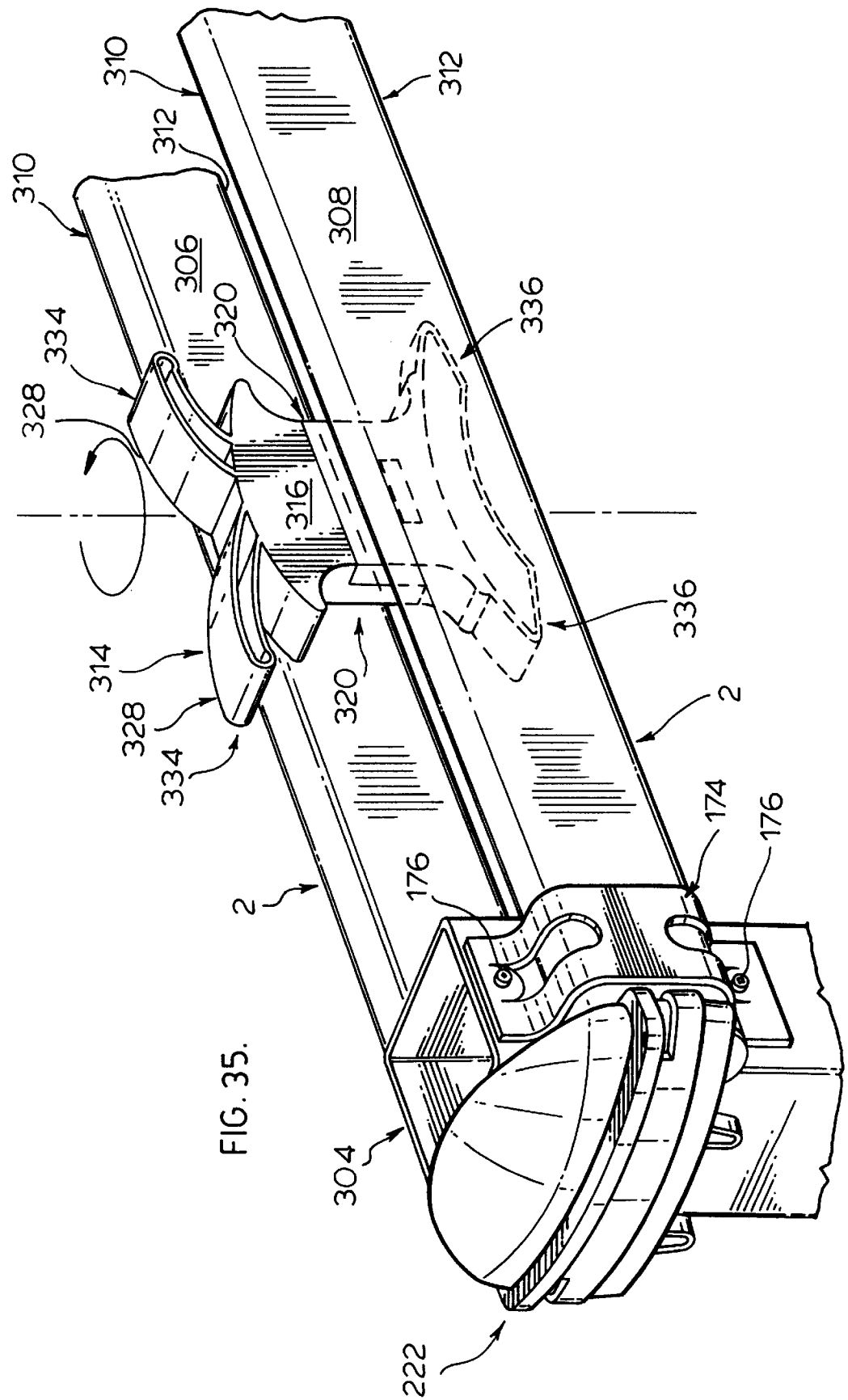

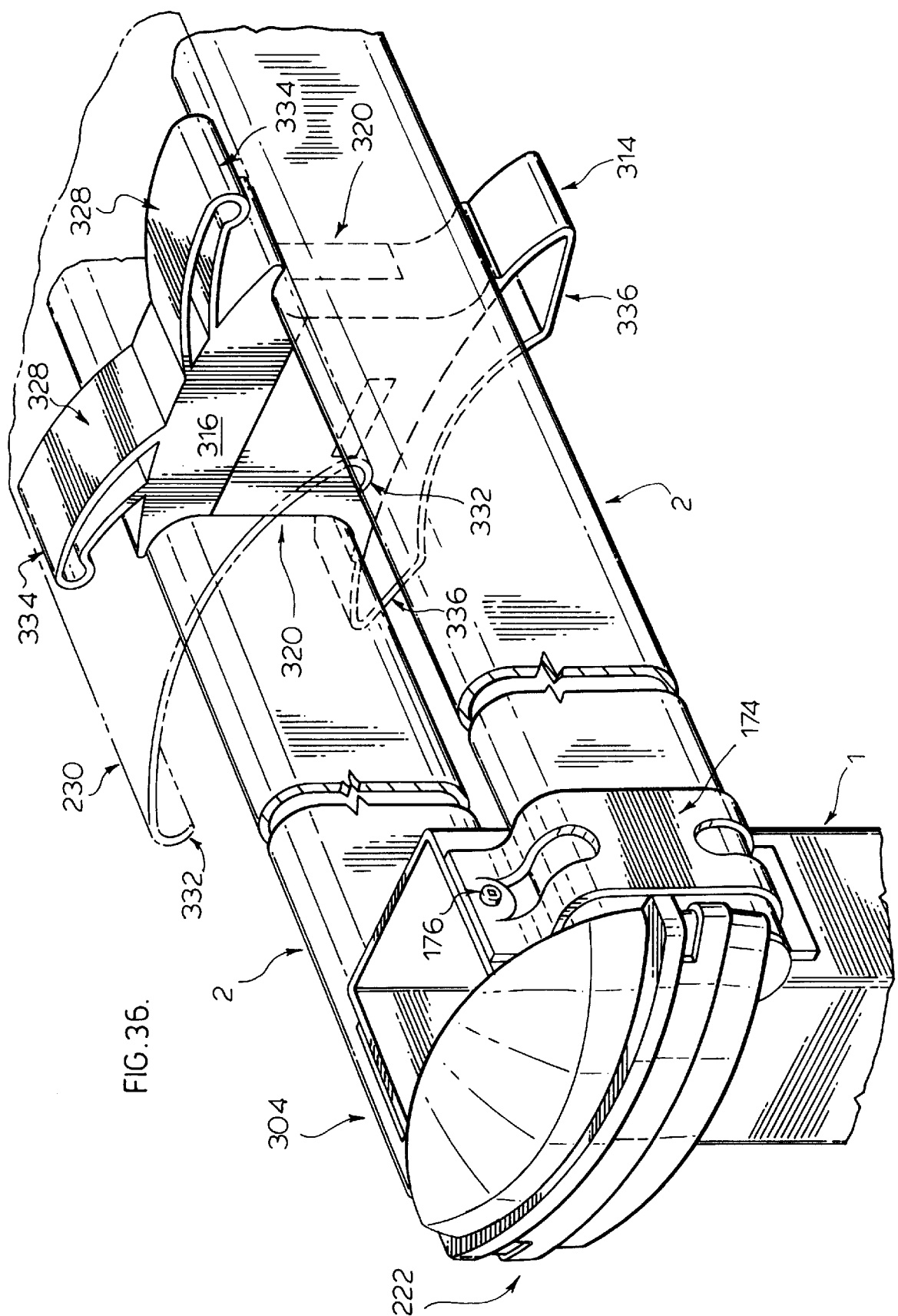

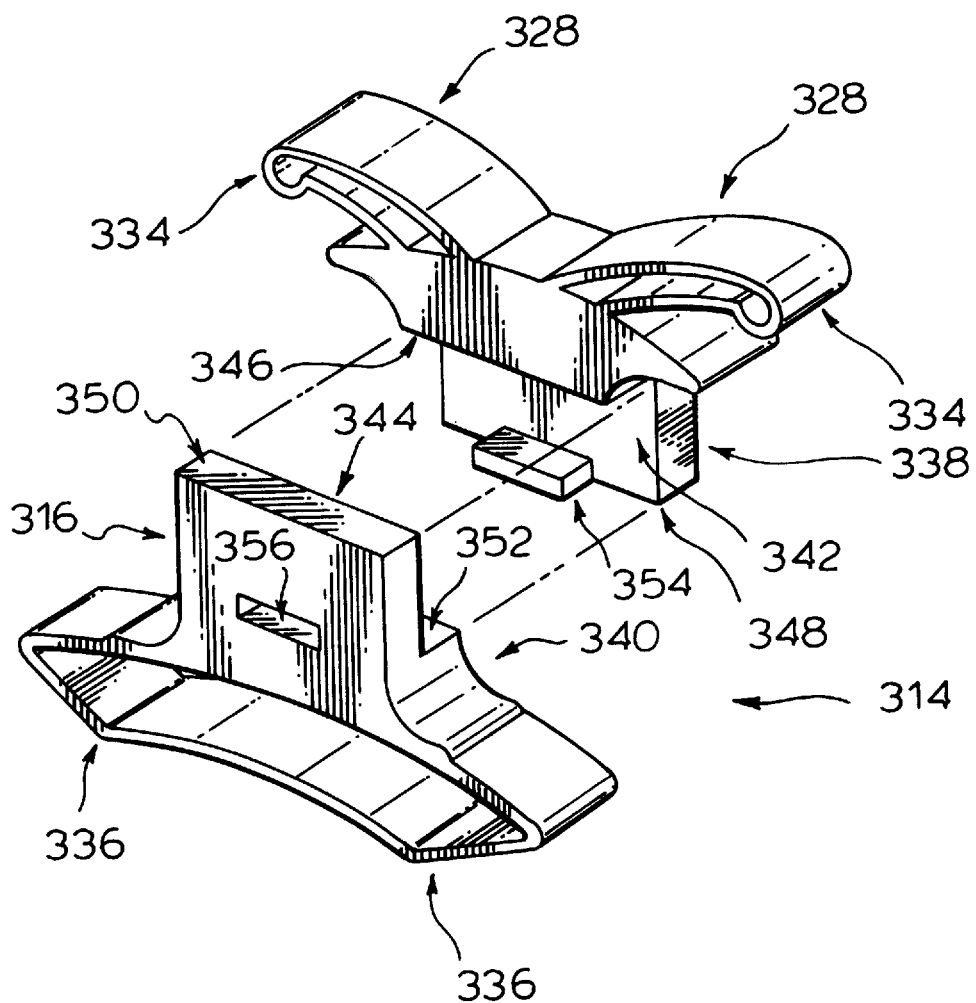

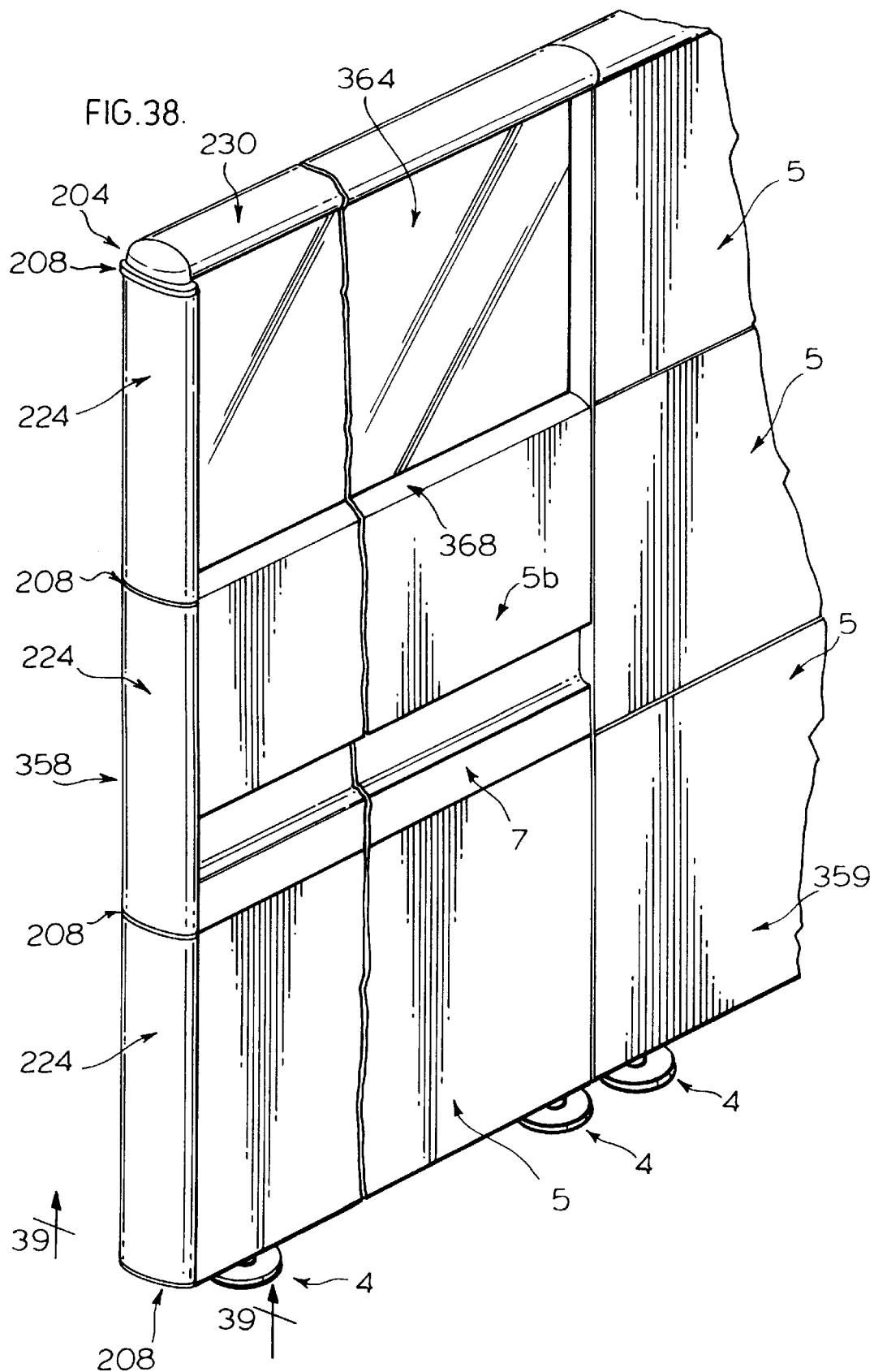

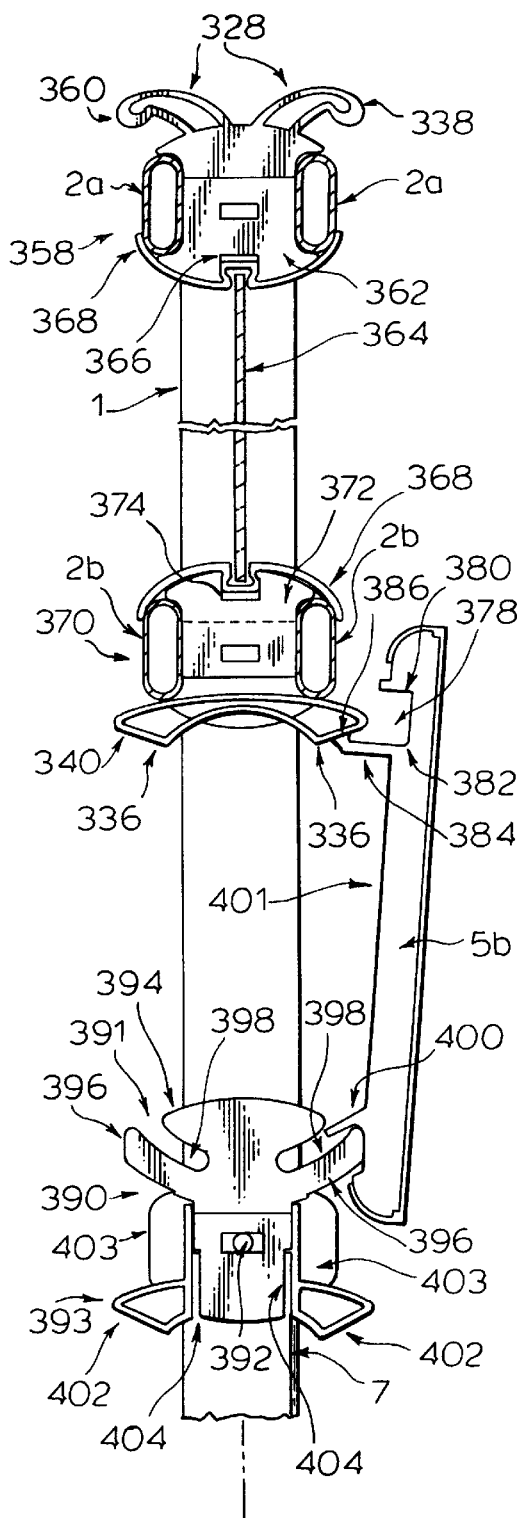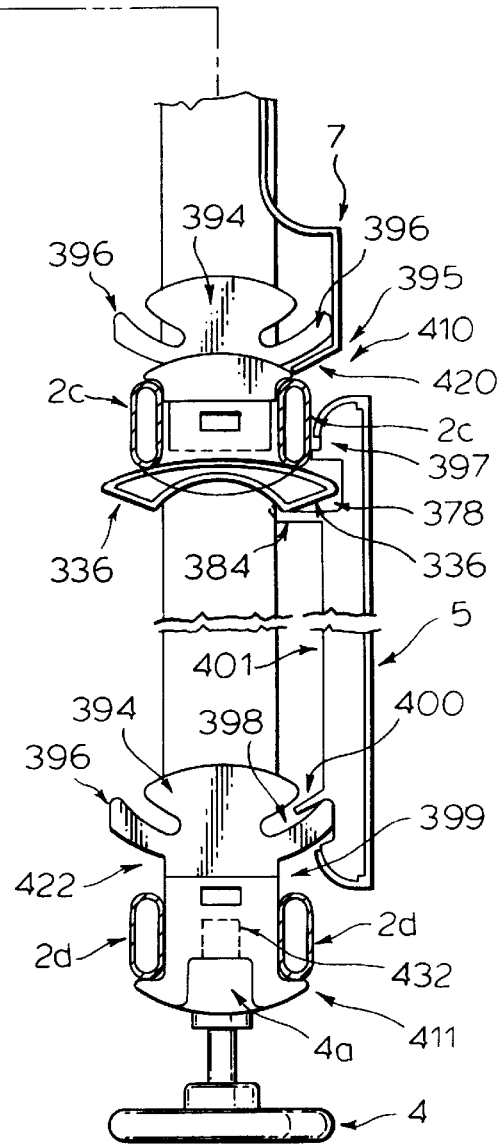
FIG. 39.

MODULAR PARTITION SYSTEM

This application is a continuation-in-part application of U.S. patent application Ser. No. 08/423,650, filed on Apr. 17, 1995, which is a continuation-in-part of U.S. patent application Ser. No. 08/136,809 filed on Oct. 15, 1993, U.S. Pat. No. 5,406,760.

FIELD OF THE INVENTION

The invention relates to an upright partition, for use in a modular office furniture system, having an open internal frame inward of removable cladding panels within which cables, wires and electrical power conduits may be enclosed.

BACKGROUND OF THE INVENTION

The use of modular office furniture systems is currently very wide spread in modern office interior design. The advantages of using partitions in a modular office system include increased efficiency in the use of space and individual offices with permanent walls may be largely eliminated in open office designs. As a result, a tenant of leased commercial space may minimize the cost of leasehold improvements, and may occupy and vacate premises rapidly through assembly and disassembly of modular components.

Conventionally a partition comprises an interior hollow rectangular frame constructed of roll formed sheet metal channel sections welded together in a rigid assembly. Electrical wiring and communication cables are accommodated in the hollow interior of the partitions, and are passed between partitions through holes punched in the webs of frame members. Partitions are connected together at their vertical end frame members into various geometric office maze patterns and cladding panels are hung on the frames to enclose and conceal the supporting frames and wiring.

Commonly the vertical frame members have a series of longitudinally spaced slots within which dogs extending from the cladding panels are engaged. In a like manner shelves, desktop brackets, filing cabinets and other components of the modular office furniture system are hung on the partitions to complete the modular furniture assembly.

The fabrication of conventional partition frames often involves several operations which require special tooling and machine setups. For example, where frame members are constructed of formed sheet metal channels, openings for wiring, notches for connections to other frame members and slots for hanging accessories are punched in a flat sheet metal blank. The blank is then bent into a channel shape in a roll forming operation, or on a brake press. The formed channels are then fitted together in a jig and welded at rigid connections.

It will be apparent that where different sized frame members are used and where the configuration of members vary, numerous machine setup modifications must be made. Production may involve the preparation of a number of different frame member configurations each of which may require separate inventory, machine setups, production scheduling and drawings. Therefore it is desirable to simplify the design of frame members as much as possible to minimize production costs, inventory requirements and provide maximum flexibility in manufacturing scheduling.

It is also desirable to minimize the use of welding as a means for connecting frame components. The heat from welding can distort metal frames, and a further manufacturing step may be required to straighten metal frames which have become twisted, or cambered through the welding process. In addition, welding thin sheet metal frames may require relatively highly skilled workers, and quality control supervision.

A welded metal frame is for all practical purposes, impossible to modify after fabrication. An improperly fabricated welded metal frame must be scrapped and very little of the material can be salvaged for reuse. If a purchaser of a partition system wishes to modify the furniture layout, whole partitions cannot be modified easily. Therefore, modification plans are restricted to the rearrangement of existing partitions, or purchasing new partitions of different dimensions.

Despite the above disadvantages however, welded metal partition frames remain the most commonly used type since the strength is high and manufacturing cost is low compared to conventional alternatives.

A significant recent development in partition design relates to the increasing demands being put on office furniture to accommodate various communication devices such as computers, telephones, facsimile machines, printers and the like.

In order to accommodate the increasing number of electrical and communication wires required in most modern office environments, wire or cable raceways through the hollow interior of partitions have been provided. The common conventional location for such a raceway is at the base or cap of a partition.

The individual conventional partitions each have a raceway or several raceways which communicate with each other when assembled in a modular partition wall. The raceway also commonly communicates with the electrical system of the occupied building through vertical power poles which extend up through the drop ceiling of the building office space or through monuments and access openings in the floor of the office space.

U.S. Pat. No. 4,133,153 to Hage describes a typical conventional partition raceway. The base portion of the Hage partition is essentially a hollow accessible beam within which electrical and communication wiring can be placed. The conventional partition frame is connected to the top of the hollow beam forming the cable raceway.

U.S. Pat. No. 5,038,539 to Kelly et al describes another example of a partition system which may accommodate cables at the base and at the cap of a conventional partition system. The vertical frame members are not modified in such a system but rather the cables are passed over the vertical frame members around their outward edges. This type of system may accommodate limited numbers of relatively thin cables retaining them within the space occupied by the cladding panels.

An alternative conventional method of passing wires between frames is described in U.S. Pat. No. 4,535,577 to Tenser et al. In this conventional system, openings are made in the web section of vertical frame members. The electrical and communication wiring are threaded through the web openings. Therefore, wires are not visible but are entirely concealed by the cladding panels. An advantage of this system is that the outward edges of vertical frame members remain completely clear. Accordingly the attachment of other components of modular office furniture systems is not impeded by cables overlapping the openings upon the shelves and other components are hung.

A distinct disadvantage of such a system is the need to thread cables through the openings. When installing, moving or maintaining computers or other office equipment, it may become frequently necessary to install and remove the cables. Increased labour costs and wear on the cables results from such a system. However, since the web portion of the frame member contributes minimally to the strength of the frame member, providing such openings does not reduce the strength of the frame significantly.

Since most office equipment is operated on the top of a desk or table, current partition designs often include what is known as a "waist-line" waist height cable raceway. Electrical receptacles and various wires are accommodated at waist height thereby eliminating wires which hang down from table top to "base-line" receptacles located at the bottom of a partition. Use of a waist-line raceways simplifies installation and maintenance of equipment by eliminating the need for the installer to crawl under furniture to access a base-line cable raceway and electrical receptacles. The use of a waist height raceway also generally reduces the length of cables required between devices all located at a table top elevation.

An open interior partition system is sold under the trade mark OPTIMA by Design Finish Studio of Israel. This conventional partition is constructed of vertical sheet metal channel posts with pairs of horizontal round tubes. The pairs of horizontal tubes at each of their ends are inserted into specially designed molded plastic end connectors. The plastic connectors are snap-locked into the interior throat of the vertical channel posts to complete a rigid connection. The partition accommodates wires and cables within its interior by threading wires etc. between the pairs of tubes and through openings punched in the webs of the vertical post channels.

This type of partition remains at a disadvantage since special molded connectors must be used, and the wires must be threaded between partitions through openings in the web of the posts.

Threading of wires through openings increases the time and effort required to install, remove and maintain office equipment, and increases wear on the outer insulated surfaces of the wiring, thereby reducing its service life.

However, in such a conventional partition, since the entire internal space is open, between pairs of horizontal tubes, wires and cables may be accommodated at any level within an individual partition in the interior behind removable panels. Additionally, the panels are coupled to the horizontal beams with resilient tabs, rendering the entire internal cavity easily accessible through removable panels.

Therefore it is desirable to provide a partition which may easily accommodate electrical and communication cables preferably at any height in a manner which simplifies the installation, removal and maintenance of such equipment.

Also it is desirable to protect and conceal wiring and receptacles as much as possible behind cladding panels while maintaining the structural integrity of the partition frame.

The simplification of frame construction may result in significant cost savings in respect of the type of fabrication machinery used in manufacturing, savings in inventory costs, and enhancement of production scheduling.

SUMMARY OF THE INVENTION

The invention addresses the disadvantages of the prior art in a novel manner through the provision of an upright partition for use in a modular office furniture system.

The partition of the invention has a frame which is open within its interior providing clearance for wires and cables enclosed between cladding panels on the frame's exterior. The frame is simply constructed of vertical posts and horizontal beams connected together at rigid overlapping joints. Saddle brackets are used to secure rounded tubular beams to square tubular posts with screws or rivets. The overlapping of beams on the posts provides a rigid connection and also defines a wire accommodating raceway between adjacent partitions. The raceway is defined outward of the outward post faces inward of the cladding panels and preferably at least to the beam outer faces.

Therefore, it will be apparent that by simply cutting posts and beams to length, and connecting them with such brackets and screws, a partition frame may be quickly fabricated. Preferably the partitions are assembled in a factory environment and shipped to the customer. If desired however, the partitions may be shipped to the site in compact bundles reducing the bulk and cost of transportation. The partitions then may be assembled and erected at their final location. The ability to disassemble and reassemble the partition frames also aids the purchaser in moving the partitions to new premises and adds flexibility in redesigning their office layout.

Preferably, the beams are paired together at spaced apart elevations with the post located between beams of the pair. Therefore, the wires may pass between paired beams within the interior of the partition and may be passed over the outward surface of the posts between adjacent partitions. The cladding panels are coupled to the beams with resilient clips such that all panels are easily removable to provide access to the interior of the partition. Wires may pass between adjacent partitions over the outward face of the posts and enclosed inward of the panels. The overlapping of the beams spaces the panels away from the posts thereby providing an adequately sized cable raceway bounded by the beams outwardly and at top and bottom, and bounded inwardly by the adjacent post.

Accordingly the invention specifically provides: an upright partition for use in a modular office furniture system, the partition comprising: a frame comprising: two vertical posts each having outward opposing faces defining spaced apart parallel forward and rearward planes; a plurality of horizontal beams, at least one beam in each said plane, each beam having an inward face and an outward face, the inward face of each beam being connected to one said outward face of an associated post in an overlapping moment resisting connection; and a plurality of cladding panels each connected to one said beam; whereby an internal cavity is defined inward of the outward faces of said beams, and a raceway is defined outward of said outward post faces and inward of the outward faces of said beams.

In another aspect, the present invention provides, in a modular office furniture system comprising a plurality of rectangular, upright partitions, a securing assembly for securing together two partitions end-to-end in a straight line; the partitions each having a rectangular frame having two vertical, rectangular end posts, each end post having an end face and an opposing inner face, the end face defining an end surface of a partition; each end post having a first aperture in its end face and a second aperture in its inner face, the first and second apertures being in a vertical alignment with each other and being horizontally centred on each end post; the securing assembly securing together two end posts of adjacent partitions with the end faces of the two end posts abutting the apertures in the two end posts being in alignment to define a horizontal guideway through the two end posts; said securing assembly comprising: an elongated fastener element having two cylindrical threaded ends and an enlarged intermediate portion therebetween, the fastener element being inserted into the guideway with its enlarged intermediate portion received against rotation in the first apertures in the end faces of the two posts; and two sleeve nut means threaded onto the threaded ends of the fastener element, each sleeve nut means comprising a head and a circular sleeve, the sleeve of each sleeve nut means being rotatably received in the second aperture in the inner face of one of the two end posts, the head of each sleeve nut means abutting the inner face of one of the two end posts.

Preferably, the enlarged intermediate portion of the fastener element and the first apertures in the end faces of the two end posts having a regular, polygonal shape and the intermediate portion is closely received against rotation in the first apertures of the two end posts. More preferably the second apertures are of the same size and polygonal shape as the first apertures, the preferred shape being square.

Preferably, the securing assembly has an elongated fastener element which has conical portions between its enlarged intermediate portion and the two cylindrical ends for insertion of the fastener element into the apertures.

In yet another aspect, the present invention provides, in a modular office furniture system comprising a plurality of rectangular, upright partitions, a connecting system for securing together two partitions at a preselected angle to each other, the preferred angle being 90°; the partitions each having a rectangular frame having two vertical, rectangular end posts, each end post having an end face and an opposing inner face, the end face defining an end surface of a partition; each end post having a first aperture in its end face and a second aperture in its inner face, the first and second apertures being in vertical alignment with each other and being horizontally centred on each end post; the connecting system securing together two end posts of adjacent partitions, the end faces of the two end posts being at the preselected angle to each another; the connecting system comprising: a modular connecting bracket having two vertical end flanges and a horizontal bight therebetween, each end flange having a hole and being secured to the end face of one of the two end posts with its hole in substantial vertical and horizontal alignment with the first and second apertures of one of the two end posts to form a guideway through the flange and the apertures, the bight extending between the flanges and extending forwardly from the end faces of the two end posts; and a bolt inserted into each guideway and securing the flanges to the end faces of the end posts, the bolt being retained by a nut.

In a preferred embodiment, the bolt means comprises a head, a lower threaded portion and an enlarged intermediate portion therebetween, the head abutting one flange of the connecting bracket, the intermediate portion received against rotation in the flange hole and the first aperture in the end face; and the nut comprises a sleeve nut threaded onto the threaded end of each bolt, each sleeve nut comprising a head and a circular sleeve, the sleeve of each sleeve nut being rotatably received in the second aperture in the inner face of one of the two end posts, the head of each sleeve nut means abutting the inner face of one of the two end posts.

Preferably, the enlarged intermediate portion of each bolt and the first apertures in the end faces of the two end posts have a regular, polygonal shape, and more preferably the second apertures are of the same size and polygonal shape as the first apertures, the preferred shape being square. It is also preferred that the bolt additionally comprises a conical portion between the lower threaded portion and the enlarged intermediate portion to ease insertion of the bolt through the post apertures and the flange hole.

In yet another aspect, the present invention provides, in a modular office furniture system comprising a plurality of rectangular, upright partitions, a system for securing together three partitions at a preselected angle of 90°; the partitions each having a rectangular frame having two vertical rectangular end posts, each end post having an end face and an opposing inner face, the end face defining an end surface of a partition; the system comprising: a connecting system as described above securing together an end post of a first partition and an end post of a second partition with a first modular connecting bracket, the end faces of the end posts being at 90° to each other; and a connecting system as described above securing together an end post of the second partition and an end post of a third partition with a second modular connecting bracket, the end faces of the end posts being at 90° to each other; one vertical flange of the first connecting bracket and one vertical flange of the second connecting bracket being secured to the end face of one end post of the second partition by one bolt; the first and second modular connecting brackets being identical to each other.

In yet another aspect, the present invention provides, in a modular office furniture system comprising a plurality of rectangular, upright partitions, a system for providing a decorative end covering on a partition; the partition having a rectangular frame comprising two vertical end posts and a plurality of horizontal beams arranged in pairs, each beam extending between and connected to the two end posts and having hollow, open ends proximate the end posts, the beams of each pair being connected to opposite sides of the end posts, the partition having at least two pairs of beams, one pair proximate its bottom and one pair proximate its top; the system comprising: at least two cover plate supports provided on an end of the partition, each cover plate support having an end plug inserted into the open ends of one pair of beams and securing the cover plate support to the partition, each cover plate support extending outwardly from the ends of a pair of beams and having upper and lower surfaces provided with upper and lower cover plate connectors, respectively; and at least one cover plate providing a decorative appearance to an end of the partition, each cover plate extending vertically between two cover plate supports, the cover plate having an upper end secured to the lower cover plate connector of a first cover plate support and a lower end secured to the upper cover plate connector of a second cover plate support.

In yet another aspect, the present invention provides, in a modular office furniture system comprising a plurality of rectangular, upright partitions, a system for providing a decorative end covering on the converging ends of two partitions; the ends of the partitions converging at a preselected angle of 90°; the partitions each having a rectangular frame comprising two vertical end posts and a plurality of horizontal beams arranged in pairs, each beam extending between and connected to the two end posts and having hollow, open ends proximate the ends posts, the beams of each pair being connected to opposite sides of the end posts, each partition having at least two pairs of beams, one pair proximate its bottom and one pair proximate its top; a first partition of the two partitions having two pairs of beams in vertical alignment with respective pairs of beams of a second partition; the system comprising: at least two triangular cover plate supports, each extending horizontally between, and secured to, the converging ends of the partitions, each cover plate support having a first end plug inserted into the open ends of a pair of beams of the first partition and extending horizontally outwardly therefrom, and having a second end plug inserted into the open ends of a vertically aligned pair of beams of the second partition and extending horizontally outwardly therefrom, each cover plate support having upper and lower surfaces provided with upper and lower cover plate connectors, respectively; and at least one cover plate providing a decorative appearance to the converging ends of the two partitions, each cover plate extending vertically between two triangular cover plate supports, the cover plate means having an upper end secured to the lower cover plate connectors of a first triangular cover plate support and a lower end secured to the upper cover plate connector of a second triangular cover plate support.

In yet another aspect, the present invention provides in a modular office furniture system comprising a plurality of rectangular, upright partitions, a system for providing a decorative end covering on the converging ends of three partitions; the ends of adjacent partitions converging at a preselected angle of 90°; the partitions each having a rectangular frame comprising two vertical end posts and a plurality of horizontal beams arranged in pairs, each beam extending between and connected to the two end posts and having hollow, open ends proximate the end posts, the beams of each pair being connected to opposite sides of the end posts, each partition having at least two pairs of beams, one pair proximate its bottom and one pair proximate its top; each partition of the three partitions having two pairs of beams in vertical alignment with respective pairs of beams of each other partition of the three partitions; the system comprising: at least two rectangular cover plate supports, each extending horizontally between, and secured to, the converging ends of the partitions, each cover plate support having an end plug inserted into the open ends of a vertically aligned pair of beams of each of the three partitions, each cover plate support having upper and lower surfaces provided with upper and lower cover plat connectors, respectively; and at least one cover plate providing a decorative appearance to the converging ends of the three partitions, each cover plate extending vertically between two rectangular cover plate supports, the cover plate having an upper end secured to the lower cover plate connector of a first rectangular cover plate support and a lower end secured to the upper cover plate connector of a second rectangular cover plate support.

In yet another aspect, the present invention provides, in a modular office furniture system comprising a plurality of rectangular, upright partitions a system for providing a decorative covering over a gap between converging ends of four converging partitions; the converging ends of adjacent partitions converging at a preselected angle of 90°; the partitions each having a rectangular frame comprising two vertical end posts and a plurality of horizontal beams arranged in pairs, each beam extending between and connected to the two end posts and having hollow, open ends proximate the end posts, each partition having at least two pairs of beams, one pair proximate its bottom and one pair proximate its top; a first partition having one pair of beams in vertical alignment with a pair of beams of each other partition, the vertically aligned pair of beams of the first partition being proximate the top of the first partition; the system comprising: a rectangular horizontal cover plate extending between, and secured to, the converging end of each partition, the cover plate having an end plug inserted into the open ends of a vertically aligned pair of beams of each partition and an upper decorative surface.

In yet another aspect, the present invention provides an upright partition for use in a modular office furniture system, the partition comprising: a frame comprising: two vertical end posts and a plurality of horizontal beams arranged in pairs, each beam extending between and connected to the two end posts and having hollow, open ends proximate the end posts, the beams of each pair being connected to opposite sides of the end posts, the partition having at least two paris of beams, including an uppermost pair of beams proximate an upper end of the partition; a pair of cladding panels forming a decorative outer covering over at least the upper portion of the partition, each cladding panel extending vertically between a beam of the uppermost pair and a beam of another pair of beams along one side of the end posts, each cladding panel being secured at its top to a beam of the uppermost pair.

In yet another aspect, the present invention provides, in a modular office furniture system comprising a plurality of rectangular, upright partitions, a system for attaching cladding panels to a frame of a partition; the partition having a rectangular frame comprising two vertical end posts, a plurality of horizontal beams arranged in pairs, each beam having inward and outward faces and extending between and connected to the two end posts, the beams of each pair being connected to opposite sides of the end posts, and a plurality of cladding panels extending vertically between pairs of beams and forming a decorative covering of the partition; the system comprising: a plurality of modular panel retaining clips securing the cladding panels to the partition, each panel clip secured between a pair of beams and having side surfaces received in a tight friction fit against the inward faces of the pair of beams, each panel clip having at least one panel securing means to which a cladding panel is releasably secured.

In yet another aspect, the present invention provides a system for providing a decorative end covering on a free-standing portable partition having a frame with opposite faces and a top, a bottom and two ends; said system comprising: at least two cover plate supports provided on an end of the partition, each cover plate support extending outwardly from said end of the partition and having upper and lower surfaces provided with upper and lower cover plate connecting means, respectively; and at least one cover plate means providing a decorative appearance to said end of the partition, each cover plate means extending vertically between two cover plate supports, the cover plate means having an upper end secured to the lower cover plate connecting means of a first cover plate support and a lower end secured to the upper cover plate connecting means of a second cover plate support.

In yet another aspect, the present invention provides a system for providing a decorative end covering on converging ends of two free-standing portable partitions each having a frame with opposite faces and a top, bottom and two ends; said partitions having ends converging at a preselected angle of 90°; said system comprising: at least two triangular cover plate supports, each cover plate support extending horizontally between, and secured to, the converging ends of each of said partitions, each cover plate support having upper and lower surfaces provided with upper and lower cover plate connecting means, respectively; and at least one cover plate means providing a decorative appearance to the converging ends of the two partitions, each cover plate means extending vertically between two triangular cover plate supports, the cover plate means having an upper end secured to the lower cover plate connecting means of a first triangular cover plate support and a lower end secured to the upper cover plate connecting means of a second triangular cover plate support.

In yet another aspect, the present invention provides a system for providing a decorative end covering on converging ends of three free-standing portable partitions each having a frame with opposite faces and a top, bottom and two ends; each partition having one end converging at a preselected angle of 90 degrees with an end of an adjacent partition; said system comprising: at least two rectangular cover plate supports, each extending horizontally between, and secured to, said converging end of each partition, each cover plate support having upper and lower surfaces provided with upper and lower cover plate connecting means, respectively; and at least one cover plate means providing a decorative appearance to the converging ends of the three partitions, each cover plate means extending vertically between two rectangular cover plate supports, the cover plate means having an upper end secured to the lower cover plate connecting means of a first rectangular cover plate support and a lower end secured to the upper cover plate connecting means of a second rectangular cover plate support.

In yet another aspect, the present invention provides a system for providing a decorative covering over a gap between converging ends of four free-standing portable partitions each having a frame with opposite faces and a top, a bottom and two ends; each partition having one end converging with ends of two adjacent partitions at a preselected angle of 90°; said system comprising: a rectangular horizontal cover plate extending between, and secured to, said converging end of each partition, the cover plate having an upper decorative surface.

In yet another aspect, the present invention provides a modular partition system comprising a plurality of rectangular wall partitions each having a bottom, a top and two end surfaces, a plurality of said partitions converging at a junction with vertically extending gaps between end faces of converging partitions, each converging partition converging at a preselected angle with either one or two other converging partitions, the top and bottom of each converging partition defining a horizontal plane; a system for providing a decorative covering at said junction, comprising: cover plate supports located in said horizontal planes at said junction, each cover plate support comprising horizontal plate means releasably connected to an end surface of at least one panel and having upper and lower surfaces, one of said surfaces having a decorative appearance and at least one of said surfaces adapted to releasably couple to one or more vertical cover plates, said cover plates extending vertically between adjacent cover plate supports and being selected from end face cover plates adapted to provide a decorative covering over an end surface of a partition, and vertical gap cover plates adapted to provide a decorative covering over said vertical gap between end surfaces of two converging partitions, said cover plate supports and cover plates together providing a decorative covering over the junction formed by the converging partitions, wherein: (a) in a horizontal plane in which no converging partition is oriented relative to any other converging partition at the preselected angle, a cover plate support is provided connected to and extending horizontally outwardly from the end surface of each partition having its top or bottom in said horizontal plane, each said cover plate support having one facet substantially abutting the end surface of a partition, and having upper and lower surfaces both adapted to releasably couple to a vertical end face cover plate, one of said upper and lower surfaces having a decorative appearance; (b) in a horizontal plane in which two partitions each converge at the preselected angle with only one other partition, one cover plate support is provided comprising horizontal plate means having a plurality of facets, each facet substantially abutting an end surface of a partition converging in said horizontal plane, and an outward side which horizontally spans a first vertical gap between said two partitions which converge with only one other partition at the preselected angle, one of the upper and lower surfaces of said cover plate support being adapted to releasably couple to a vertical gap cover plate adapted to provide a decorative covering over said first vertical gap, the other of said surfaces further having a decorative appearance and being adapted to releasably couple to one or more vertical cover plates selected from end face cover plates and vertical gap cover plates adapted to cover a vertical gap between the end surfaces of any two partitions; or (c) in a horizontal plane in which each converging partition converges with two other partitions at the preselected angle, the cover plate support in said horizontal plane comprises horizontal plate means connected to and extending between the end surfaces of the partitions converging in said horizontal plane, said cover plate support having a plurality of facets, each facet abutting the end surface of a partition, one of said upper and lower surfaces of said cover plate retainer having a decorative appearance and adapted to releasably couple to one or more vertical cover plates selected from vertical gap cover plates and end face cover plates.

Further aspects of the invention will become apparent upon review of the following detailed description of the preferred embodiment of the invention.

BRIEF DESCRIPTION OF THE DRAWINGS

In order that the invention may be readily understood, a preferred embodiment of the invention will be described by way of example with reference to the accompanying drawings in which:

FIG. 17 is a sectional, exploded perspective view of a connecting system of the present invention for securing together three partitions at a preselected angle.

FIG. 22 is a sectional, exploded perspective view illustrating a second stage in providing a decorative end covering on a partition according to the present invention, wherein a single cover plate retainer is connected to the end plug to provide a single cover plate support.

FIG. 23 is a rear perspective view of the single cover plate retainer shown in FIG. 22.

FIG. 26 is a sectional, perspective view illustrating three partitions according to the present invention converging at an angle of 90° and connected together by brackets.

FIG. 27 is a sectional, exploded perspective view illustrating a first stage in a system for providing a decorative covering over the converging ends of the partitions shown in FIG. 26.

FIG. 28 is a top plan view of a dual cover plate retainer used in the system for providing a decorative covering over the converging ends of the partitions shown in FIG. 26.

FIG. 29 is a side elevation view of the dual cover plate retainer of FIG. 28.

FIG. 30 is a top plan view of a triple cover plate retainer used in the system for providing a decorative covering over the converging ends of the partitions shown in FIG. 26.

FIG. 31 is a rear elevation view of the triple cover plate retainer of FIG. 30.

FIG. 32 is a sectional, exploded perspective view illustrating a second stage in providing a decorative covering over the converging ends of the partitions shown in FIG. 26.

FIG. 33 is a sectional perspective view illustrating the completed decorative covering over the converging ends of the partitions shown in FIG. 26.

FIG. 34 is a sectional, exploded perspective view illustrating a system according to the present invention for providing a decorative covering over a top gap between the converging ends of four partitions.

FIG. 35 is a sectional perspective view illustrating the first stage in a system according to the present invention for hanging cladding panels on a partition using modular panel clips.

FIG. 36 is a sectional perspective view illustrating the modular panel clip of FIG. 35 installed between a pair of horizontal beams.

FIG. 37 is an exploded perspective view of the modular panel clip of FIG. 35.

FIG. 38 is a sectional perspective view of a partition according to the present invention provided with cladding panels and decorative end and top coverings.

FIG. 39 is a sectional elevation view along line 39—39 of FIG. 38.

DETAILED DESCRIPTION OF THE PREFERRED EMBODIMENTS

Figure 1:
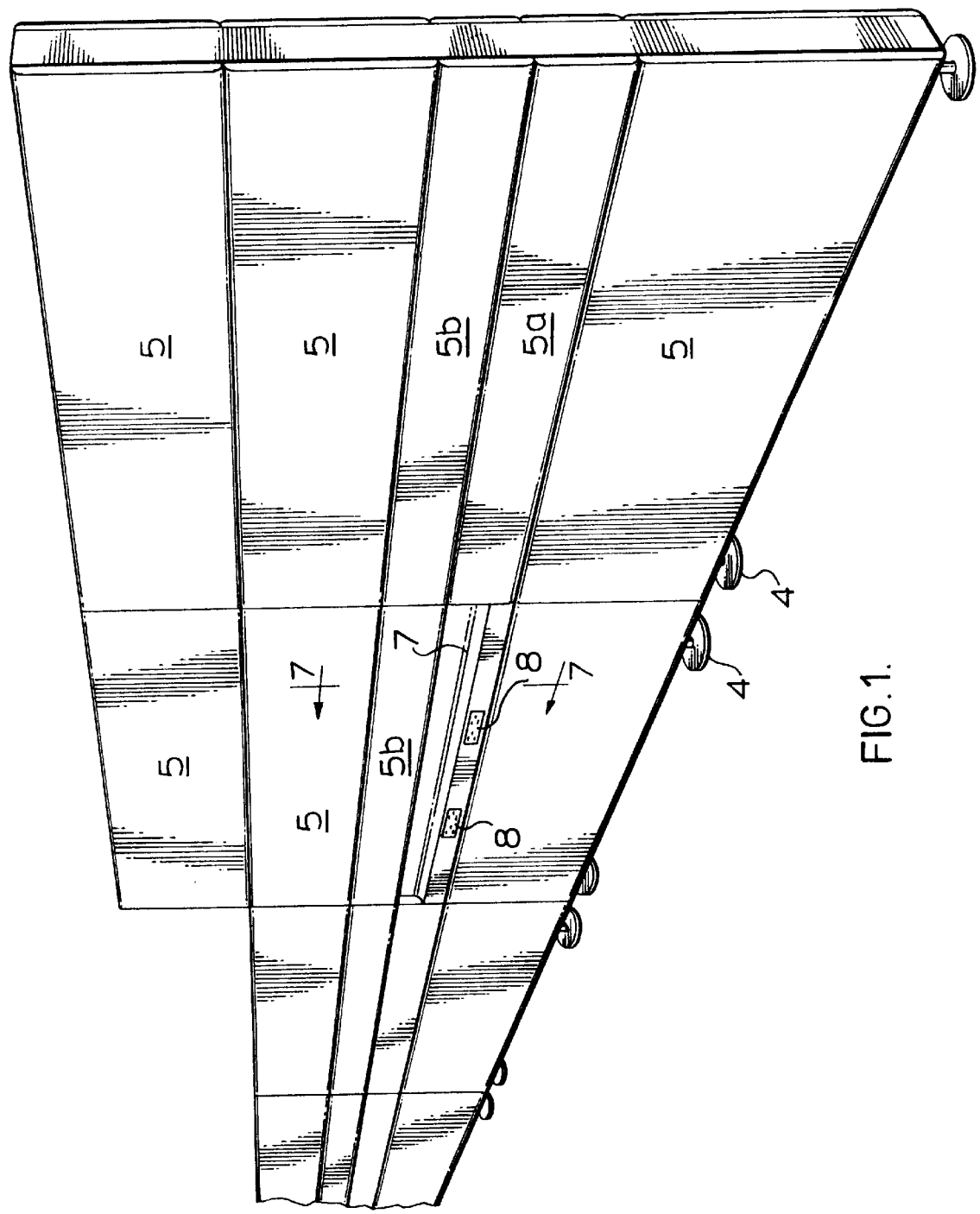
FIG. 1 shows a frontal perspective elevation view of an assembled modular office furniture partition wall including multiple vertical partitions, with a central partition having a modified utility access panel.

Office partition walls are assembled from adjacent rectangular partitions as shown in FIG. 1. A partition is generally clad with panels 5 and 7. The panels 5 and 7 are constructed of a painted sheet metal cover which may be filled with sound absorbing insulation and covered with sound absorbing fabric or other materials. Upper and lower panels 5 may be fitted with windows, or screens if desired. Adjustable legs 4 are provided to the level the partition wall along its length.

Figure 2:
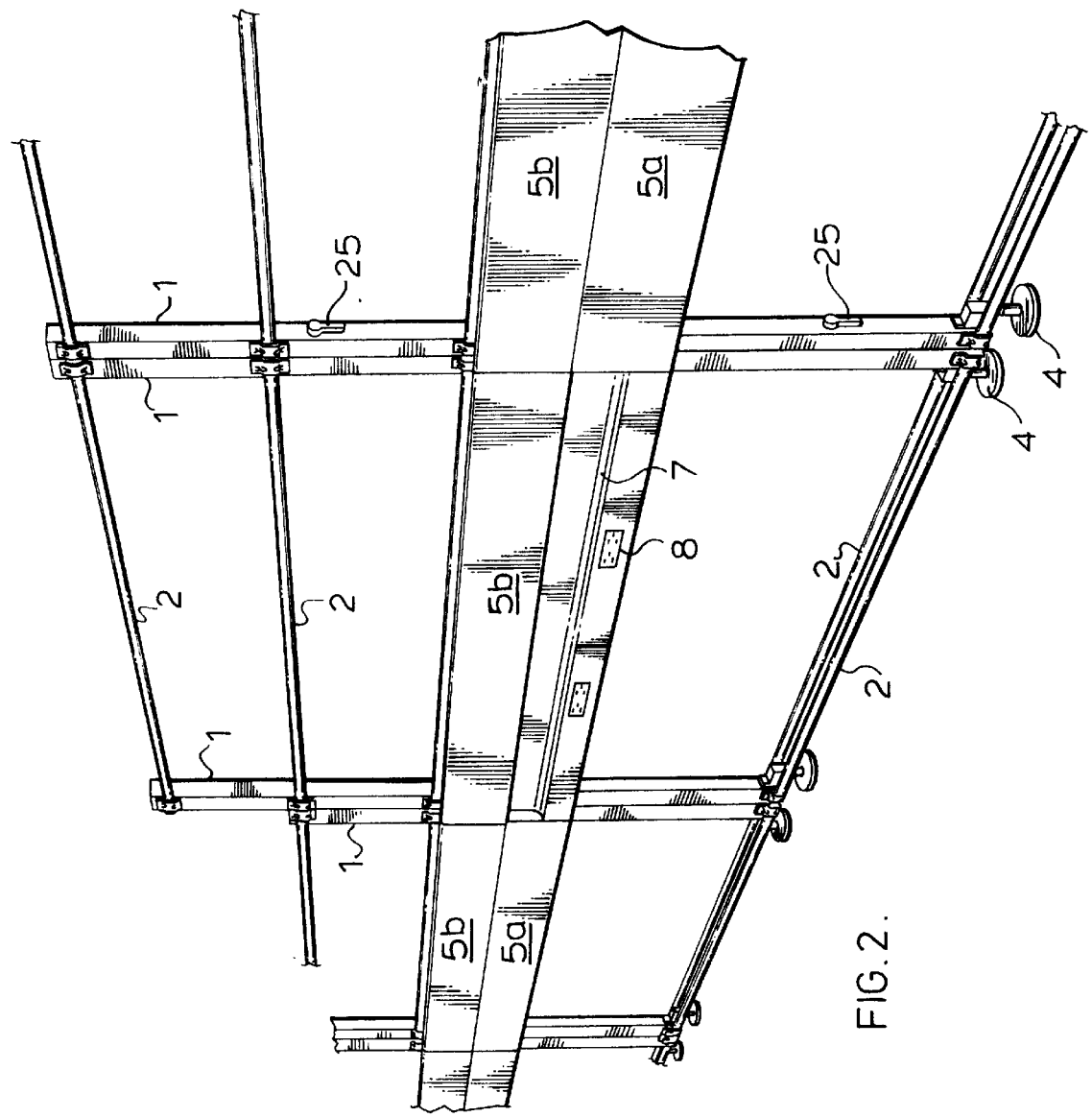
FIG. 2 is a frontal perspective view, of the wall of FIG. 1, with the upper and lower cladding panels removed to reveal the internal partition frame.

The novel construction of the partition frame is illustrated in FIG. 2. Upper and lower panels 5 have been removed leaving only the central panels 5 and 7 behind which electrical conduits, communication wires etc. are housed. Accordingly, upper and lower panels 5 may be wholly eliminated, or in part, from the partition frames if the interior designer wishes to present a more open office atmosphere. Furniture components such as desk tops, shelves, and cabinets can be suspended from the posts 1 of the partition frame independently whether or not a design includes the uppermost and lowermost cladding panels 5.

The frames of the partition are very simply constructed of two vertical posts 1 and horizontal beams 2. The beams 2 are preferably arranged in parallel pairs on both sides of the posts 1. Pairing of the beams 2 strengthens the frame and allows use of standard panel dimensions.

The beams 2 are connected to outward opposing front and rear faces of each post 1 in an overlapping moment resisting connection.

Figure 10:
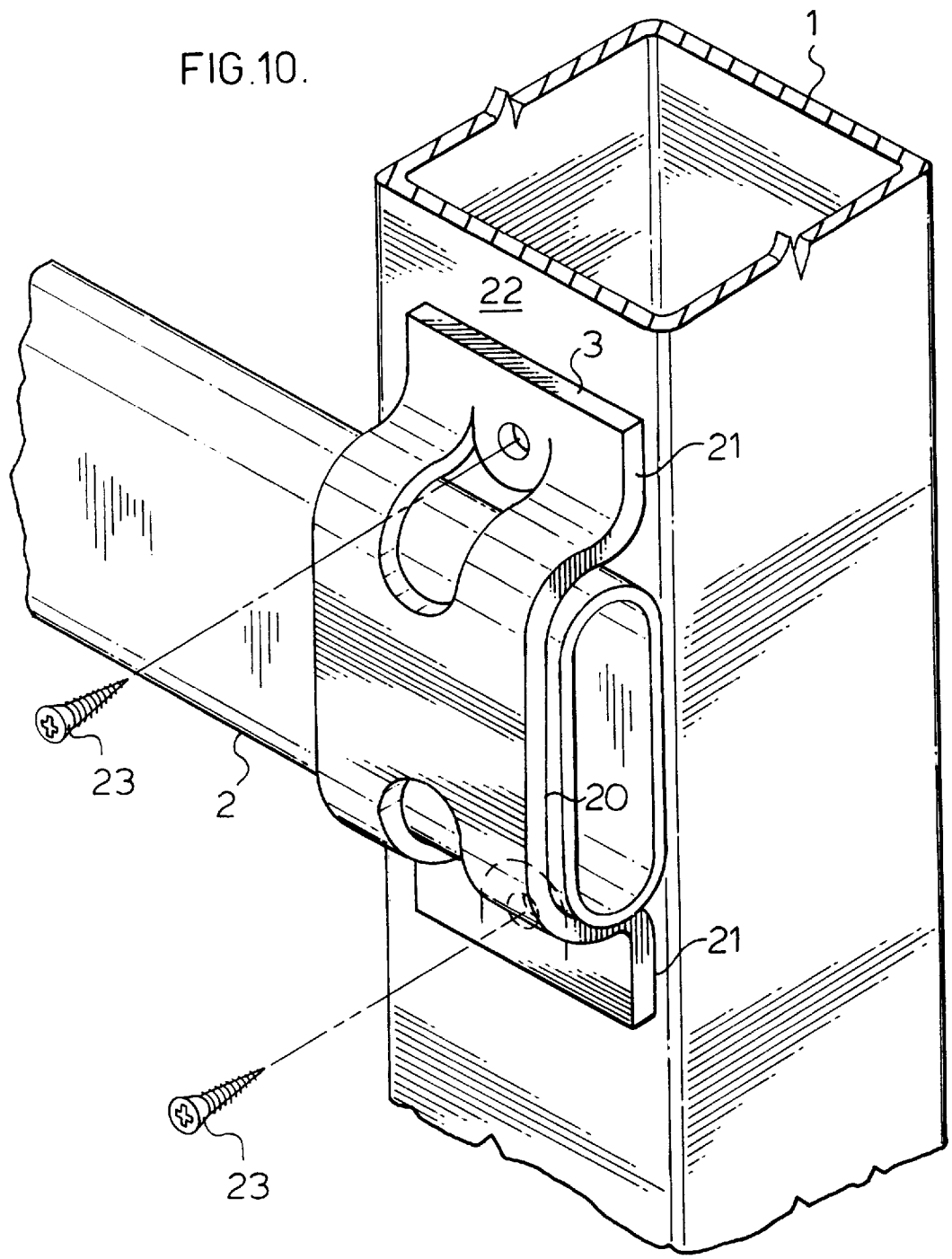
FIG. 10 is an isometric detail view of a typical saddle bracket connection joining a horizontal beam to a vertical post in an overlapping rigid connection.

FIG. 10 shows the preferred means by which the posts 1 and beams 2 are connected in an overlapping rigid manner. The beams 2 are shown as tubular in transverse section having a "racetrack" sectional shape. The tubular beams 2 have an arcuate upper portion and an arcuate lower portion with a straight intermediate portion between. The arcuate upper and lower portions are preferred by semicircular. This section is advantageous in that the section is easily drawn or extruded from metals such as steel and aluminum or from plastic. The section has a relatively high moment of inertia to resist torsion and flexure, and can be easily connected to the posts 1 and panels 5, as shown.

The beams 2 and posts 1 are connected, as shown in the typical connection detail of FIG. 10, with brackets 3 having a saddle portion 20 of internal profile mating the external profile of the beams 2. The brackets 3 also include flange portions 21 above and below the saddle portion 20. The flange portions 21 lie over and are connected to the outward forward or rearward face 22 of the associated posts 1. In the embodiment shown in FIG. 10, the flange portions 21 are perforated and the bracket 3 is connected to the post 1 with self-tapping screws 23. Other conventional means may also be used such as rivets, bolts, spot welding or puddle welding (not shown).

The cladding panels 5 include resilient clips (26 and 27 in FIG. 6) for releasably coupling each panel 5 between associated parallel upper and lower pairs of beams 2. In the preferred embodiment illustrated, the cladding panels 5 are positioned outward of, overlying and coupled to the beams 2. Due to the thickness of the saddle portion 20 of the brackets 3 shown in FIG. 10, a gap is present between the beams 2 and the adjacent top or bottom edge of the panels 5.

The partition is formed from an open gridwork of posts 1 and beams 2. As a result, the partition has an open interior cavity which advantageously permits the passage of wires and cables generally indicated as 32.

Figure 6:
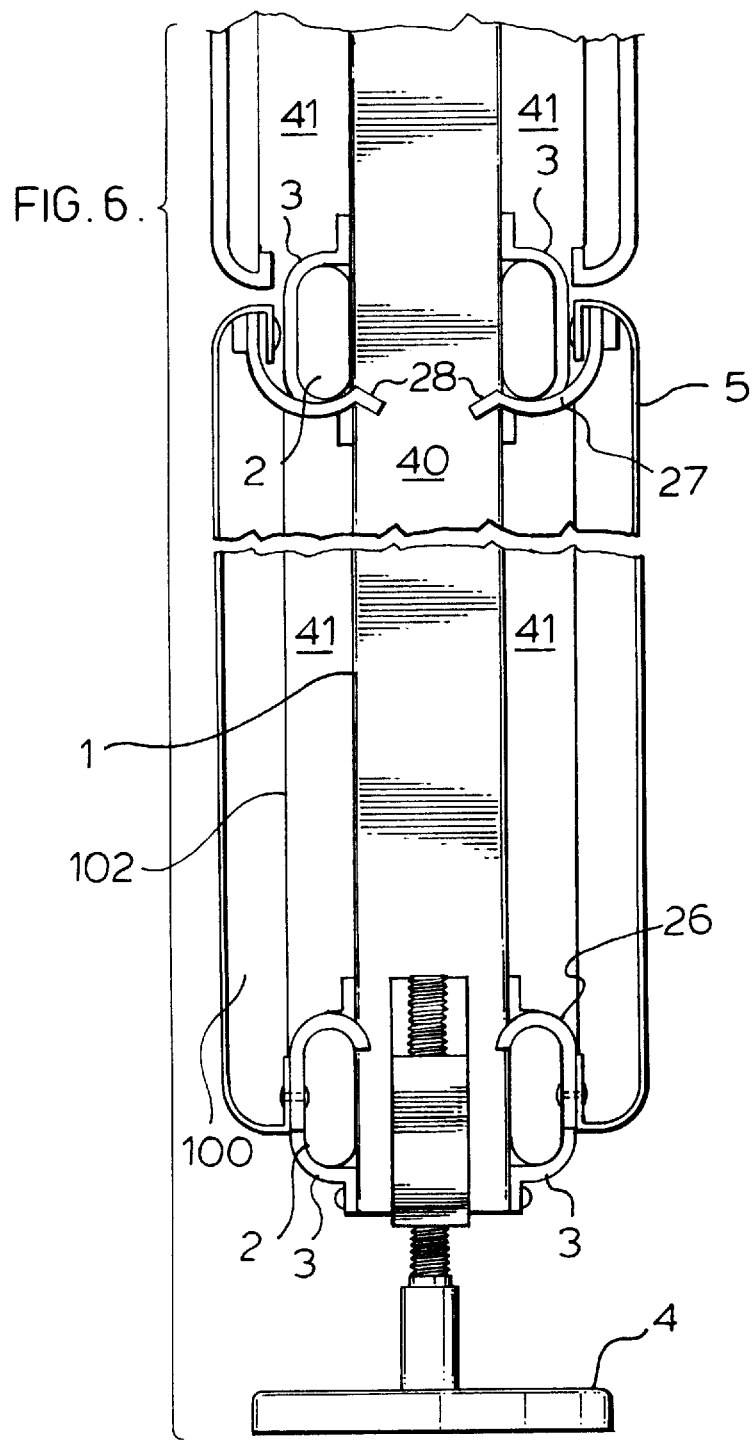
FIG. 6 is a sectional elevation view along line 6—6 of FIG. 5.

As seen in FIG. 6, the cavity is made up of a vertically extending central post space 40 together with horizontally extending raceways 41 adjacent and open to the central post space 40.

The central post space 40 is defined between the posts 1, that is between a forward plane including the forward face of each post 1 and a rearward plane including the rearward face of each post 1. The central post space 40 extends vertically between the spaces, parallel forward and rearward planes and between interior faces of the posts 1. The central post space 40 extends continuously vertically throughout the height of the partition and is open upwardly to above the top of the partition and is open downwardly to below the lowest beam 2 of the partition.

A plurality of raceways 41 extend horizontally between the beams 2 outward of and respective of the forward or rearward planes. The raceways 41 extend the full width of each partition and are open at each end to beyond the exterior end faces of the posts 1.

The raceways 41 are inward of the panels (5 and 7) and preferably extend forwardly and rearwardly from the respective forward or rearward plane at least the thickness of the beams 2.

The raceways 41 are open on their inner sides to the central post space 40 over the entire distance between the posts 1. Whereas the central post space 40 ends at the interior end faces of the posts 1, the raceways 41 provide for a passageway for cables 32 horizontally past the posts 1 outward of the posts 1 inward of the panels 5, 7.

Similarly, the central post space 40 provides a passageway for cables 32 vertically past the beams 2 inward of the beams 2 and inward of the panels 5, 7. With the raceways 41 and central post space 40 in communication, the cavity permits cables 32 to be passed vertically through the portion between the posts 1 inside the beams 2 and horizontally across a partition and between adjacent partitions in the raceways outside the posts 1, between the beams 2 and inside the panels 5, 7. In the context of FIG. 2, with a plurality of corresponding panels 5 gap "g" enables the insertion of the hanger means 30. The hanger 30 has an inward end which has inward facing dogs 31 to co-act with selected slots 24 in the outward face of the pasts 1. The inward end of the hanger 30 is bent in an offset S-shape in order that the cladding panels 5 cover over the slots 24 and the inward end of the hanger 30. As a result, the slots 24 and associated offset parts of the hanger 30 are not visible when the panels 5 are installed. The hangers 30 extend outwardly from the posts through gap "g" and may be used in known manner to support furniture components such as desktops, shelves, cabinets and the like.

Figure 7:
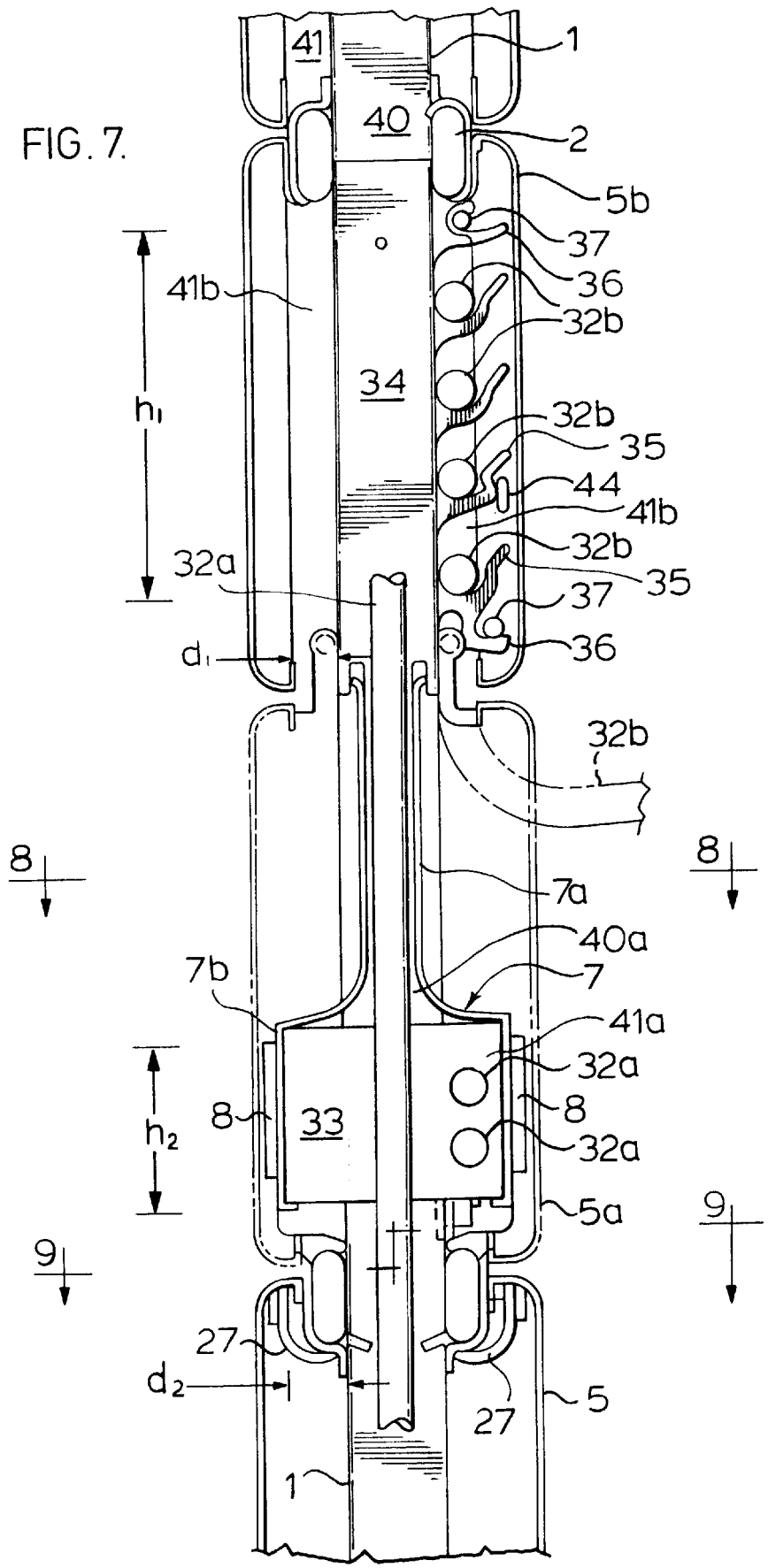
FIG. 7 is a sectional elevation view along line 7—7 of FIG. 1 showing the structure of the utility access panels with electrical power bus, and cable hanger.
Figure 8:
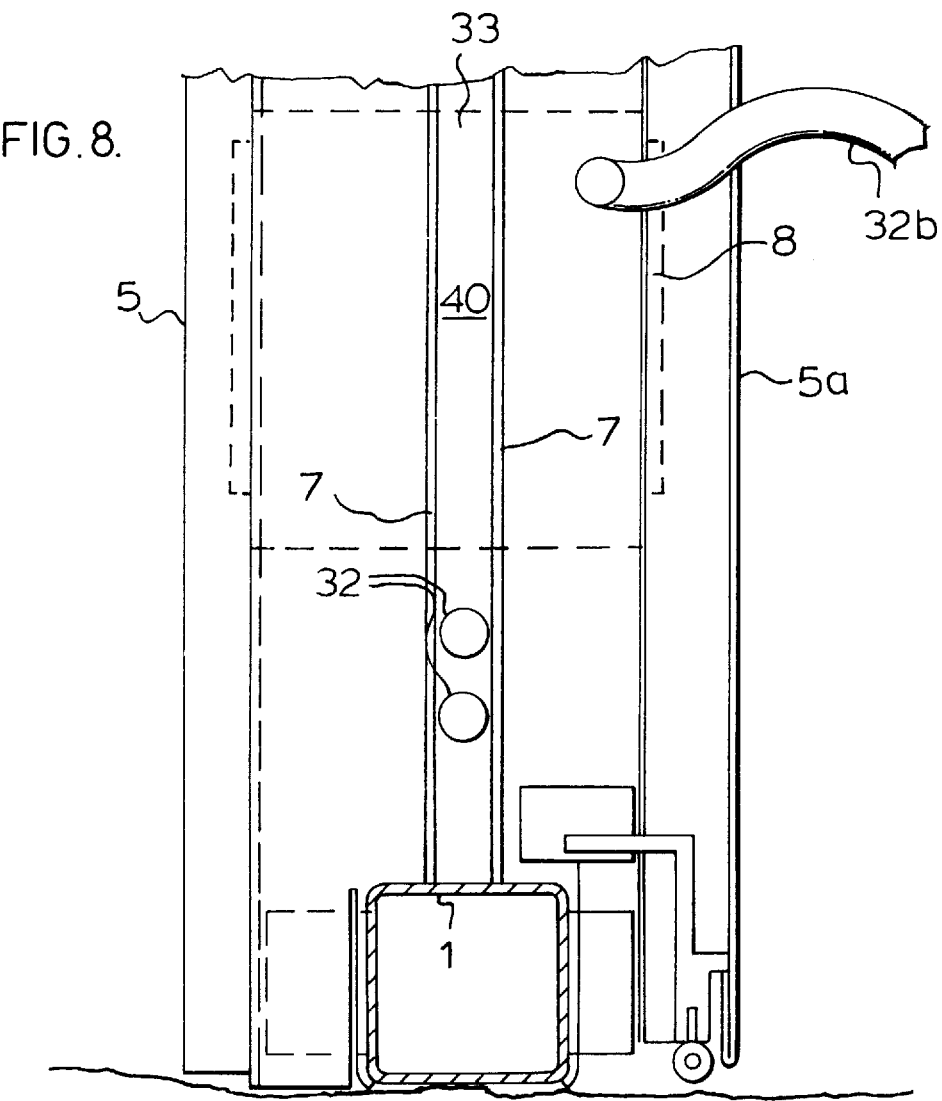
FIG. 8 is a sectional plan view along line 8—8 of FIG. 7.

A particularly advantageous feature of the partition according to the invention relates to the capacity to accommodate cables and wires 32 in a novel fashion having regard to the interior cavity comprising the central post space 40 and the raceways 41 described earlier. While many different configurations may be adopted to pass cables and wires 32 between partitions and into and out of the interior cavity, one preferred embodiment is illustrated. Referring to FIG. 7, FIG. 7 shows a portion of a raceway indicated and referred to as raceway 41b, underneath an upper panel indicated as 5b, adapted to carry horizontally extending communication wires 32b and another portion of the same raceway indicated and referred to a raceway 41a, underneath recessed panel 7 adapted to carry horizontally extending electrical cables 32a. As shown in FIG. 7, in a preferred embodiment, the intermediate panels 5 may be used to house communication wires 32b for computers and other office equipment. Intermediate panels 5a may be to house electrical power outlets 8, an associated electrical power bus 33 and associated electrical power cables 32. Since such wires 32b, cables 32a and power bus 33 are commonly required to be hidden, the embodiment of FIG. 2 shows the intermediate panel 5b and recessed panel 7 remaining installed, whereas the other panels 5 are removed.

In FIG. 7 in dotted outline, an optional cladding panel 5a is shown installed over recessed panel 7. The recessed panel 7 has an upper portion 7a which is inwardly upwardly recessed so as to not extend forwardly beyond the faces of the post 1 in order to provide space for vertical passage of the wires 32b from the raceway 41b to equipment which is external to the partition panels 5. Passing the wire 32b in raceway 41b downward adjacent the upper portion of recessed panel 7 and then out under the panel 5b effectively and simply masks the entry of wires 32b into the partition.

Above the recessed panel 7, wires 32b are accommodated within a cable support tree 34. The cable support tree 34 is attached with screws to an inner end face of an adjacent post 1. The tree 34 comprises a vertical member with vertically spaced apart series of laterally extending cable support arms 35. As drawn, the tree 34 has support arms 35 extending into raceway 41b on the right side only, for clarity. However, it will be understood that arms 35 may advantageously be provided on the left side as well. A modified cable support arm 36 includes an outward extension to engage supporting rods 37 secured to the rear of the removable cladding panel 5b. The removable panel 5b may be removed by pushing the bottom edge inward, which pivots the panel 5 about the boss 44 below the panel centre line to snap the top rod 37 out of engagement with the top modified arm 36. While the cable support trees are shown attached to each post, depending on the width of a panel 5, additional support trees 34 may be provided inserted between the posts 1 supported by the beams 2.

Advantageously, as best illustrated in FIG. 7, wires 32b pass along the entire width of each partition and between adjacent partitions via horizontal cable raceway 41b. The raceway 41b as illustrated is a depth "$d_1$" is bounded by the outward face of the post 1 and panel 5b, and of height "$h_1$" bounded vertically by the horizontal beams 2 of two vertically spaced apart pairs of beams 2.

The lower portion 7b of the recessed panel 7 covers an electrical bus 33. Electrical power cables 32a removed, a continuous raceway 41 will extend along the entire width of the three joined partitions into which cables 32 may easily be laid.

Referring to FIGS. 3 through 9, the details of construction of the partition frame are illustrated. In the embodiment illustrated the posts 1 are hollow structural square steel tubes. The posts 1 include a vertical series slots 24 in their outward forward and rearward faces. The slots 24 are used to adjustably and removably support hanger means for suspending various furniture components upon the posts 1 of each partition.

Figure 3:
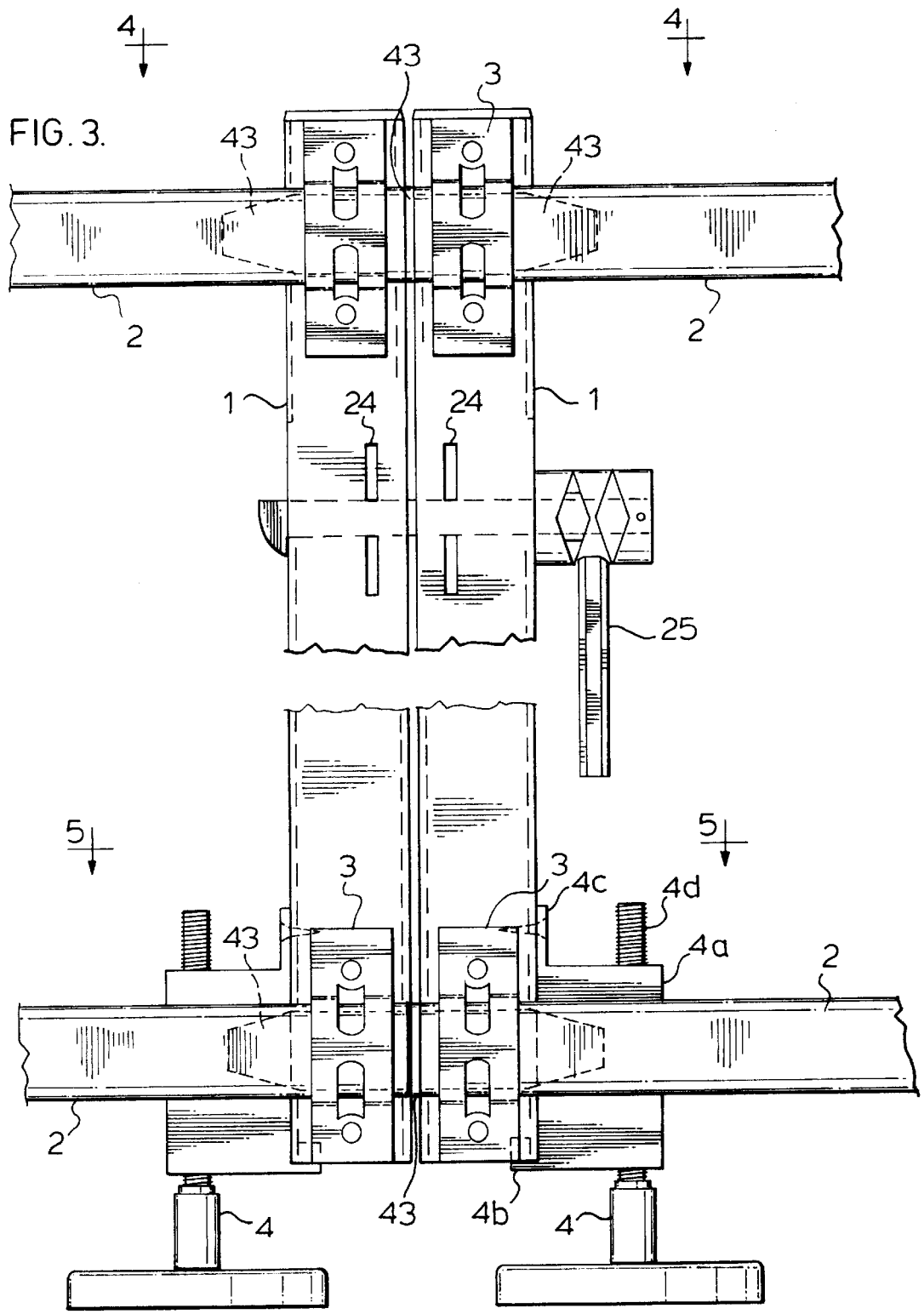
FIG. 3 illustrates an elevation view of adjacent vertical posts, of the wall of FIG. 1, showing two abutting partitions with their supporting feet and horizontal beam frame members.
Figure 4:
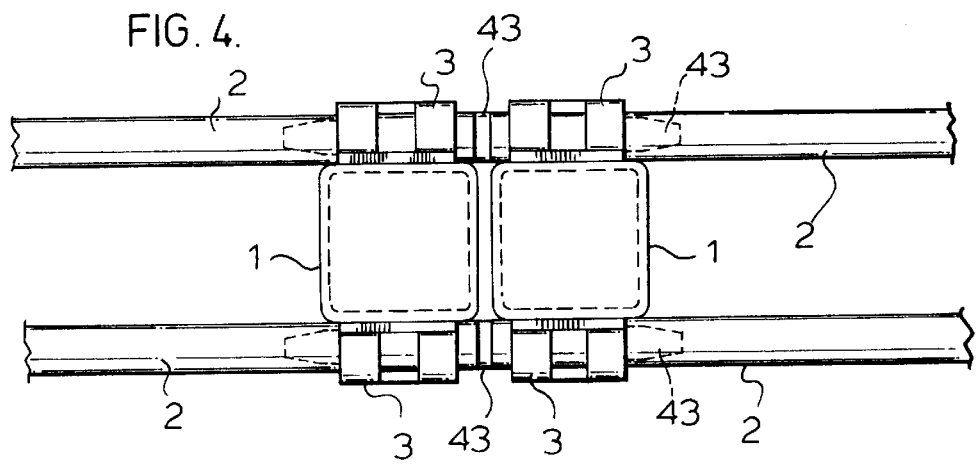
FIGS. 4 and 5 are sectional plan views along lines 4—4 and 5—5 of FIG. 3.

Adjacent posts 1 of adjacent partition frames are connected with releasable securing means in the form of toggle clamps 25 as shown in FIG. 3.

Adjustable height legs 4 are provided at the base of each post 1 to support the partition frame, and level the assembled partition wall on the supporting floor surface.

Preferably the beams 2 are arranged in parallel pairs, with one beam 2 of each pair being connected to the outward opposing faces of each vertical post 1. The pairs of beams 2 are vertically spaced from other pairs of beams 2 at uniform vertical intervals.

The panels 5, as shown in FIG. 6, are releasably coupled between associated parallel upper and lower beams 2 with resilient clips 26 and 27. The lower resilient clip 26 rests upon the upper arcuate curved surface of the lower beam 2. The upper resilient clip 27 has an inward leading lip 28 which guides the upper clip 27 over the lower semicircular rounded surface of the upper beam 2 in order to resiliently engage the upper beam 2.

Figure 9:
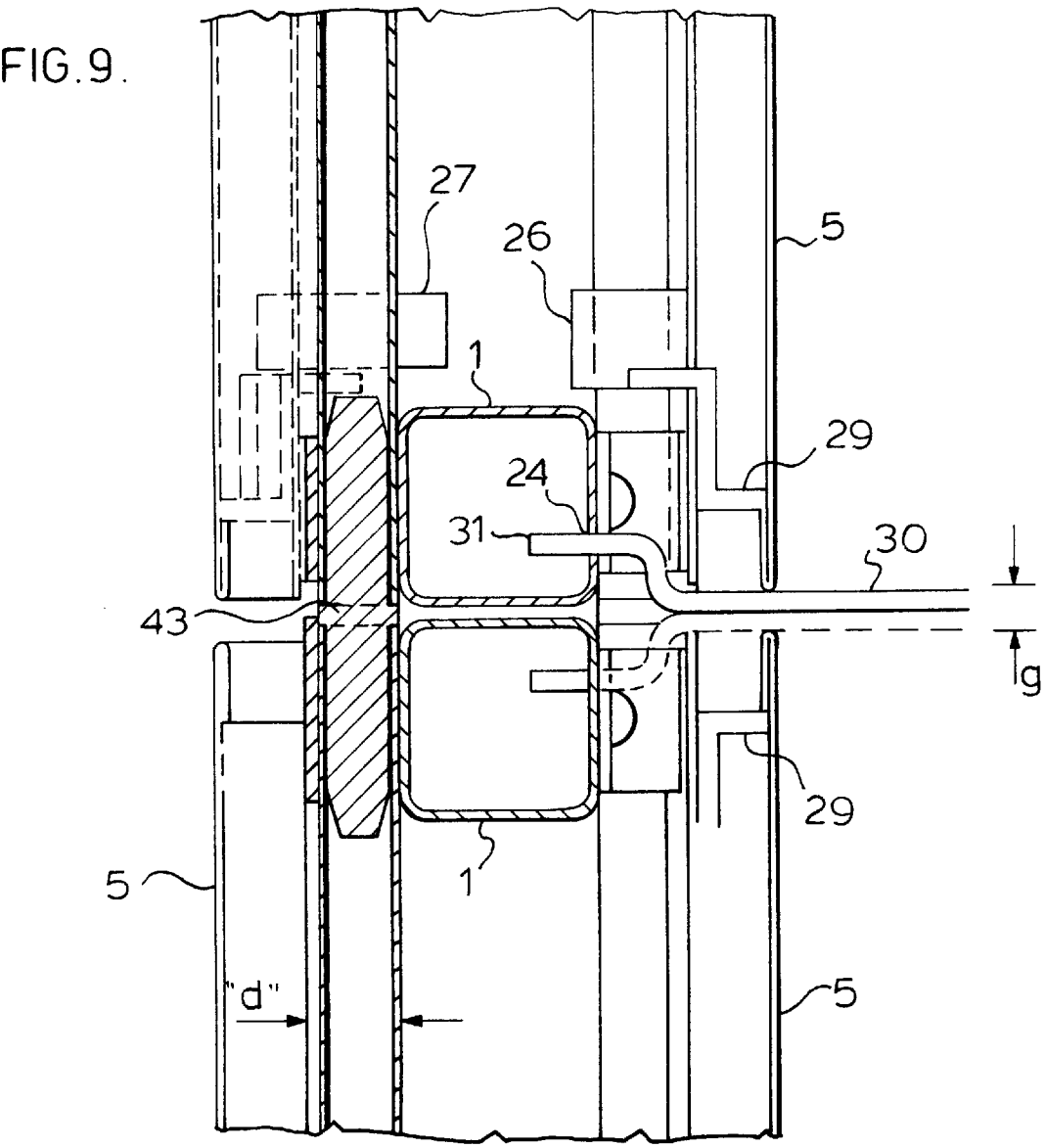
FIG. 9 is a sectional plan view along line 9—9 of FIG. 7.

FIG. 9 shows a sectional view in the plan which illustrates further details of the clips 26 and 27. Advantageously the clips 26, 27 are formed of plastic together with a panel bulkhead 29 which closes and masks both ends of the panel 5.

FIG. 9 shows that between ends of adjacent panels 5 there is a vertical gap of width "g" provided. The are shown to pass horizontally to buses 33 in adjacent panels via raceway 41a. Raceway 41a is illustrated as having depth "$d_2$" and height "$h_2$". The buses 33 are fixed to the posts 1 or beams 2 and include electrical outlets 8 on each side. To ensure the safety of the installation, the recessed panel 7 is connected to the posts 1 and the bus assembly with screws or other relatively permanent connectors. Accidental access to live electrical components is avoided therefore.

Electrical outlets 8 are accommodated by merely punching holes in the appropriate locations through the lower portion of the recessed panel 7. If access to the electrical bus 33 and electrical outlets 8 is not required, an optional cladding panel 5a (as shown in dotted outline in FIG. 7) may be installed over the recessed panel 7 in order to provide an uninterrupted finished appearance. Alternatively, the power bus 33 component may be eliminated entirely from that partition.

The optional cladding panel 5 may be conveniently stored within the cavity of the partition, behind an upper panel 5 for example, if access to the electrical outlets 8 and recessed panel 7 is desired.

The central post space 40 provides vertical passage throughout the entire height of the partitions other than where blocked by the bus 33. FIG. 7 schematically illustrates a length of electrical cable 32a extending to one end of bus 33, past the bus 33 up the central post space 40 from below the lowermost beams 2, to up to the height of the cable tree 34. As illustrated, between the panels 7 the central post space 40 has been narrowed to a vertical duct 40a of depth at least as great as the thickness of cable 32. Panels 7 need not be recessed inside the forward and rearward faces of the posts 1. When electrical power is accessed at floor level, the central post space 40 may be used to pass cables 32a upwardly from a power source in the floor and the bus 33. When electrical power is accessed from ceiling level, conventional power poles may be used which communicate with upper portions of the central post space 40 downwardly to the bus 33.

Electrical cables 32a are preferably armored in metal, and pass across the entire width of a partition and between adjacent partitions through the horizontal raceway 41a. Commercially available modular buses 33 are preferably used having outlets on both sides with pigtail conduits 32a for interconnection in lengthwise series along the length of the assembled partition wall.

Therefore the specific combination of the upper raceway 41b and the lower cable raceway 41a, and central post space 40 of the partition provide convenient means to house cables 32a and wires 32b hidden from view behind removable panels 5b and recessed fixed panel 7. All cables 32a and wires 32b may pass easily between adjacent partitions within the cable raceways 41a or 41b between the vertical posts 1 and exterior cladding panels 5 and 7.

Preferably the intermediate panel 5b which covers the cable supporting tree 34 is positioned immediately above desktop height. The recessed panel 7 is positioned immediately below desktop height. Since the raceways 41a and 41b pass on the outward surface of the posts 1, slots 24 which support hanger brackets 30 cannot be accessed in the immediate area of the raceways 41a or 41b when cables or wires 32 are to be housed within the raceways. However, this feature is not particularly disadvantageous, since in general, hanger brackets 30 are positioned above desktop height for shelves and filing cabinets, whereas hangers 30 are positioned below desktop height to support desks, and filing cabinets.

Therefore, hangers 30 in the immediate area above desk top height are not generally required. If a design calls for hangers 30 in that specific location, it is a very simple matter to position the cable tree 34 at a higher or lower panel 5 location. Since the entire internal cavity 40 of the partition is open, wires 32b and cables 32a may be relocated anywhere within the interior cavity 40 of the partition to meet the requirements of a specific design.

Figure 11:
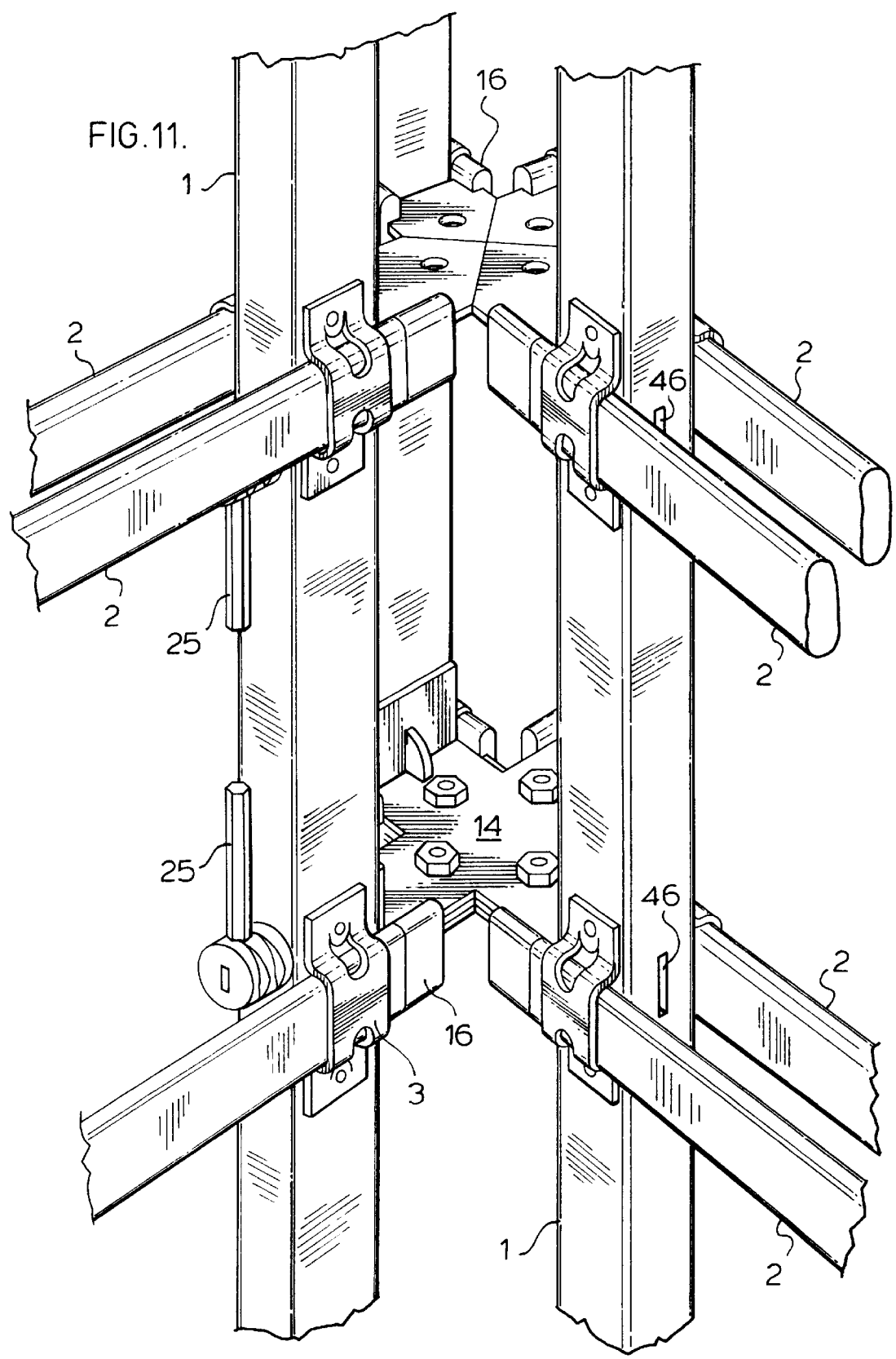
FIG. 11 is a perspective view of the connection between four adjacent partition frame posts in an X-shaped configuration.
Figure 12:
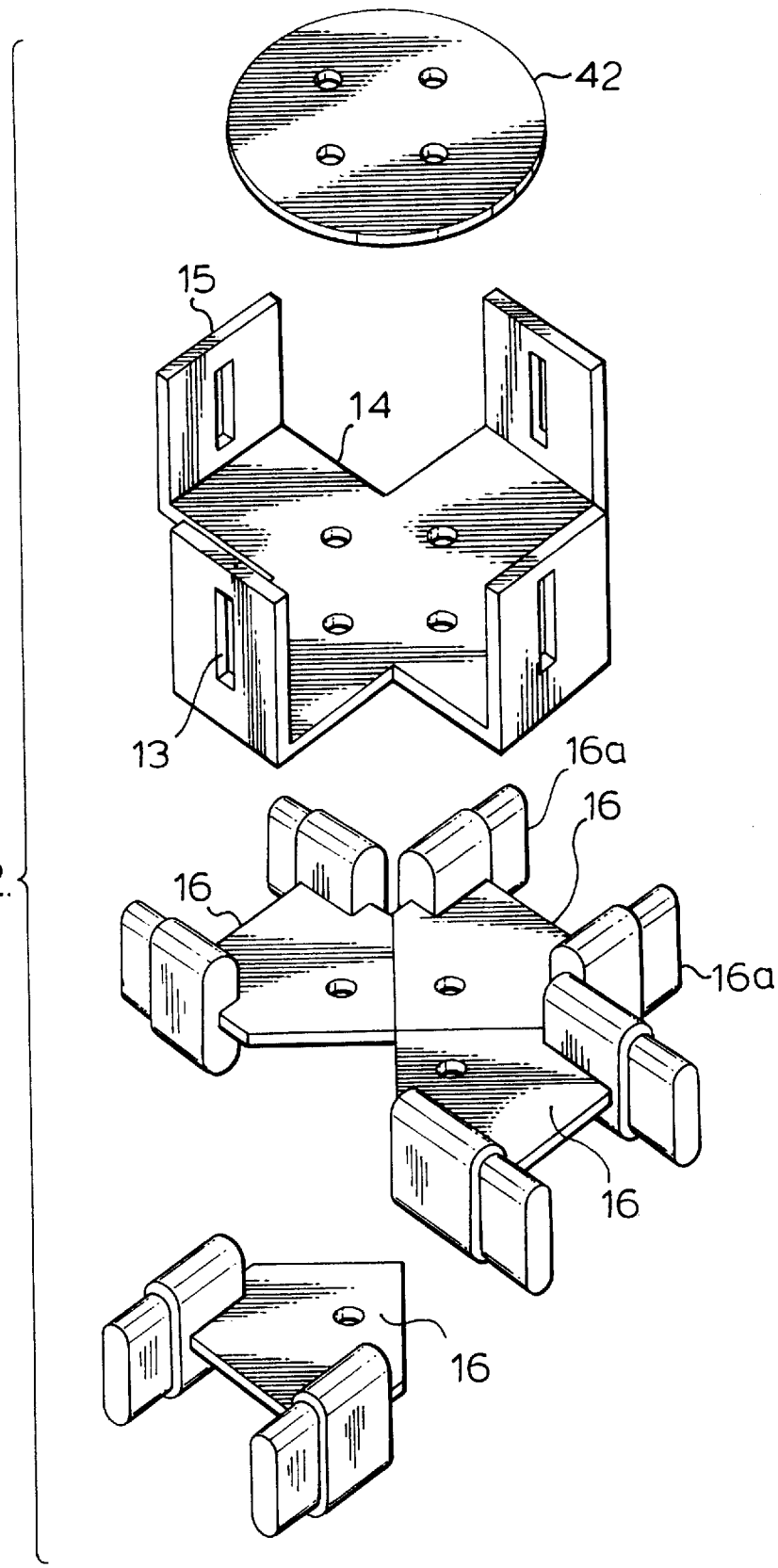
FIG. 12 is an exploded view of the component parts of the connection shown in FIG. 11.

FIGS. 11 and 12 show the details of the connection between four adjacent partitions in an X-shaped pattern. It will be apparent that connections of two or three adjacent panels in L-shaped or T-shaped patterns or between panels in other than 90° orientation can be accomplished in an analogous manner.

The leading hook-shaped ends of the toggle clamps 25 extend through slots in the posts 1 and engage a slotted opening 13 in the x-shaped connector 14. Upturned legs 15 are pressed against the lateral surface of the posts 1 and clamped securely. Further securement of the connection may optionally be provided by bolting arrowhead-shaped connectors 16 to connector 14 with the end inserts 16a of each connectors telescopically received within the interior of the open ends of the associated tubes 2. The arrowhead connectors 16 include mating apertures in order to bolt them to the X-shaped connector 14.

It has been found by experimentation that only one X-shaped connector 14 need be used at the mid-height level to securely connect four adjacent frames. Additional strength may be achieved if necessary in specific circumstances by providing additional X-shaped connectors 14 as shown in FIG. 11. Preferably though, only one X-shaped connector 14 need be used, and for additional stability and strength arrow-head connectors 16 may be used without connector 14. In this case disks 42 are used as a vehicle to which to secure adjacent arrow-head connectors 16 inserted into the interior of each pair of beams 2 throughout the height of the partition. The use of relatively expensive toggle clamps 25 therefore can be minimized without sacrificing the strength of the connection.

In order to secure abutting partitions together in a straight run, a single toggle clamp 25 may preferably be used. As shown in FIGS. 3 and 9, the pairs of beams 2 at the top and bottom of the abutting partitions may be joined together with inserts 43 which are force fit within the open ends of abutting beams 2 and span across between abutting beams 2.

The individual partitions in accordance with the present invention have been found to have surprisingly great strength and rigidity on an individual basis. When partitions are joined together end to end with inserts 43 received in the open ends of abutting beams 2, the combined partitions have yet increased and surprising strength and structural integrity.

In order to fabricate partitions, and assemble partitions in accordance with the invention, the following method of production is followed.

The posts 1 and beams 2 are cut to length from mill stock lengths according to the desired finished dimensions of the partition. Elongate slots 24 are cut into each of the two outward faces of each post 1. Elongate slots 46 to accommodate toggle clamps 25 are also cut in the side faces of each post 1. Holes for screws to attach the saddle brackets 3 are drilled in the outward face of each post 1, and holes are drilled in the side faces of each post 1 near their base to receive self-tapping screws which secure the legs 4 in place.

Beams 2 and posts 1 are then electrostatically coated. The painting operation is carried out by painting posts 1 and beams 2 hung side by side in parallel within an electrostatic painting booth. Compared to the painting of a relatively open welded frame, the painting of posts 1 and beams 2 before assembly is more efficient.

In general, it is more efficient to assemble the partitions in a high production factory environment using jigs, workstations, specialized tools, and handling equipment. The assembled frames may then be shipped to a site for erection.

However, an advantage of the partition design is that, if desired, the frames of the partitions may be constructed on site using simple tools and relatively unskilled labour. The posts 1, beams 2, saddle brackets 3, feet 4, panels 5 and 7, and other components may be packaged in cartons or compact bundles for transport to a site.

Two posts 1 are laid down on one outward face parallel to each other. A jig is preferably used in factory assembly to speed up assembly however it will be understood that a jig is not necessary since the predrilled holes for the saddle brackets 3 will ensure proper spacing and alignment of beams 2 and posts 1 when assembled on site. Beams 2 are overlapped upon the outward face of the posts 1. Saddle brackets 3 are positioned over the ends of the beams 2 and are secured in place with self-tapping screws 23 using a power screwdriver. The partially assembled frame is then turned over and the second beam 2 of each parallel pair of beams 2 is secured to the opposite outward face of each post in a like manner.

Figure 5:
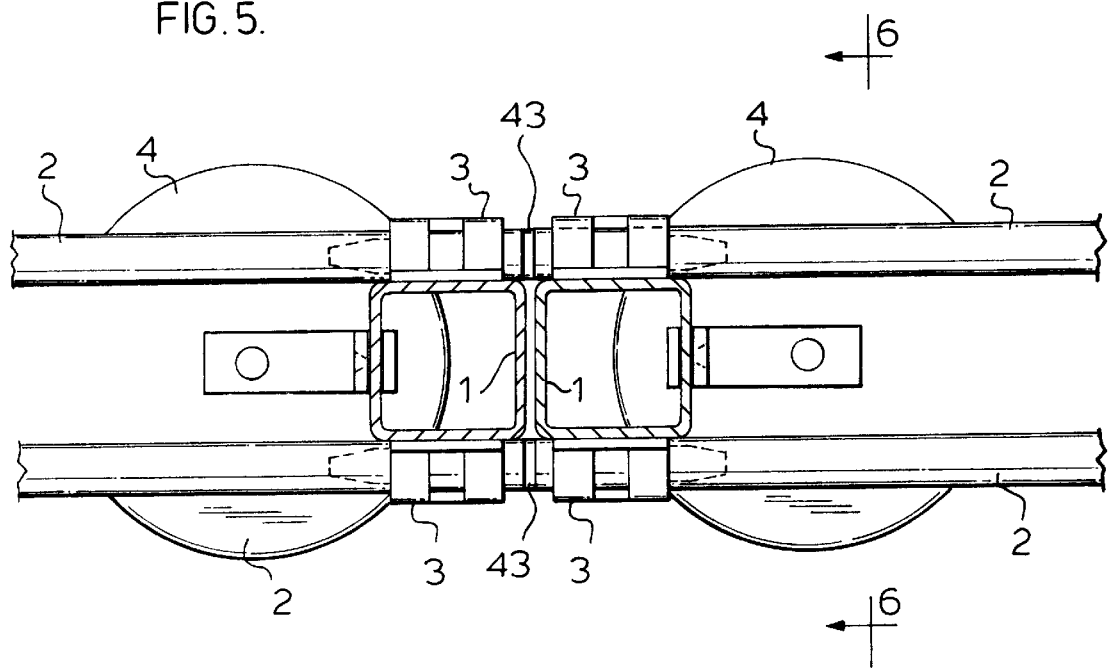

As shown in FIGS. 3 and 5, legs 4 have a cast metal body 4a with a slotted clip 4b upon which the bottom edge of the post 1 is positioned and an upper flange 4c through which self-tapping screws are driven to secure the leg body to the side face of each post 1 base. The cast body also includes a vertical threaded bore to house a threaded shaft 4d. The lower end of the shaft 4d is pivotally connected to a foot base, thereby providing height adjustment to level the partition on uneven floor surfaces.

The assembled frames are erected and connected together in the desired pattern through the use of toggle clamps 25. When X-shaped, T-shaped, L-shaped or other frame connections are desired, as shown in FIGS. 11 and 12, slotted connectors 14 and arrowhead connectors 16 are used to complete a rigid assembly.

Figure 13:
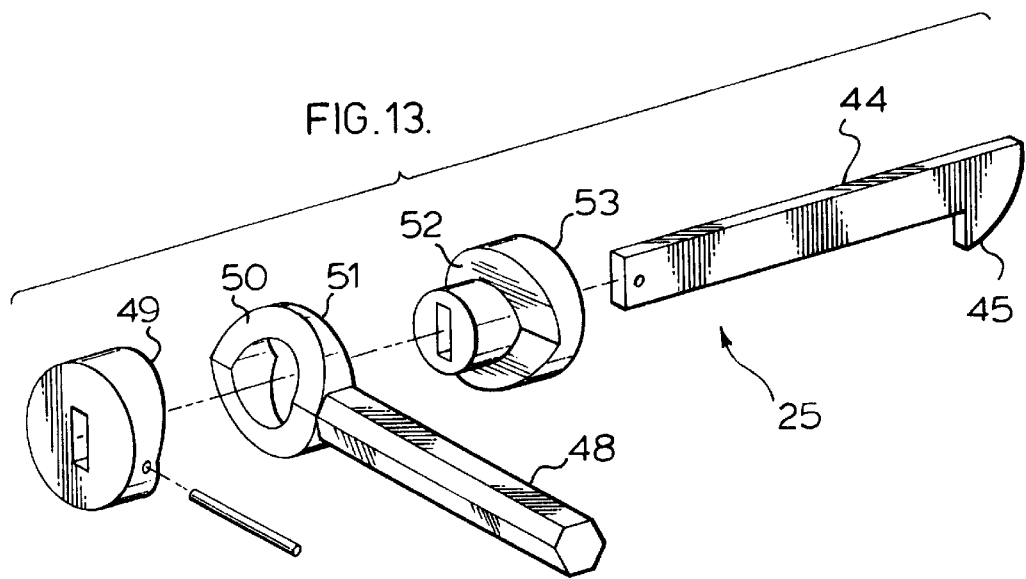
FIG. 13 is an exploded perspective view of the toggle clamp used to connect adjacent frames together.
Figure 14:
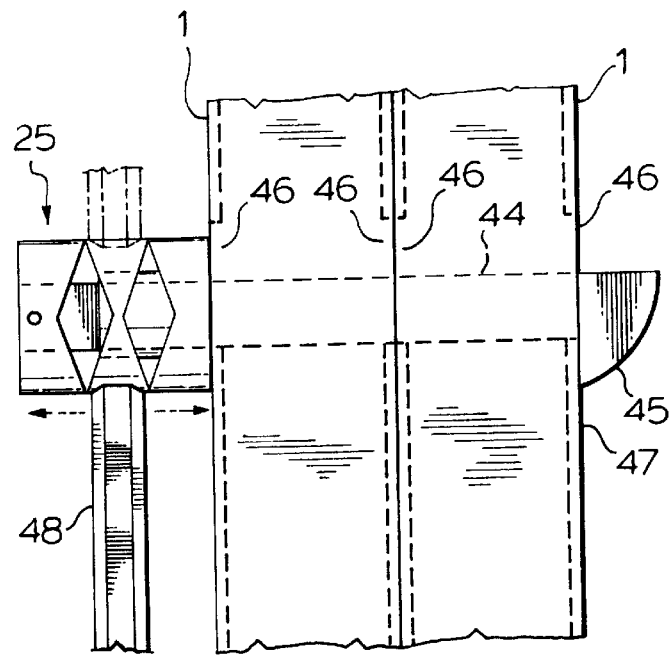
FIG. 14 is a detail elevation view of an installed toggle clamp.

To join posts of two partitions together in a straight run, as best shown in FIG. 14, the arm 44 and hook 45 of the toggle clamp 25 is inserted through aligned elongate slots 46 in the side faces of the posts 1. The hook 45 engages the side face 47 of the second post 1 remote from the remaining body of the clamp 25. From the exploded view of FIG. 13, it will be apparent that when the clamp handle 48 is rotated 90°, the abutting cam faces 49 and 50, and 51 and 52 co-act to clamp the posts 1 between the hook 45 and the shoulder face 53.

The cable trees 34 are installed throughout the length of partition wall to be served by office equipment.

Modular electrical buses 33 are installed in the desired locations. Electrical power cables 32a are run from a power source vertically up or down the partition of one interior cavity to one bus 33 location and then horizontally through the raceway 41b across the width of that partition and to adjacent partition. Recesses panels 7 are secured to the cable trees 34 with self-tapping screws.

Furniture components, such as desktops, shelves, filing cabinets, etc., are suspended from the posts 1 upon hanger brackets 34 by inserting the dogs 31 of the hangers 34 into the slots 24 of the posts 1. Panels 5 are then resiliently coupled to the beams 2 where desired, covering over the slots 24 and the inward ends of the hangers 30.

Office equipment such as computers, facsimile machines, telephones, printers, modems, ICU servers etc. are installed within the office space often supported upon the shelves or desktop components. Wires are passed between equipment external to the partition panels 5 and the cable tree 34 housed within the internal cavity 40 of the partition frame.

Wires 32b and cables 32a, are passed between adjacent partitions through the raceway 41b and supported at intervals along the length of the partition wall upon the cable trees 34. The armored electrical power cables 32a are passed through the raceway 41a. When all wires 32a have been installed, the rods 37 of cover panel 5b are engaged upon the modified support arms 36 of the cable trees 34 to enclose the wires 32b within the interior cavity of the partitions.

The partition described above therefore provides a simple construction for a partition. Rigid connections between the posts 1 and beams 3 are readily provided by the simple means attaching brackets 3 at the appropriate levels. The partitions may be substantially fabricated by simply cutting beams 2 and posts 1 to the appropriate length. The partitions may be shipped to the site in knocked-down bundles, and erected on site using simple tools and relatively unskilled labour. The customer may easily disassemble and reassemble the partitions during moving or when rearranging the office layout.

Cables 32a and wires 32b and electrical bus 33 are conveniently housed within the hollow interior cavity of the partition. Wires 32b and electrical power cables 32a are readily accessible behind removable panels 5a and 5b. The need to thread such wires and cables 32 through openings in the posts 1 is eliminated by the provision of two outward raceways 41a and 41b. As a result the installation, removal and maintenance of office equipment is simplified, and wires and cables 32a and 32b are not subjected to the level of wear occasioned through use of conventional partition designs.

Only the intermediate cladding panels 5a and 5b are required in most cases, as shown in FIG. 2, to cover the electrical bus 33 and wires and cables 32a and 32b. The remaining upper and lower panels 5 may optionally not be provided if desired, thereby further reducing the cost of the partition wall. The surface finish and connection detail design may be undertaken to result in an exposed structural "high tech" look which is relatively inexpensive and is currently popular in architectural and interior design.

A very simply constructed partition is provided which meets the increasingly onerous requirements for accommodating the numerous electrical and communication cables 32 of modern office equipment.

In the preferred embodiments, as shown in FIG. 6, the panels 5 have an end cap, indicated as 100, with an inner edge 102 such that raceway 41 is defined between edge 100 and the outer face of the posts 1. The panels 5 need not have such end caps 100. Avoidance of the end caps 100 can increase the depth of the raceways 41.

In the preferred illustrated embodiment, the cladding panels 5 have been shown to overlap and be outward of the beams 2. It is to be appreciated that the cladding panels 5 may be provided to not overlap the beams 2 but to be between the beams 2 with the panels 5 being open at their ends and in effect hollow to define the horizontal raceways within the panels 5 between the beams 2.

Although this disclosure has described and illustrated certain preferred embodiments of the invention, it is to be understood that the invention is not restricted to these particular embodiments. For example, the beams 2 and posts 1 may be constructed of any commonly available section, or of specially fabricated sections through extrusion, such as: hollow rectangular tubes, square tubes, round tubes, oval tubes, extruded members, drawn tubes, channel members, I-beam members, and angle members. The panels 5 as well may be constructed having an external cover made of various commonplace materials such as: roll formed sheet metal; extruded aluminum; extruded plastic; fibreboard; and fabric. Therefore, the invention includes all embodiments which are functional or mechanical equivalents of the specific embodiments and features that have been described and illustrated herein.

FIGS. 13 and 14 show a first securing assembly for securing together two partitions end-to-end in a straight line.

Figure 16:
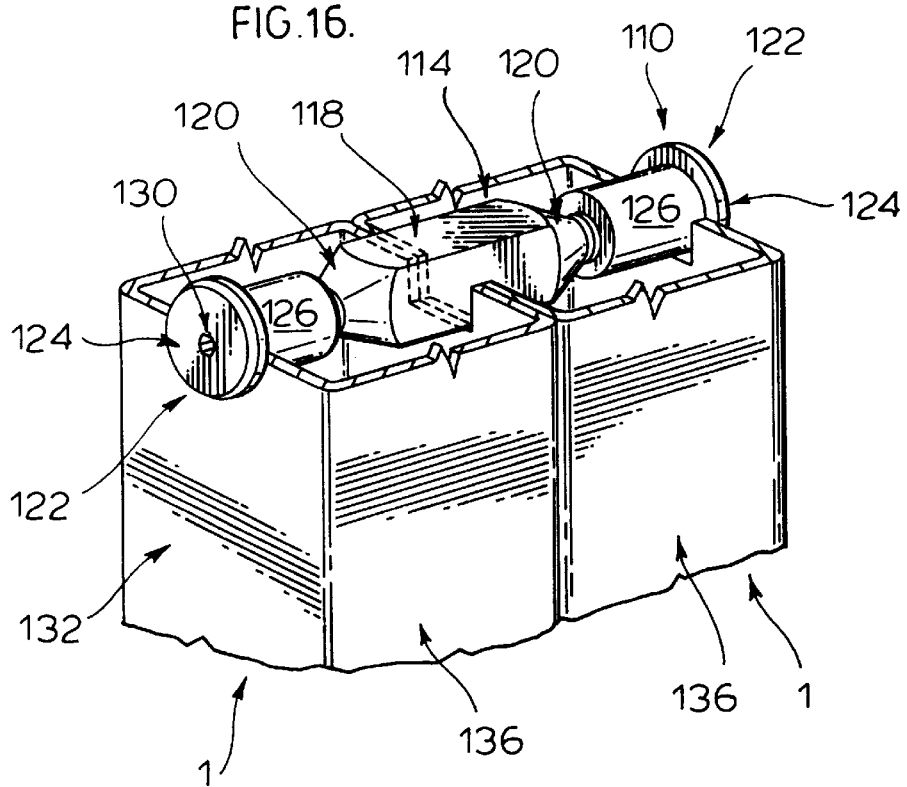
FIG. 16 is a sectional, perspective view of the connecting system of FIG. 15 securing together the vertical end posts of two partitions.
Figure 15:
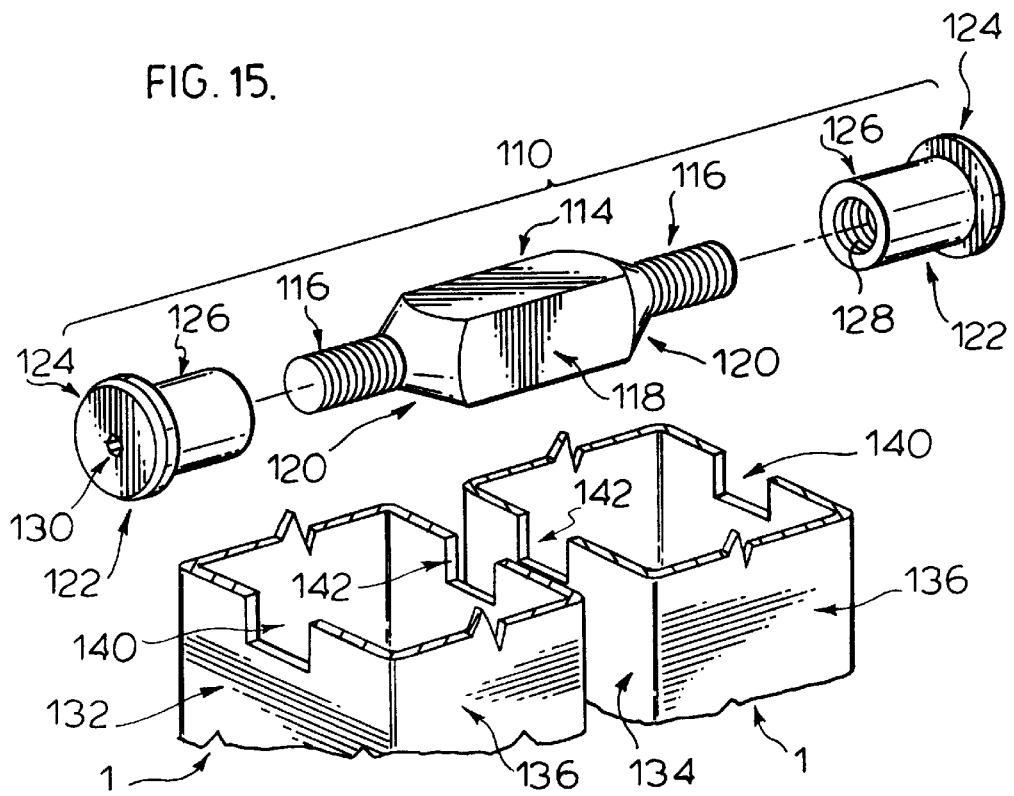
FIG. 15 is a sectional, exploded perspective view of a connecting system of the present invention for securing together two partitions end-to-end.

A second, more preferred securing assembly 110 is shown in FIGS. 15 and 16 for securing together two partitions in accordance with the present invention having rectangular frames with vertical, rectangular end posts 1. For clarity, FIGS. 15 and 16 illustrate only small portions of two vertical, rectangular end posts 1 belonging to adjacent partitions. However, it is to be understood that each end post 1 forms part of a rectangular, upright partition.

The posts 1 each have an inner face 132, an end face 134, and two side faces 136. Each end face 134 defines an end surface of its associated partition. The posts 1 are joined with their respective end faces 134 abutting.

Each post 1 has a square aperture 140 in its inner face 132 and a square aperture 142 in its end face 134. FIG. 15 does not show the entire apertures 140 and 142 but for clarity shows the posts 1 as being cut off through the apertures 140 and 142.

As shown in FIG. 15, the securing assembly 110 comprises an elongated fastener element 114 having two cylindrical threaded ends 116 and an enlarged intermediate portion 118 therebetween. Fastener element 114 has conical portions 120 forming a transition between intermediate portion 118 and threaded ends 116.

The securing assembly 110 also comprises two sleeve nuts 122. Each sleeve nut 122 comprises a head 124 and a sleeve 126 having a threaded interior 128 adapted to thread onto a threaded end 116 of fastener element 114. The head 124 of sleeve nut 122 is provided with a depression 130 adapted to receive a fastening tool. FIG. 15 shows a particularly preferred hexagonal depression 130 adapted to receive a fastening tool with a hexagonal bit, such as an allen wrench.

The posts 1 are joined as follows. Firstly, the posts 1 are roughly aligned so that the apertures 142 in their end faces 134 are in rough vertical and horizontal alignment. Then, a first sleeve nut 122 is threaded on to a first threaded end 116 of fastener element 114. The second threaded end 116 of fastener element 114 is inserted through the aperture 140 of a first post 1 until enlarged intermediate portion 118 becomes received in apertures 142 of both posts 1 and the sleeve 126 of the first sleeve nut 122 becomes received in an aperture 140 of the first post 1 with the head of the first sleeve nut 122 abutting the inner face of first post 1.

The securing assembly 110 is then completed by sliding second sleeve nut 122 into aperture 140 of the second post 1 and threading the second sleeve nut 122 onto the second threaded end 116 of fastener element 114. The sleeve nuts 122 are then tightened using a fastening tool until end faces 134 abut one another and the heads 124 of sleeve nuts 122 are received against inner faces 132, as shown in FIG. 16.

As the apertures 142 in the end faces 134 of posts 1 are sized and shaped to receive the enlarged intermediate portion 118 against rotation, rotation of either sleeve nut 122 will result in tightening of the securing assembly. It is also greatly preferred that, as shown in FIGS. 15 and 16, the apertures 142 and the enlarged intermediate portion 118 have the same square shape and are closely sized to have the same cross-sectional shape as the intermediate portion 118. This results in the insertion and tightening of the fastener element 114 in the apertures 142 drawing the posts 1 into precise horizontal and vertical alignment.

The conical portions 120 of fastener element 114 assist in sliding element 114 through apertures 140 and 142 and particularly in assisting in aligning the posts 1 in initial insertion of the fastener element 114.

The aperture 140 in the inner face 132 of each post 1 is sized and shaped to rotatably receive the sleeves 126 of the sleeve nuts 122. Apertures 140 are small enough to prevent heads 124 of the sleeve nuts 122 from passing therethrough but large enough to allow enlarged intermediate portion 118 of fastener element 114 to pass therethrough.

Although FIGS. 15 and 16 show the apertures 142 and intermediate portion 118 of fastener element 114 as being square, it is to be understood that apertures 142 and the intermediate portion 118 may independently be of any shape as long as intermediate portion 118 is retained against rotation in apertures 142 and preferably provide complementary surfaces for locating the posts 1 into alignment. More preferably, aperture 142 and intermediate portion 118 have the same regular polygonal shape, i.e. all sides of the polygon being of the same length. This allows for ease of insertion of the enlarged intermediate portion 118 into apertures 142.

It is also preferred that the inner face 132 and outer face 134 of each post 1 have apertures 140 and 142 of identical shape and size. Further, it is preferred that apertures 140 and 142 be centred midway between side faces 136 of each post 1 and be aligned vertically. The identical size, shape and placement of holes 140 and 142 makes the inner and end faces 132 and 134 of each post 1 reversible, simplifying assembly of the partitions.

In the embodiment of FIGS. 15 and 16, the end faces 134 of each post 1 are preferably drawn together with or without the spaces indicated as 43 in FIG. 3.

FIGS. 11 and 12 illustrate a first connecting system for securing together two or more partitions at preselected angles to one another.

Figure 18:
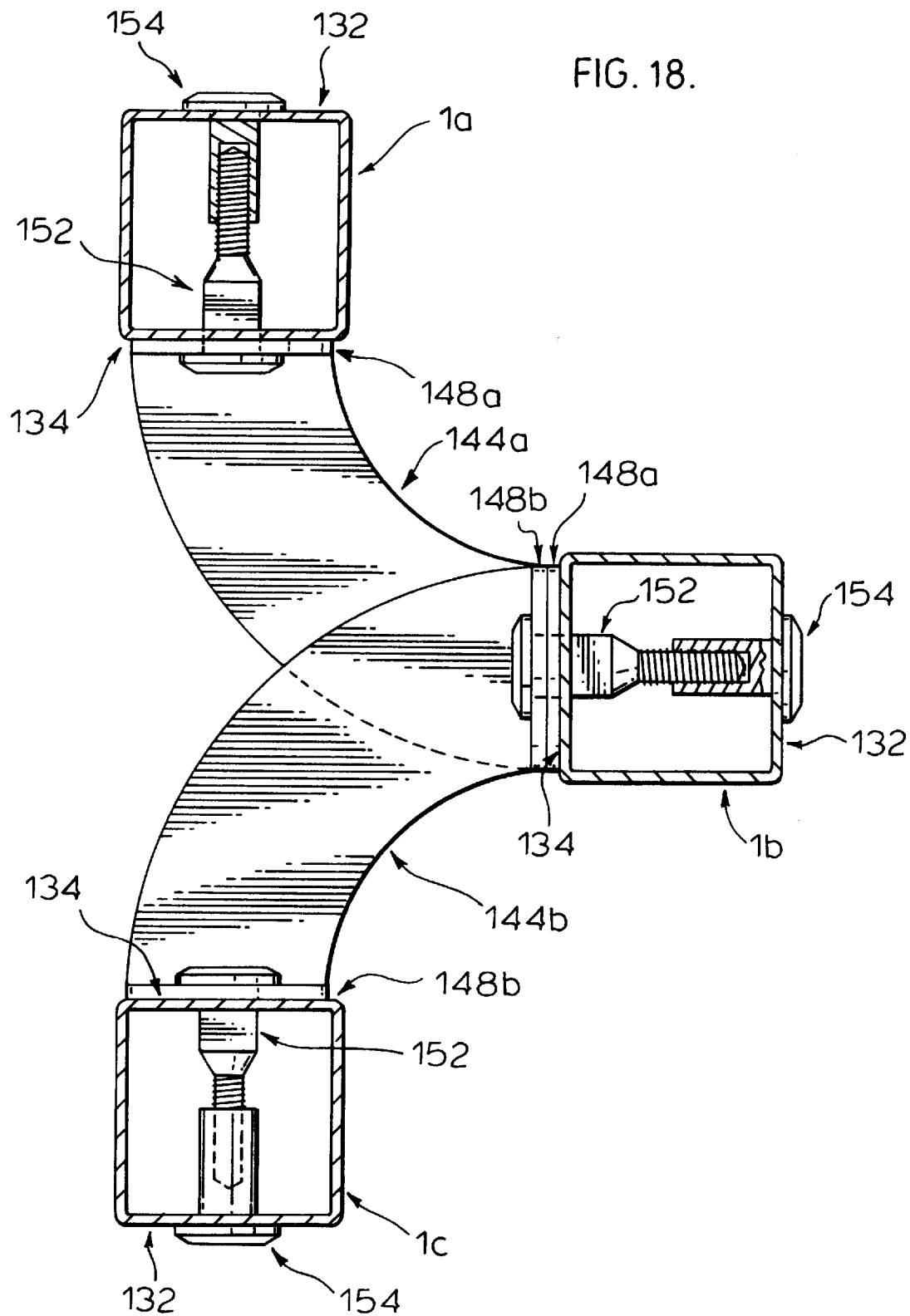
FIG. 18 is a plan view of the connecting system of FIG. 17 securing together the vertical end posts of three partitions.
Figure 19:
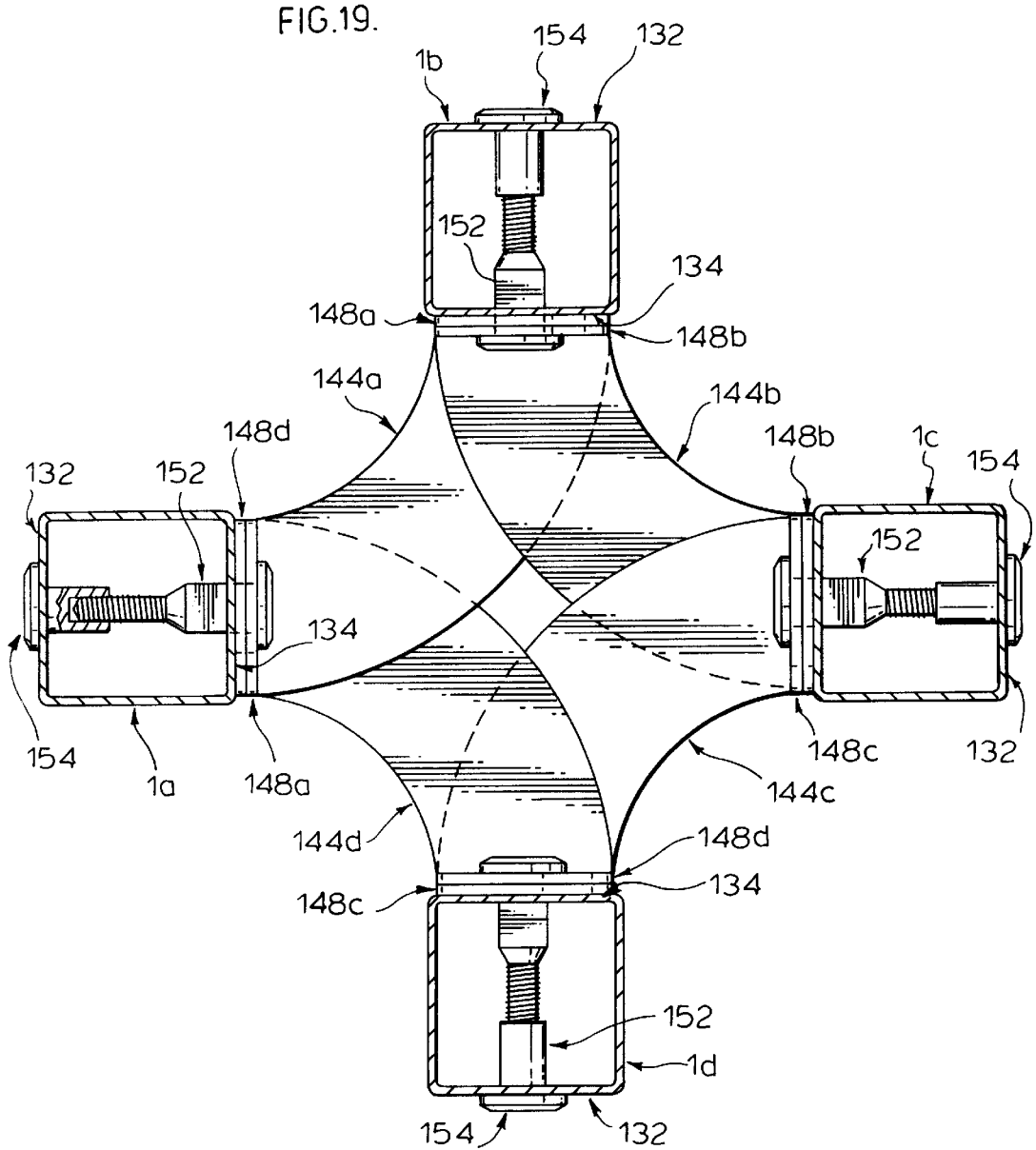
FIG. 19 is a plan view illustrating a connecting system, similar to that shown in FIGS. 17 and 18, securing together the vertical end posts of four partitions.

FIGS. 17 to 19 illustrate a second, more preferred, system for securing two or more partitions at an angle to each other. FIG. 17 shows three identical rectangular, vertical end posts 1a, 1b and 1c. Each end post 1 forms a part of a rectangular frame of a rectangular, upright partition however for convenience, all details of the partitions, except for the end posts 1, are omitted in FIGS. 17 to 19.

The end faces 134 of posts 1 are shown in FIG. 17 as being at a preselected angle of 90° to one another, that is with the preselected angle between the end faces 134 of posts 1a and 1b being 90° and the preselected angle between the end faces 134 of posts 1b and 1c being 90°.

The connecting system of FIGS. 17 to 19 utilizes a plurality of modular connecting brackets 144. As best seen in FIG. 17, each bracket 144 comprises two vertical end flanges 148 connected by a central horizontal bight portion 150. The bracket 144 is constructed so that the angle between the vertical planes containing the end flanges 148 is the same as the preselected angle between the end faces 138 of adjacent posts 1, that is 90°.

FIG. 17 illustrates a particularly preferred connecting bracket 144 having a horizontal bight portion 150 which is flat, has the same width as flanges 148 and describes a 90° arc between the end flanges 148.

FIG. 17 shows posts 1a and 1b in the process of being joined to one another at the preselected angle of 90° by one modular connecting bracket labelled 144a. The end flanges 148a of connecting bracket 144a abut against the end faces 134 of the respective posts 1a and 1b. The central horizontal bight portion 150a of bracket 144a extends outwardly from, and generally forms an L-shape between, the end faces 134 of respective posts 1a and 1b.

FIG. 17 also shows a second modular connecting bracket 144b in position to join posts 1b and 1c to one another at the preselected angle of 90°. One end flange 148b of bracket 144b is shown as abutting a flange 148a of bracket 144a against the end face 134 of post 1b.

The connecting system also comprises bolts 152 and nuts 154 to secure each end flange 148 to an end face 134 of a post 1.

Each flange 148 is secured by passing a bolt 152 through an aperture 156 in flange 148, and through aperture 142 in end face 134 of post 1. The bolt 152 comprises a head 158 and a shank 160, the shank 160 having a lower, cylindrical threaded portion 162 onto which nut 154 is threaded and an upper enlarged portion 164 which is received against rotation in the apertures 142 and 156 in post 1 and flange 148, respectively. Preferably, a conical portion 166 is provided on the shank 160 between threaded portion 162 and enlarged portion 164 to assist in inserting bolt 152 through apertures 156 and 142.

FIG. 17 shows the aperture 142 and the enlarged portion 164 having a preferred square shape, with aperture 142 being shaped and sized to permit enlarged portion 164 of shank 160 to be closely received against rotation in aperture 142 in post 1. It is to be understood that apertures 142 and 156 and enlarged portion 164 may be of any shape as long as enlarged portion 164 is received against rotation in one or both apertures 142 and 156.

As discussed above in reference to FIGS. 15 and 16, the apertures 142 and 144 of post 1 are preferably of the same shape and size and are preferably horizontally centred in the respective faces of the posts 1. This permits preferred interchangeability of the inner and end faces 132 and 134, respectively. Also, the apertures 140 and 142 of adjacent posts 1 are preferably vertically aligned so that the bracket 144 extends horizontally between adjacent posts 1.

The apertures 156 in flanges 148 are preferably in the form of vertically elongated slots. This permits the brackets 144 to be shifted vertically by a small amount relative to aperture 142 in post 1, to permit more than one flange 148 to be connected to a single post through a single pair of apertures 142 and 144 in each post 1.

Preferably, the brackets 144 are connected to posts 1 with their end flanges 148 extending vertically upwards to allow for easier instalment of bolts 152.

FIG. 18 is a top plan view showing how the three vertical posts 1a, 1b and 1c of FIG. 17 are joined together by two identical modular connecting brackets 144a and 144b having the orientation as shown in FIG. 17, i.e. with both brackets 144a and 144b having flanges 148a and 148b, respectively, extending upwardly and with bracket 144a connecting posts 1a and 1b, and bracket 144b connecting posts 1b and 1c.

Similarly, FIG. 19 illustrates a connecting system for securing together four partitions at a preselected angle of 90°, the connecting system of FIG. 91 utilizing four identical modular connecting brackets 144 to secure the end posts 1 of four adjacent partitions spaced from and at a preselected angle to one another. In FIG. 19, the four vertical end posts 1 are labelled 1a, 1b, 1c and 1d, with the brackets similarly numbered 144a, 144b, 144c and 144d. Each end post 1 has vertical flanges 148 of two different modular connecting brackets 144 secured to its end face 134. In FIG. 19, each bracket 144 has one end flange 148 abutting against the end face 134 of a post 1 and the other flange 148 abutting against a flange 148 of another bracket 144. This arrangement is necessary in a connecting system having four identical modular connecting brackets 144. In an alternate arrangement (not shown), four partitions are secured together at a preselected angle 90° using only three modular connecting brackets 144. This is done merely by eliminating any one of the modular connecting brackets 144 shown in FIG. 19.

FIGS. 20 to 25c illustrate a preferred system for installing a decorative cover plate on the end surface 138 of a rectangular, upright partition in accordance with the present invention.

The preferred cover plate connecting system shown in FIGS. 20 to 25c has a two part cover plate support 222, comprising separate end plug 178 and a cover plate retainer 200. The end plugs 178 are connected to the partition first and are therefore described first below.

Figure 20:
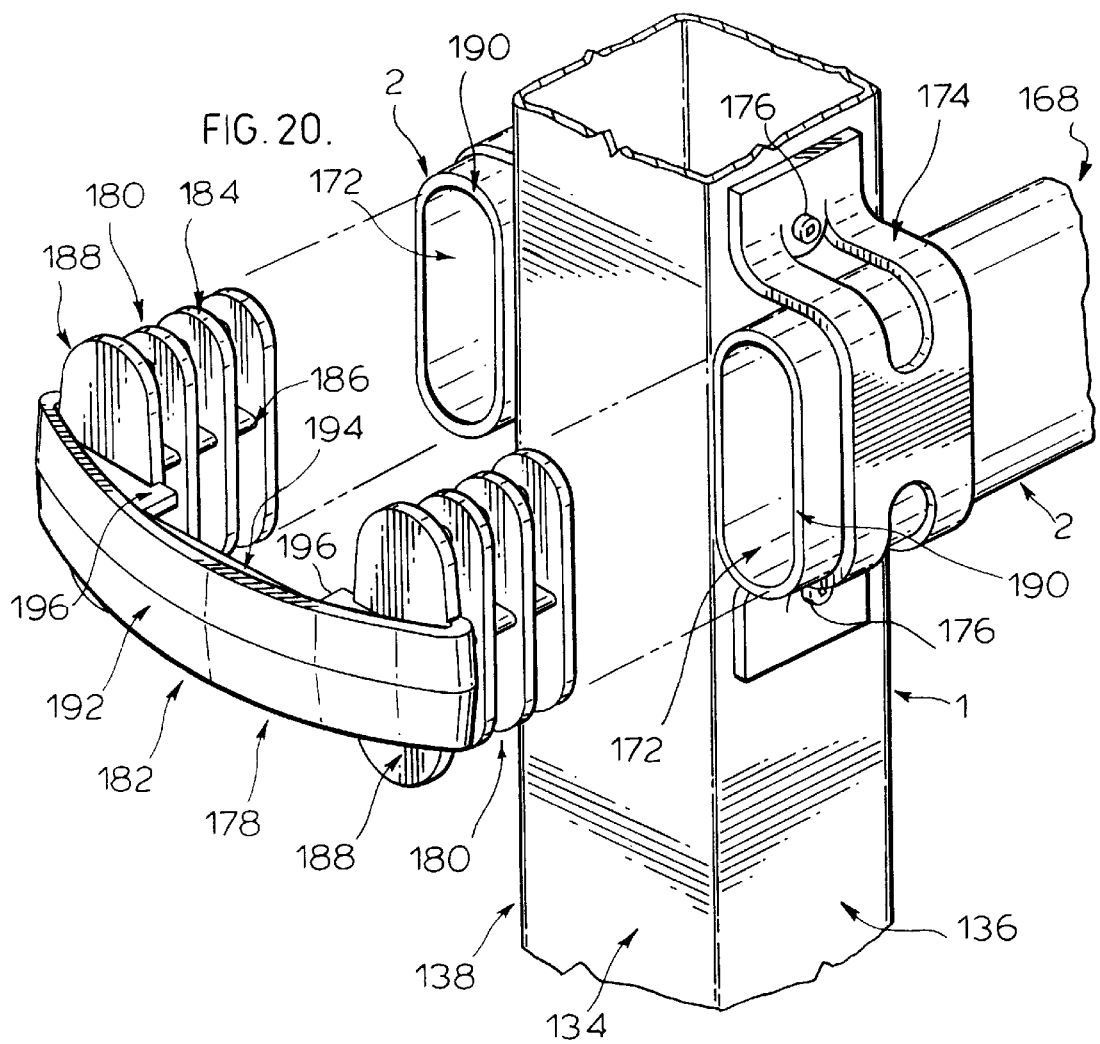
FIG. 20 is a sectional, exploded perspective view illustrating a first stage in providing a decorative end covering on a partition according to the present invention, wherein an end plug is inserted into a pair of horizontal beams.
Figure 21:
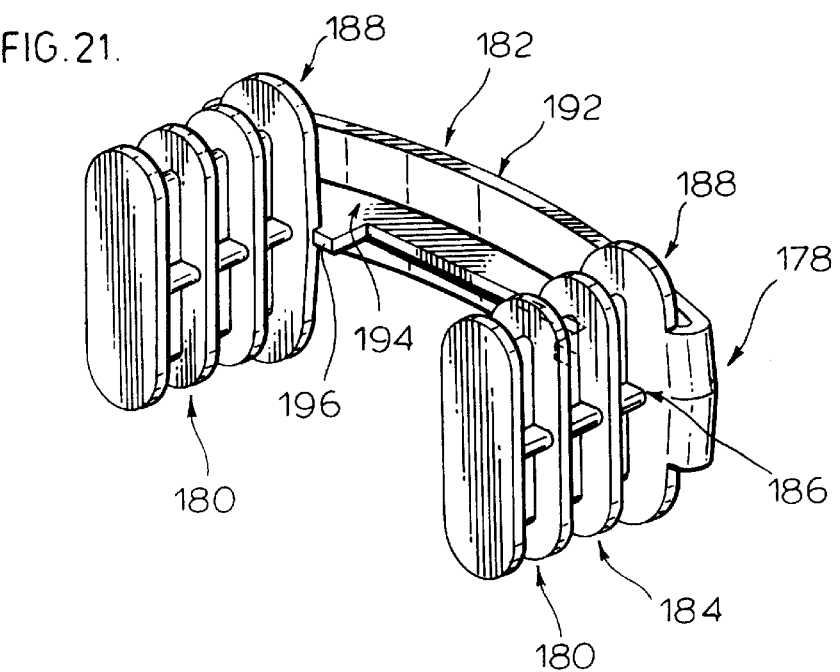
FIG. 21 is a rear perspective view of the end plug shown in FIG. 20.

FIGS. 20 and 21 illustrate a preferred end plug 178 and its insertion into the open ends 172 of a pair of horizontal beams 2. The end plug 178 is generally U-shaped and comprises a pair of parallel legs 180 adjoining a horizontal bight portion 182. The end plug 178 is preferably integrally molded from a resilient, yet rigid, plastic material. The legs 180 are adapted to be securely received in the open ends 172 of beams 2 and preferably comprise a plurality of vertical ribs 184 connected by horizontal webs 186. The ribs 184 are shaped and sized to be closely received in the open ends 172 of horizontal beams 2. The legs 180 are inserted into open ends 172 until all ribs 184 are received inside beam 2 and stop 188 abuts the end face 190 of beam 2.

The bight 182 of end plug 178 preferably comprises a forwardly facing convex portion 192 and a flat horizontal portion 194 behind convex portion 192 and extending between legs 180. The horizontal portion 194 has a pair of shoulders 196 adapted to abut the end face 134 of post 1 when legs 180 are fully inserted into beams 2, leaving a vertical slot 198 (shown in FIG. 22) extending laterally between the horizontal portion 194 of bight 182 and the end face 134 of post 1, and extending longitudinally between the shoulders 196. The fully inserted end plug 178 is shown in FIG. 22.

FIGS. 22 and 23 illustrate the second component of the cover plate support, namely cover plate retainer 200.

FIG. 22 illustrates cover plate retainer 200 as having a convex outer surface, and a hollow inner surface having a connecting mechanism 202 to attach the cover plate retainer 200 to the end plug 178. The cover plate retainer 200 has an upper surface comprising a bulbous plug connector 204, a lower resilient spring connector 206 and a lip 208 between connectors 204 and 206, the lip 208 extending about the outer periphery of cover plate retainer 200.

As shown in FIG. 23, connecting mechanism 202 comprises a vertical snap connector 210 having downwardly extending legs 212 which are adapted to slide vertically into the vertical slot 198 between the end face 134 of post 1 and the horizontal portion 194 of end plug 178. The legs 212 are retained in place by shoulders 214 which snap into secured engagement with the underside of flat horizontal portion 194 of end plug 178.

FIG. 23 shows connecting mechanism 202 further comprising a support member 216 provided between each leg 212 and the inside of cover plate retainer 200. Each support member 216 has a slot 218 shaped to receive the convex portion 192 of bight 182 when cover plate retainer 200 snaps into engagement with end plug 178.

The cover plate retainer 200 may be integrally formed from a single piece of resilient, rigid plastic. However, the legs 212, and at least the tips 220 of spring connector 206 are preferably formed from thin, resilient pieces of metal such as aluminum.

Figure 24:
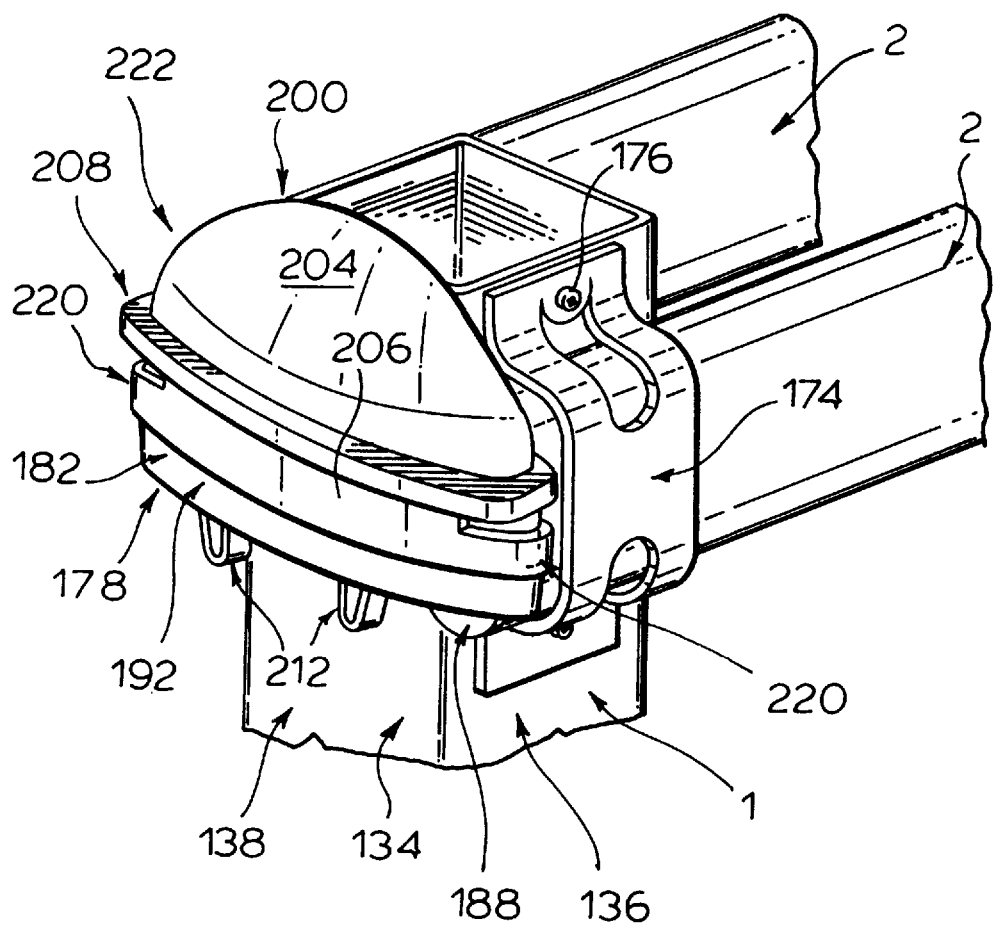
FIG. 24 is a sectional, perspective view illustrating the assembled single cover plate support of FIG. 23.

FIG. 24 illustrates one assembled cover plate support 222 comprising an end plug 178 and a cover plate retainer 200 attached to the end face 134 of post 1. The cover plate retainer 200, having its vertical snap connector 210 inserted into vertical slot 198, is securely attached to end plug 178.

As shown in FIG. 24, the resilient spring connector 206 of cover plate retainer 200 extends forwardly of the bight 182 of end plug 178.

Figure 25A:
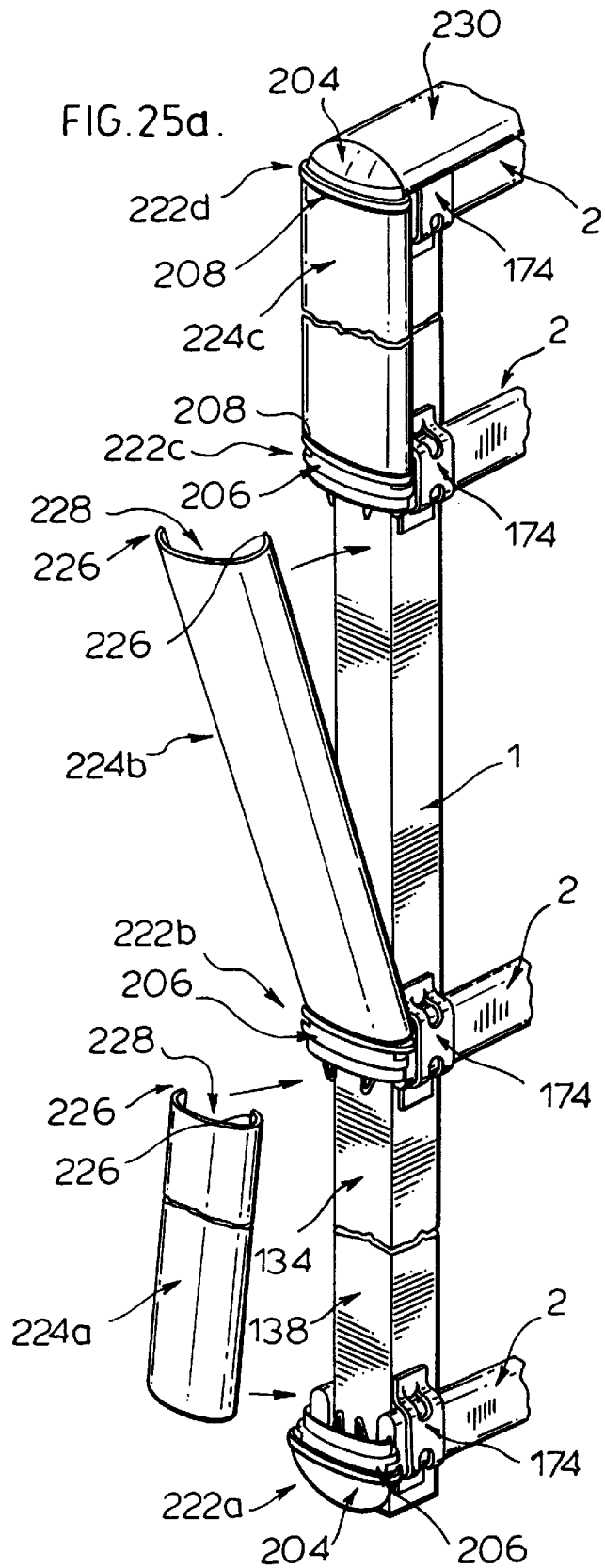
FIG. 25a is a sectional, exploded perspective view illustrating the attachment of end face cover plates to a partition provided with four single cover plate supports as shown in FIG. 24.

FIG. 25a illustrates a preferred manner in which a cover plate may be attached to the end face 134 of a post 1 to thereby provide a decorative covering over the end surface 138 of the partition.

The partition 168 shown in FIG. 25a has four pairs of parallel horizontal beams 2 and is therefore provided with four cover plate supports 222, which have been numbered 222a, 222b, 222c and 222d for convenience. The lowermost cover plate support 222a has been assembled "upside down" compared to the others by inserting the legs 212 of cover plate retainer 200 upwardly into vertical slot 198. Therefore, cover plate support 222a has its bulbous plug connector 204 facing downwardly and its resilient spring connector 206 facing upwardly. Remaining cover plate supports 222b, 222c and 222d are assembled as shown in FIGS. 22 to 24 with bulbous plug connector 204 facing upwardly.

After securing cover plate supports 222 to the partition, end face cover plates are provided for attachment between adjacent cover plate supports 222. As shown in FIG. 25a, each end face cover plate 224, labelled 224a, 224b and 224c, is a thin, generally planar member which has a convex, C-shaped transverse cross-section providing wrap around corners 226, and with the convex shape of cover plate 224 defining an inner cavity 228. The wrap around corners 226 are adapted to allow each cover plate 224 to form a snap connection with the resilient spring connectors 206 and to slidingly engage a bulbous plug connector 204 of a cover plate support 200.

Figure 25B:
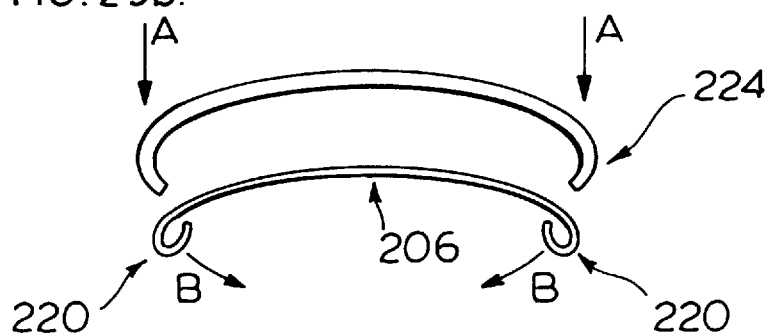
FIG. 25b is a sectional plan view showing the manner in which an end face cover plate is connected to the resilient spring connector of the single cover plate support shown in FIG. 24.
Figure 25C:
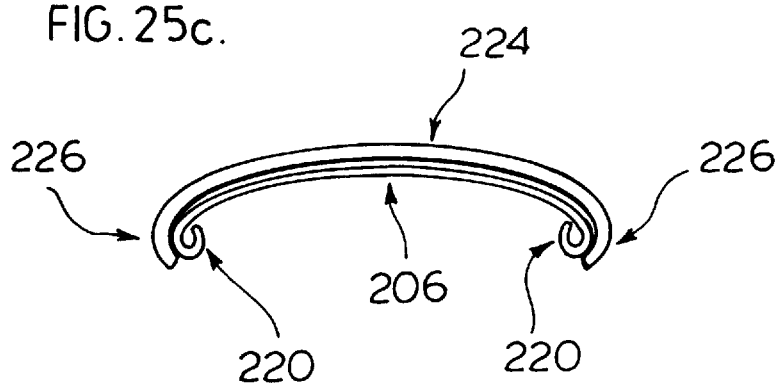
FIG. 25c is a sectional plan view showing the resilient spring connector of FIG. 25a having snapped into engagement with the single cover plate support.

FIG. 25 shows lowermost cover plate 224a in position to be snapped into engagement with resilient spring connectors 206 of cover plate supports 222a and 222b in the manner shown in FIGS. 25b and 25c.

FIGS. 25b and 25c are cross-sectional views in a horizontal plane through a spring connector 206 and an end face cover plate 224, showing the spring connector 206 and cover plate 224 in isolation. FIG. 25b shows cover plate 224 being pressed against spring connector 206 in the direction of arrows A, with wrap around corners 226 of cover plate 224 forcing tips 220 of spring connector 206 to bend inwardly in the direction of arrows B.

End face cover plate 224 is pressed in the direction of arrows A until tips 220 bend sufficiently to snap into wrap around corners 226 as shown in FIG. 25c. Resilient tips 220 then return to their original, unbent configuration and spring connector 206 becomes securely engaged inside cavity 228 of cover plate 224.

The intermediate end face cover plate 224b is shown as being partially installed, with its lower end having been slid downwardly over the upper bulbous plug connector 204 (not shown) of cover plate support 222b. The plug connector 204 is shaped and sized to be securely received in cavity 228 of cover plate 224b.

Once the lower end of end face cover plate 224b has been slid over plug connector 204 of cover plate 222b as described above, the upper end of cover plate 224b is pivoted toward cover plate support 222c and snapped into engagement with its resilient spring connector 206, as described above with reference to cover plate 224a.

FIG. 25a illustrates an uppermost end face cover plate 224c having been installed between cover plate supports 222c and 222d. The lower end of cover plate 224c has been slid into engagement with plug connector 204 (not shown) of cover plate support 222c and the upper end of cover plate 224c has been snapped into engagement with resilient spring connector 206 (not shown) of uppermost cover plate support 222d. As shown in FIG. 25a, the forwardly extending horizontal lips 208 of cover plate supports 222c and 222d are preferably flush with the installed cover plate 224c.

As shown in FIG. 25a, the bulbous plug connector 204 of uppermost cover plate support 222d is exposed at the upper terminal end of the decorative end covering on the end surface 138 of partition 168. Similarly, the bulbous plug connector 204 of lowermost cover plate support 222a will be exposed, facing downwardly, at the lower terminal end of the end covering after attachment of lowermost cover plate 224a. The exposed smoothly rounded surfaces of the bulbous plug connectors 204 provide a decorative appearance to the upper and lower terminal ends of the decorative end covering on partition 168.

In addition, the upper surface of the partition 168 shown in FIG. 25a is provided with a top cover plate 230 being generally convex and positioned on top of the uppermost pair of horizontal beams 2. The plug connector 204 of uppermost cover plate support 222d is preferably flush with the upper surface of top cover plate 230 and provides a smooth transition between the decorative end covering on the end surface 138 of the partition 168 and the top cover plate 230 on the top surface of the partition 168.

In a modular partition system comprising a plurality of partitions according to the present invention, it may be necessary to have two or more partitions meeting at a preselected angle in the manner shown in FIGS. 17 to 19, such that the ends of the partitions converge at a junction. The partitions may all be of the same height or may be of various heights.

The present invention provides a system for providing a decorative covering at the junction at which two or more partitions converge at a preselected angle. Reference is made to FIGS. 26 to 34 and 42 to 51 describing such a system.

FIG. 26 illustrates three partitions 232, 234 and 236 according to the present invention having ends converging at a junction with a preferred preselected angle of about 90°, as measured between adjacent partitions. More specifically, partition 234 converges at the preselected angle with both of partitions 232 and 236, whereas partitions 232 and 236 converge at the preselected angle only with partition 234. The partitions shown in FIG. 26 are identical to those described above, having vertical, rectangular end posts 1 and pairs of horizontal beams 2. The end posts 1 of the respective partitions 232, 234 and 236 are labelled 1a, 1b and 1c for convenience. The partitions 232, 234 and 236 are spaced such that vertically extending gaps are formed between the end faces 134 of posts 1a, 1b and 1c.

End posts 1b and 1c are of identical height and are greater in height than end post 1a. Preferably, as shown in FIG. 26, the pairs of horizontal beams 2 are vertically spaced apart a constant distance D, with each partition having a pair of beams 2 proximate its top and a pair of beams 2 proximate its bottom. The constant spacing D between the pairs of beams 2 allows vertical alignment of adjacent partitions.

FIG. 26 shows the three posts 1a, 1b and 1c being joined by two modular connecting brackets 144a and 144b of the type shown in FIG. 17. When the posts 1 are viewed in a plan view, they preferably have an orientation identical to that shown in FIG. 18, with the modular connecting brackets 144a and 144b connecting the three posts 1 to one another at the preselected angle.

The first step in providing a decorative covering is to insert end plugs 178 into the open ends 172 of each pair of horizontal beams 2 as illustrated in FIG. 20. FIG. 27 shows the partitions of FIG. 26 having end plugs 178 inserted into the ends 172 of each pair of beams 2.

The top and bottom of each partition 232, 234 and 236 shown in FIG. 27 lies in one of three horizontal planes, labelled A, B and C. In plane A, two partitions 234 and 236 converge at 90° to one another, while in planes B and C all three partitions 232, 234 and 236 converge.

A cover plate support is formed proximate plane A, comprising two end plugs 178 and a dual cover plate retainer 238. As shown in the top plan view of FIG. 28, dual cover plate retainer 238 is a generally triangular horizontal plate, having two substantially straight facets 240 converging at 90°, the facets 240 adapted to abut the end faces 134 of posts 1b and 1c, and a third, outward convex side 241 which is adapted to span a vertical gap between the end faces 134 of posts 1b and 1c. As shown in side elevation FIG. 29, each facet 240 has a downwardly extending vertical snap connector 242 which is preferably identical to that shown in FIG. 23 and is preferably connected to the cover plate retainer 238 in the same manner as shown in FIG. 23. The vertical snap connector 242 preferably has two downwardly extending legs 244 and is adapted to snap into engagement with an end plug 178 by insertion of the legs 244 of each snap connector 242 into a slot 198, as described above with reference to snap connector 210 of cover plate retainer 200.

The upper surface 246 of dual cover plate retainer 238 is provided with two bulbous plug connectors 248, each plug connector 248 extending along substantially the entire length of a facet 240. These bulbous connectors 248 are preferably identical in shape and size to plug connector 204 described above.

Extending downwardly from the lower surface 250 of dual cover plate retainer 238 is a resilient spring connector 252 similar in shape to that shown in FIGS. 22 and 23. The spring connecter 252 of dual cover plate retainer 238 extends along substantially the entire outward convex side 241 and preferably has the same convex shape as outward side 241.

Returning to FIG. 27, a cover plate support is provided proximate plane B comprising three end plugs 178 and a triple cover plate retainer 256.

The triple cover plate retainer 256 is shown in the top plan view of FIG. 30 as a generally rectangular horizontal plate, with three substantially straight facets 258 and a fourth, outward concave side 260. As shown in FIG. 31, each of the facets 258 is provided with a vertical snap connector 262 having downwardly extending legs 264, vertical snap connector 262 preferably being identical to that shown in FIG. 23. The legs 264 of each snap connector 262 are inserted into a slot 198 between an end plug 178 and a post 1.

The triple cover plate retainer 256 has an upper surface 266 provided with three bulbous plug connectors 268, each extending along substantially the entire length of a facet 258. The bulbous plug connectors 268 preferably have the same size and shape as bulbous plug connector 204. The triple cover plate retainer 256 has a lower surface 270 which is provided with a resilient spring connector 272 extending along substantially the entire length of concave side 260 and having the same concave shape as side 260.

Proximate lowermost plane C of FIG. 27, a cover plate support is formed from a triple cover plate retainer 256 and three end plugs 178, as at plane B. However, at plane C, the triple cover plate retainer 256 is reversed so that its vertical snap connectors 262 are directed upwardly and inserted into slots 198 formed by end plugs 178 so that the resilient spring connector 272 is extending upwardly. This is analogous to the reversing of single cover plate support 222a shown in FIG. 25a.

FIG. 32 illustrates the partitions of FIG. 27 with cover plate supports proximate planes A, B and C installed on partitions 232, 234 and 236.

To provide a decorative covering over the converging ends of partitions 234 and 236 between planes A and B, a convex vertical gap cover plate 276 is provided between the cover plate supports of planes A and B. Cover plate 276 has a similar configuration to the single cover plate 224 shown in FIG. 25a, having a substantially convex, C-shaped transverse cross-section with wrap around corners 278. The convex cover plate 276 is however wider than the single cover plate 224 since it is adapted to extend across and cover the vertical gap between the end faces 134 of posts 1b and 1c.

The convex cover plate 276 is installed by first securing its lower end to two adjacent bulbous plug connectors 268 on the upper surface 266 of triple cover plate retainer 256 at plane B. For convenience, the bulbous plug connectors 268 of triple cover plate retainer 256 at plane B are labelled 268a, 268b and 268c in FIGS. 30 and 32.

The convex cover plate 276 slidingly engages only plug connectors 268b and 268c, to extend diagonally between end faces 134 of posts 1b and 1c. The wrap around corners 278 of convex cover plate 276 slide down over and engage end points P$_2$ and P$_3$ of plug connectors 268b and 268c respectively, points P$_2$ and P$_3$ being shown in FIG. 30.

The remaining bulbous plug connector 268a on the upper surface 266 of triple cover plate retainer 256 does not engage a cover plate but rather provides a decorative transition between the triple cover plate retainer 256 and the top surface of partition 232, which may preferably be provided with a top cover plate (not shown) similar to that shown in FIG. 25a.

Then, in a similar fashion to end face cover plate 224 shown in FIG. 25a, the upper end of convex cover plate 276 is snapped into secure engagement with resilient spring connector 252 of dual cover plate retainer 238 at plane A. The forward lip 254 of dual cover plate retainer 238 is preferably flush with the outer surface of installed double cover plate 276.

Although the upper surface 266 of triple cover plate retainer 256 is shown in FIGS. 32 and 33 as securing a convex cover plate 276, it is to be understood that each of the bulbous plug connectors 268 are also adapted to secure end face cover plates to the triple cover plate retainer.

FIG. 32 also illustrates a concave vertical gap cover plate 280 to be secured between the triple cover plate retainers 256 at planes B and C and extend across and cover a vertical gap between the end faces 134 of posts 1a and 1c. Because the triple retainer 256 at intermediate plane B has its resilient spring connector 272 directed downwardly and triple cover plate retainer 256 at lowermost plane C has its resilient spring connector 272 directed upwardly, the upper and lower ends of concave cover plate 280 are simply snapped into secured engagement with the resilient spring connectors 272 of the triple cover plate retainers 256 at planes B and C, respectively. The concave cover plate 280 is secured in a similar manner as end face cover plate 224a described above with reference to FIG. 25a.

Like end face cover plate 224 and convex cover plate 276, concave cover plate 280 has wrap around corners 282 to engage resilient spring connector 272. Concave cover plate 280 is also adapted to be secured to the upper surface 266 of triple cover plate retainer 256 by sliding the wrap around corners 282 down over end points P$_1$ and P$_3$ of plug connectors 268a and 268c respectively, so that wrap around corners 282 engage points P$_1$ and P$_3$ and are thereby retained on retainer 256.

Unlike cover plates 224 and 276, cover plate 280 preferably has a concave shape. However, it is to be appreciated that cover plate 280 could be flat or convex, although it is preferred that cover plate 280 does not substantially extend out of the plane of partitions 232 and 236, which meet at 180°.

As in the case of cover plate retainers 200 and 238, triple cover plate retainer 256 has an outwardly extending lip 274 which, when the concave cover plate 280 is installed, is preferably flush with the outer surface of concave cover plate 280.

FIG. 33 illustrates partitions 232, 234 and 236 of FIG. 32 with the convex cover plate 276 and concave cover plate 280 installed thereon.

FIG. 34 illustrates part of a modular partition system in accordance with the invention comprising a plurality of rectangular, upright partitions wherein the ends of four partitions 284, 286, 288 and 290 of the present invention converge at a preselected angle of 90° such that each partition converges with two other partitions at the preselected angle. Partitions 284, 286, 288 and 290 have identical construction, comprising vertical, rectangular end posts 1 and a plurality of pairs of horizontal beams 2.

When four partitions meet as shown in FIG. 34, no vertical cover plates are used to cover the ends of the partitions 284, 286, 288 and 290, which face inward toward one another. Instead, a quadruple horizontal cover plate 292 is provided to cover the rectangular gap between the converging ends of the partitions 284, 286, 288 and 290.

In order to secure quadruple cover plate 292 to the ends of the converging partitions 284, 286, 288 and 290, end plugs 178 are first inserted in the open ends 172 of horizontal beams 2 as shown in FIG. 34 and as discussed above.

Figure 42:
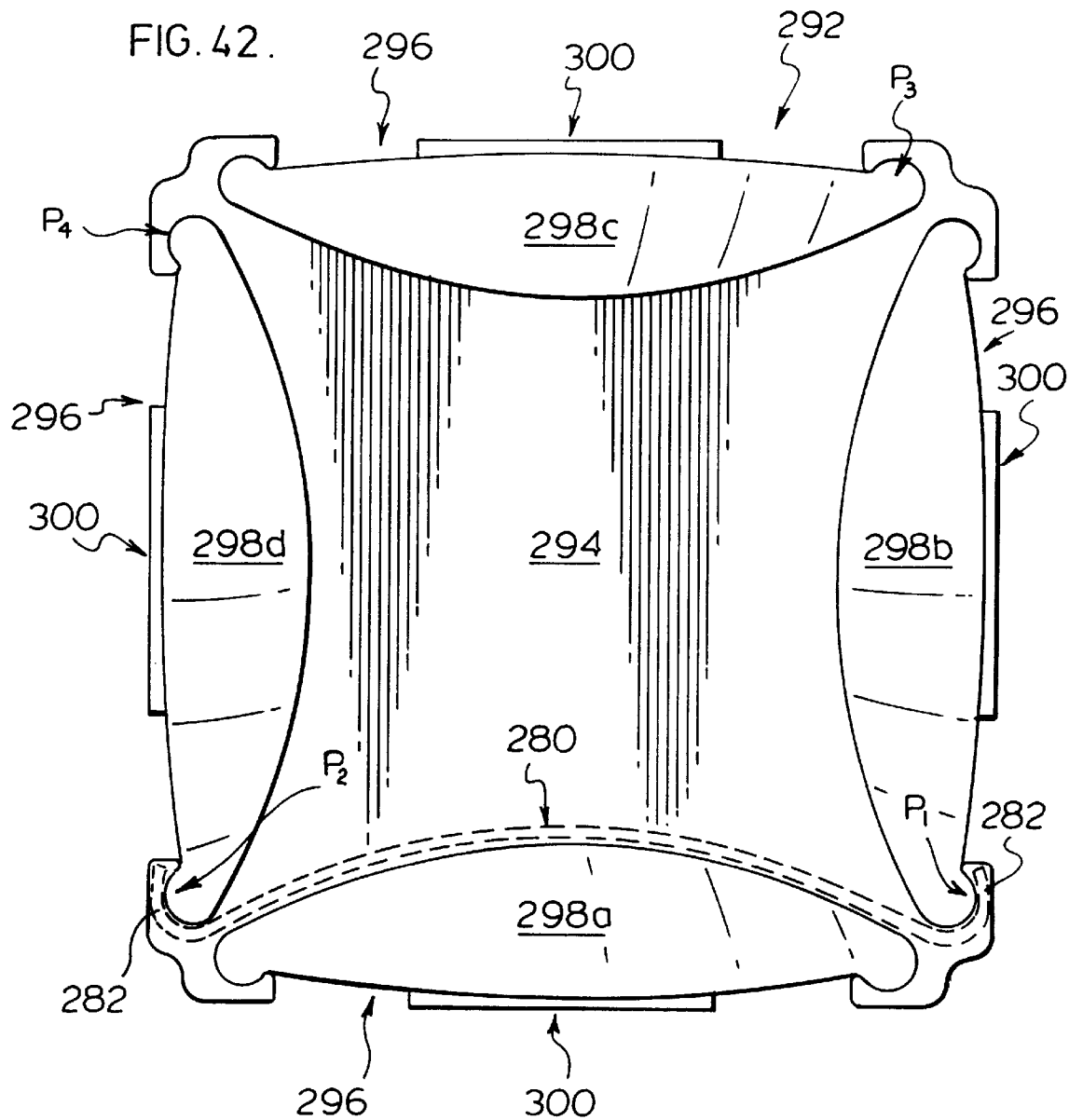
FIG. 42 is a top plan view of the quadruple cover plate support of FIG. 34.

As shown in FIG. 42, the upper surface 294 of cover plate 292 is substantially square in shape, having four identical substantially straight facets 296, each of which is adapted to abut an end face 134 of a post 1 of a respective partition when cover plate 292 is installed.

The quadruple cover plate 292 is secured to end plugs 178 in an identical manner as that discussed above with reference to cover plate retainers 200, 238 and 256. Each facet 296 of horizontal cover plate 292 is provided with a downwardly extending vertical snap connector 300 comprising two legs 302 which snap into engagement with the vertical slot 198 in an identical manner as that discussed above.

The upper surface 294 is provided with four bulbous plug connectors 298 (labelled as 298a, 298b, 298c and 298d), each of which extends along substantially the entire length of a facet 296. The bulbous plug connectors 298 are preferably identical in shape to the bulbous plug connector 204 described above.

In FIG. 34, the four converging partitions 284, 286, 288 and 290 are all of the same height, and horizontal cover plate 292 is connected at the tops of the partitions such that the bulbous plug connectors 298 on horizontal cover plate 292 each provide a decorative transition between the horizontal cover plate 292 and the top surface of one of the partition, which may preferably be provided with a top cover plate (not shown) similar to that shown in FIG. 25a.

Figure 43:
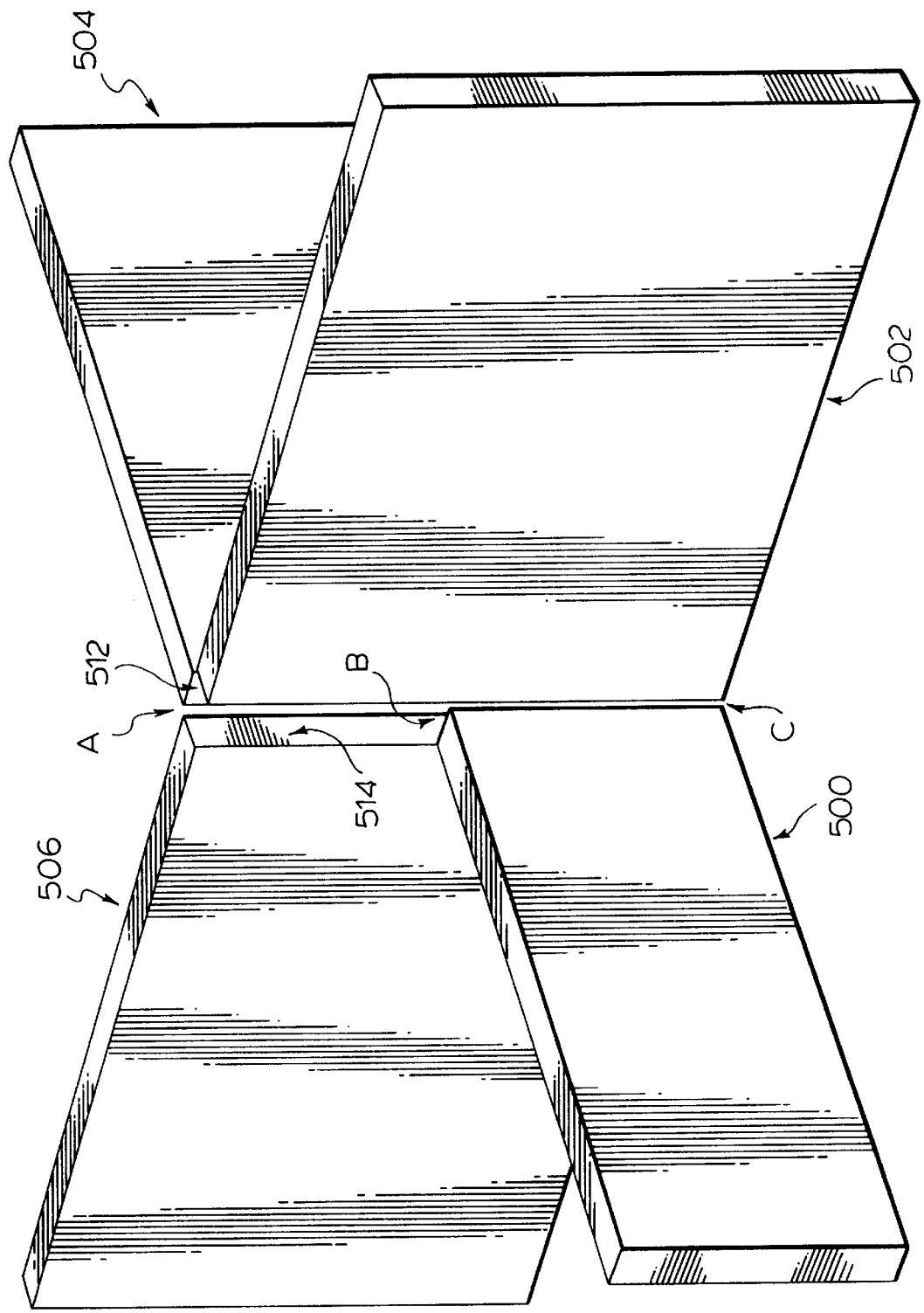
FIG. 43 is a perspective view of four converging partitions.

However, the horizontal cover plate 292 is also useful in configurations where one or more of the four converging partitions is of a different height from the other partitions. Such a configuration is illustrated in FIG. 43 which shows four rectangular partitions 500, 502, 504 and 506 each having a top, a bottom, two end surfaces and opposite front and rear faces. The end surfaces of respective partitions 500, 502, 504 and 506 are labelled as 508, 510, 512 and 514. For clarity, all details of partitions 500, 502, 504 and 506 have been omitted from FIG. 43. However, it is to be appreciated that partitions 500, 502, 504 and 506 may preferably have identical construction as the partitions shown in FIGS. 20, 22, 24, 25a, 26, 27 and 32 to 34.

In FIG. 43, partition 500 is shorter than partitions 502, 504 and 506, which are of the same height.

The top and bottom of each partition shown in FIG. 43 lies in one of planes A, B or C. In preferred partitions of the present invention horizontal beams 2 would be located proximate each of planes A, B and C and end plugs 178 would be inserted into the ends 172 of each pair of beams 2.

To provide a decorative covering at the junction of partitions 500, 502, 504 and 506, a cover plate is provided extending vertically between planes A and B and covering the vertically extending gap between the end faces 510 and 514 of partitions 502 and 506, respectively. It is also desirable to provide a horizontal cover in plane A to cover the horizontal gap between the tops of panels 502, 504 and 506.

Figure 41:
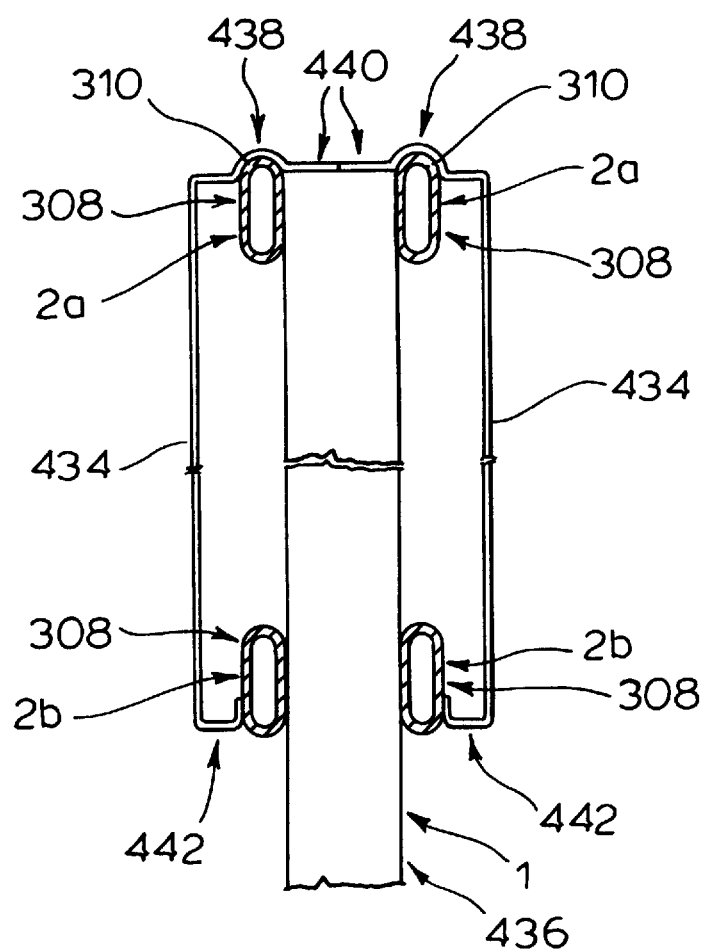
FIG. 41 is an end elevation view of a partition according to the present invention having a simplified cladding panel according to the present invention.
Figure 44:
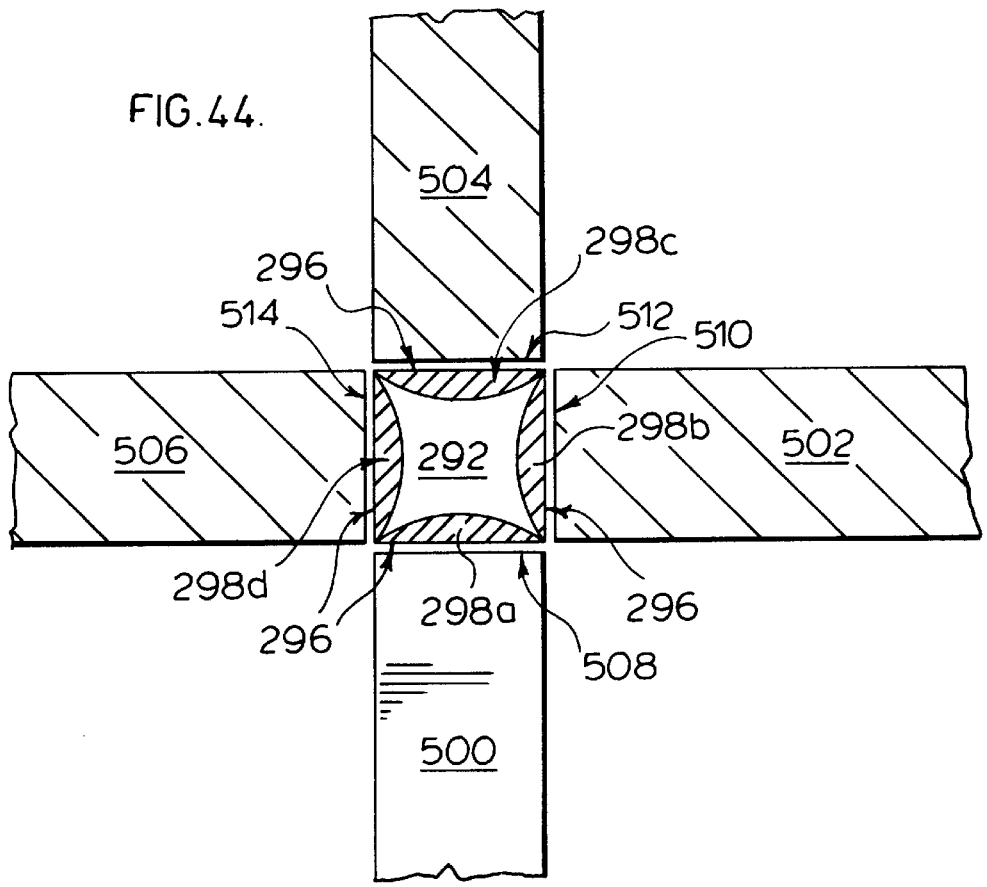
FIG. 44 is a sectional, top plan view of the junction of the four partitions shown in FIG. 43 in plane B of FIG. 43.

FIG. 44 is a cross-sectional view of the junction of partitions 500, 502, 504 and 506 in intermediate plane B along the top of the shortest partition 500 and extending through the taller partitions 502, 504 and 506. At plane B, a quadruple cover plate 292 identical to that shown in FIGS. 34 and 41 is connected to the end faces of each partition 500, 502, 504 and 506. Although for clarity FIG. 44 (as well as FIGS. 45 and 47) shows a space between each facet 296 and the end surface of a partition, it is to be understood that the facets and the end surfaces are in substantial abutment with one another.

Quadruple cover plate 292 has a downwardly extending vertical snap connector identical to connector 300 comprising two legs 302 which snap into engagement with a vertical slot 198 between an end plug 178 and an end surface of a partition. For convenience and clarity, all details of the connections between cover plate 292 and the partitions has been omitted from FIG. 44. Furthermore, bulbous plug connectors 298, labelled 298a, 298b, 298c and 298d in FIG. 44, have been simplified for convenience and clarity.

Figure 45:
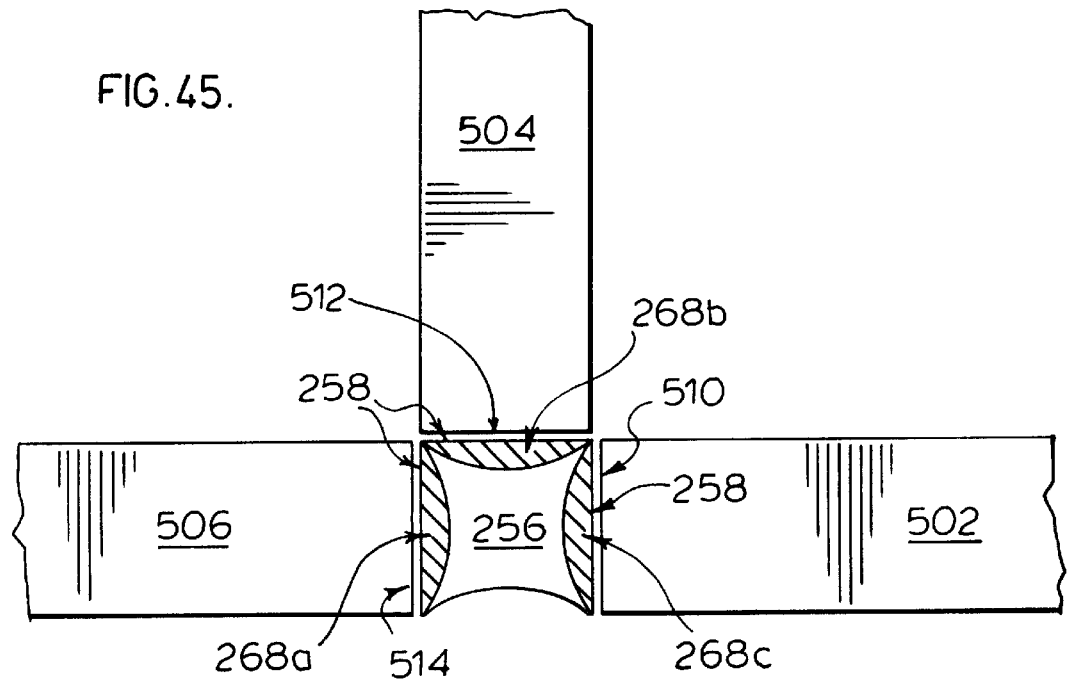
FIG. 45 is a sectional, top plan view of the three partitions converging in plane A of FIG. 43.

FIG. 45 is a cross-sectional view of the partitions of FIG. 43 converging in uppermost plane A along the tops of the taller partitions 502, 504 and 506. The shorter partition 500 does not converge with the other partitions in plane A and has therefore been omitted from FIG. 45 for clarity.

As shown in FIG. 45, a triple cover plate retainer 256 is provided in the gap between the end surfaces of partitions 502, 504 and 506. The triple cover plate retainer 256 is identical to that shown in FIG. 30. As in FIG. 44, all details of the connection between triple cover plate retainer 256 and partitions 502, 504 and 506 have been omitted for convenience and clarity, and furthermore details of retainer 256 have been omitted for clarity. The bulbous plug connectors 268 on the upper surface 266 of triple cover plate retainer 256 provide a decorative transition between the triple cover plate retainer 256 and the top surfaces of partitions 502, 504 and 506, which may preferably be provided with a top cover plate (not shown) similar to that shown in FIG. 25a.

A concave cover plate 280 identical to that shown in FIGS. 32 and 33 is releasably coupled at its upper end to the triple cover plate retainer 256 in plane A and at its lower end to quadruple cover plate 292 in plane B in the following manner, with reference to FIG. 42. The lower end of concave cover plate 280 is slid down over end points $P_1$ and $P_2$ of respective bulbous plug connectors 298b and 298d so that wrap around corners 282 of cover plate 280 curve inwardly around points $P_1$ and $P_2$ on plug connectors 298b and 298d, respectively. The front face of cover plate 280 engages the inwardly extending front of bulbous plug connector 298a, bulbous plug connector 298a abutting the end surface 508 of shortest partition 500. The positioning of cover plate 280 on retainer 292 is illustrated in FIG. 42 in dotted lines.

The upper end of cover plate 280 is attached to triple cover plate retainer 256 in an identical manner as shown in FIG. 32. Specifically, the wrap around corners 282 of cover plate 280 are snapped into secured engagement with the resilient spring connector 272 of triple cover plate retainer 256.

Although in the configuration of converging panels shown in FIG. 43 a concave cover plate 280 is secured between planes A and B, it is to be appreciated that the bulbous plug connectors on quadruple cover plate retainer 292 could be used to secure other types of cover plates. For example, if partition 502 was the same height as partition 500 and only partitions 504 and 506 extended upwardly from plane B to plane A, a convex cover plate 276 would be provided between the quadruple cover plate 292 in plane B and a double cover plate retainer 238 connected to partitions 504 and 506 in plane A. In such a configuration, the wrap around corners 278 of convex cover plate 276 would slidingly engage only bulbous plug connectors 298c and 298d of quadruple cover plate 292 at points $P_2$ and $P_3$, as shown in FIG. 3. Furthermore, if both partitions 502 and 504 were of the same height as partition 500 such that only partition 506 extended upwardly between plane B and plane A, a cover plate retainer 200 would be attached to the end surface 514 of partition 506 in plane A. An end face cover plate 224 would then be connected at its lower end to bulbous plug connector 298d and at its upper end to the single cover plate retainer 200, with the wrap around corners 226 of end face cover plate 224 engaging end points P₂ and P₄ on bulbous plug connector 298d.

Figure 46:
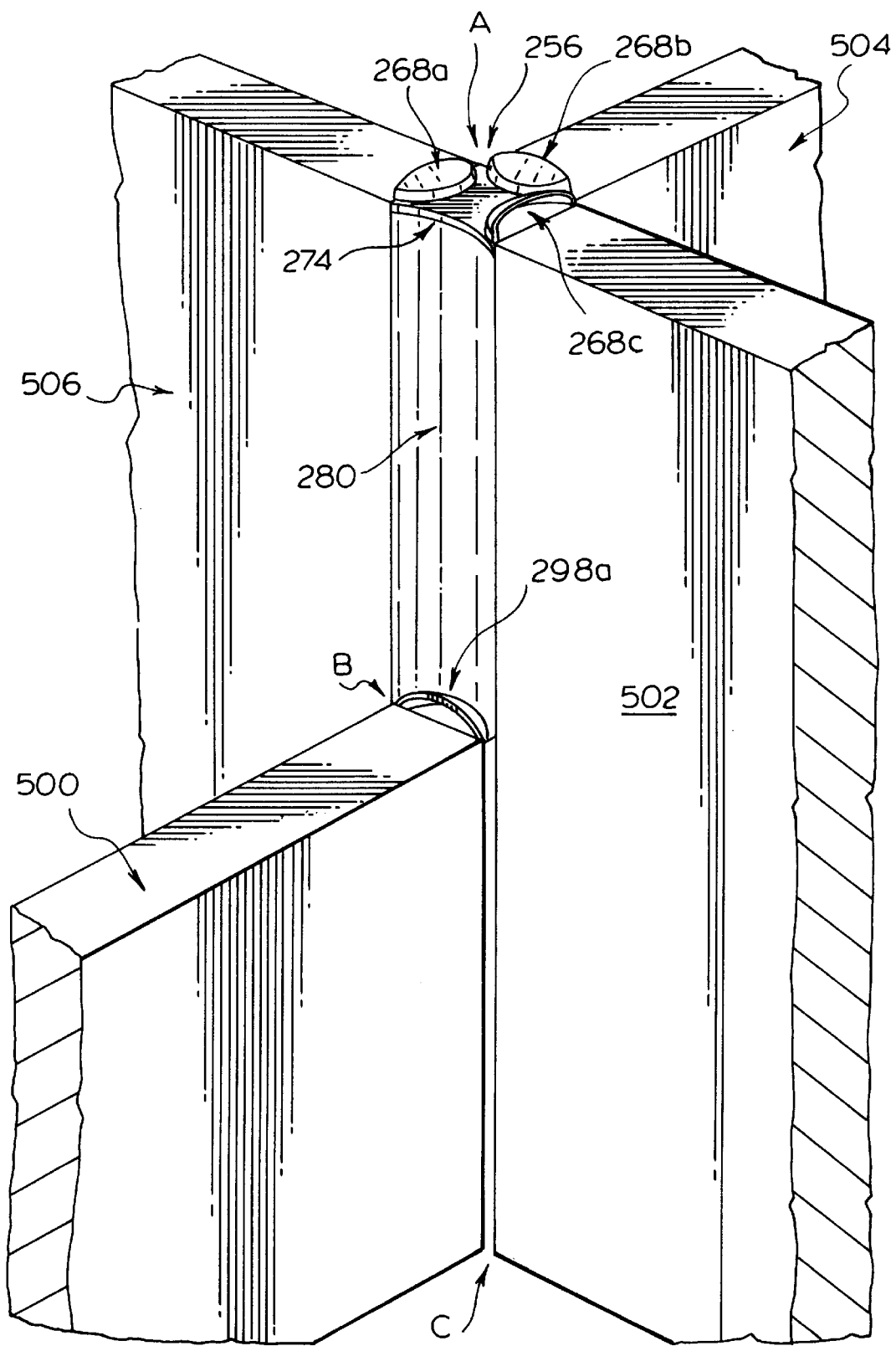
FIG. 46 is a perspective view of decorative covering according to the present invention as installed on the four converging partitions of FIG. 43.

FIG. 46 illustrates converging partitions 500, 502, 504 and 506 after concave cover plate 280 has been installed between planes A and B. As shown in FIG. 46, cover plate 280 covers the vertical gap between partitions 502 and 506, with triple cover plate retainer 256 covering the gap between the tops of the partitions. Bulbous plug connector 298a of quadruple cover plate 292 is visible at plane B and provides a decorative transition to the top of partition 500 which may be provided with a top cover plate (not shown) similar to that shown in FIG. 25a. Similarly, the bulbous plug connectors 268a, 268b and 268c of triple cover plate retainer 256 provide decorative transitions to the tops of partitions 506, 504 and 502, respectively.

Figure 47:
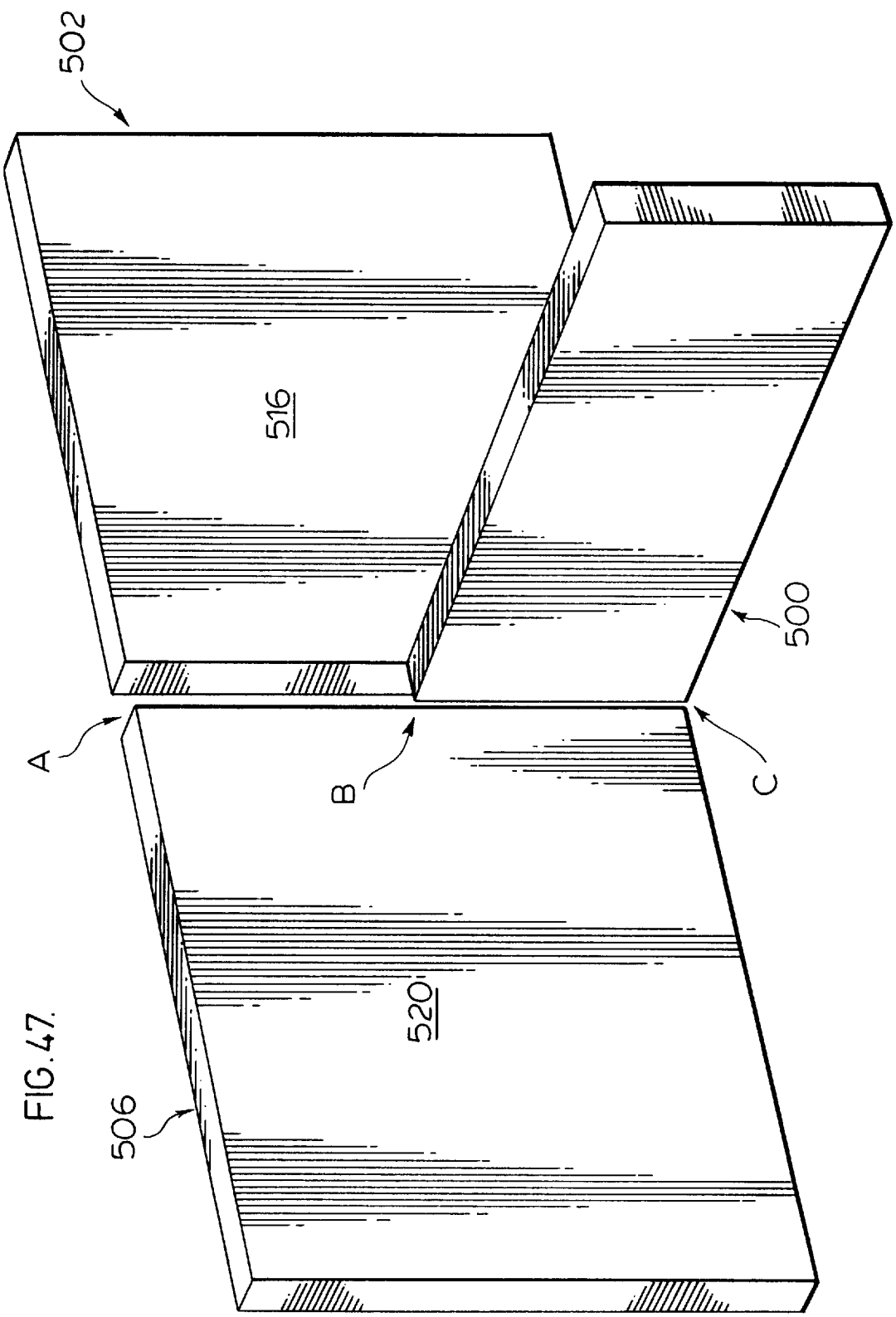
FIG. 47 is a perspective view showing three converging partitions.

FIG. 47 shows an alternate configuration of converging partitions, which is identical to that shown in FIG. 43 with the exception that partition 504 has been eliminated. To provide a decorative appearance at the junction of the three partitions 500, 502 and 506, it is desirable to provide three concave cover plates 280, a first concave cover plate 280 extending between planes A and B at the front faces 516 and 520 of partitions 502 and 506, respectively, a second concave cover plate 280 between planes A and B at the rear faces 518 and 522 of partitions 502 and 506, respectively, and a third cover plate between planes B and C at the rear surfaces 518 and 522. It is also desirable to provide a horizontal cover in plane A to cover the gap between partitions 502 and 506.

Figure 48:
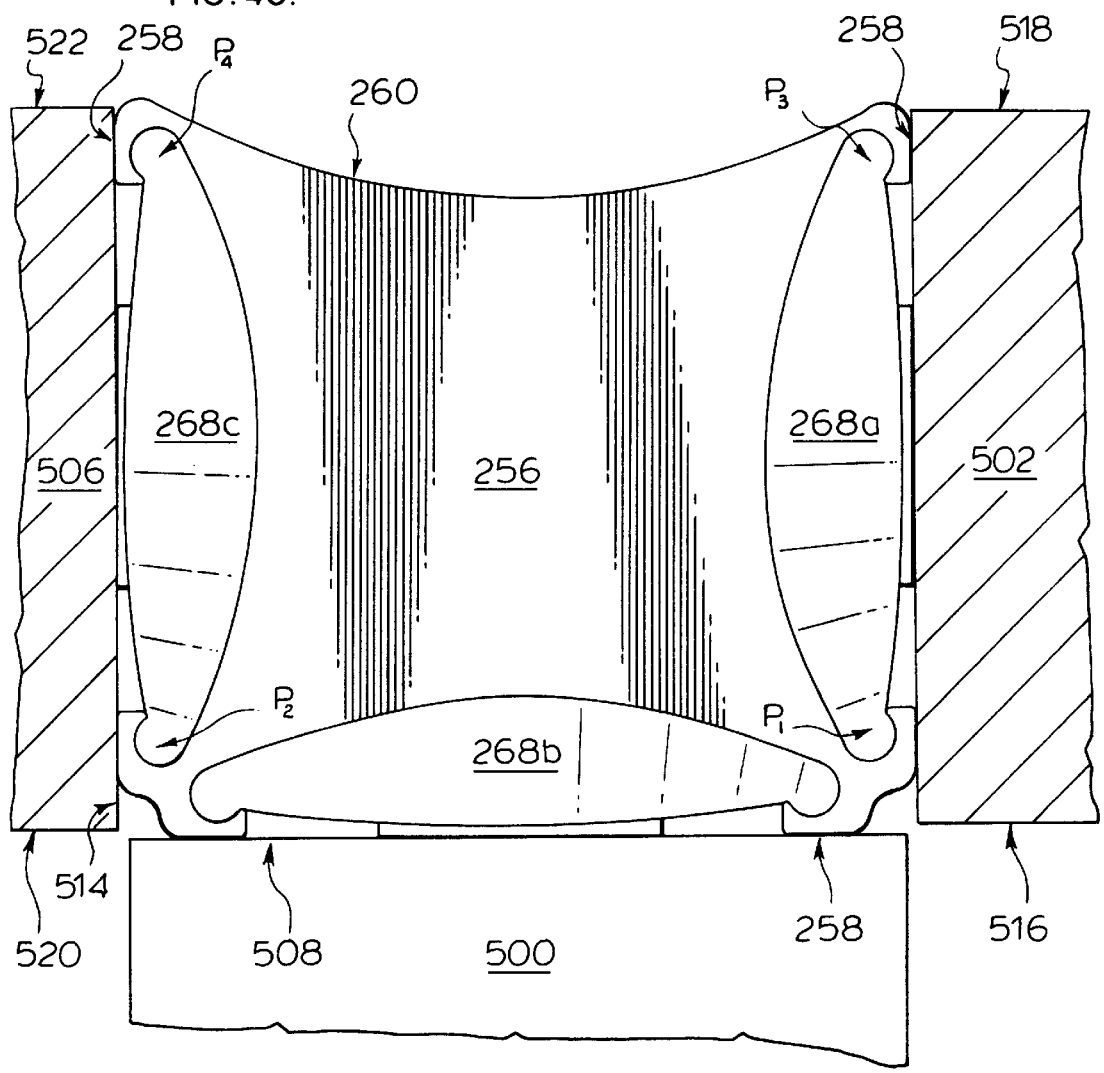
FIG. 48 is a sectional, top plan view of a triple cover plate retainer positioned in the junction of the three partitions shown in FIG. 47 at plane B thereof.

In planes B and C, all three partitions converge. Therefore, a triple cover plate retainer 256 is provided at the junction of the three partitions at planes B and C as shown in FIG. 48, representing a cross-sectional view of the junction of the three partitions in plane B.

Figure 49:
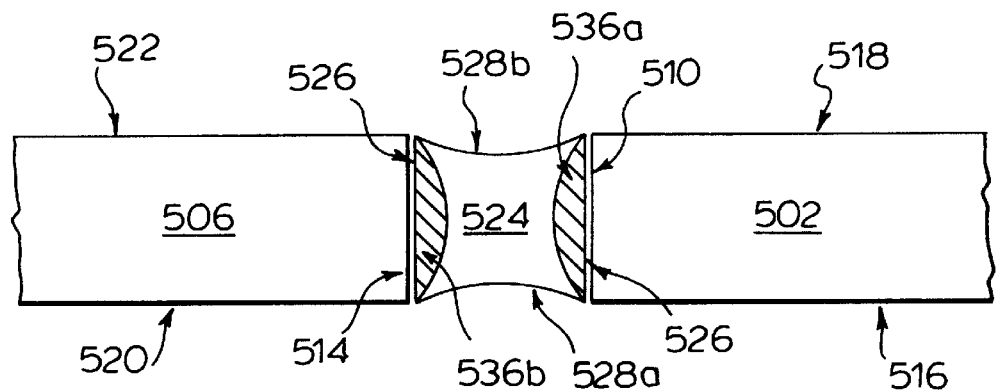
FIG. 49 is a sectional, top plan view of the partitions converging in plane A of FIG. 47, showing a rectangular cover plate retainer positioned at the junction of the partitions.

FIG. 49 is a cross-sectional view of the junction of the converging panels at plane A along the tops of partitions 502 and 506. For clarity, partition 500 is not shown in FIG. 49 since it does not converge with the other panels in plane A. Spanning the gap between the end surfaces of partitions 502 and 506 is a rectangular cover plate retainer 524 comprising a generally rectangular horizontal plate having two substantially straight facets 526 opposite one another, each facet 526 adapted to abut an end surface of partition 502 or 506. Rectangular cover plate retainer 524 also has two opposite, outward concave sides 528 (labelled 528a and 528b) extending across the vertical gap between the end surfaces of partitions 502 and 506. The upper surface 534 of rectangular cover plate retainer 524 is provided with two bulbous plug connectors 536, labelled 536a and 536b for convenience, each plug connector 536 extending along substantially the entire length of a facet 526. The bulbous plug connector 536 on the upper surface 534 of rectangular cover plate retainer 524 do not engage a cover plate but rather provide a decorative transition between the rectangular cover plate retainer 256 and the top surfaces of partitions 502 and 506, which may preferably be provided with a top cover plate (not shown) similar to that shown in FIG. 25a.

Figure 50:
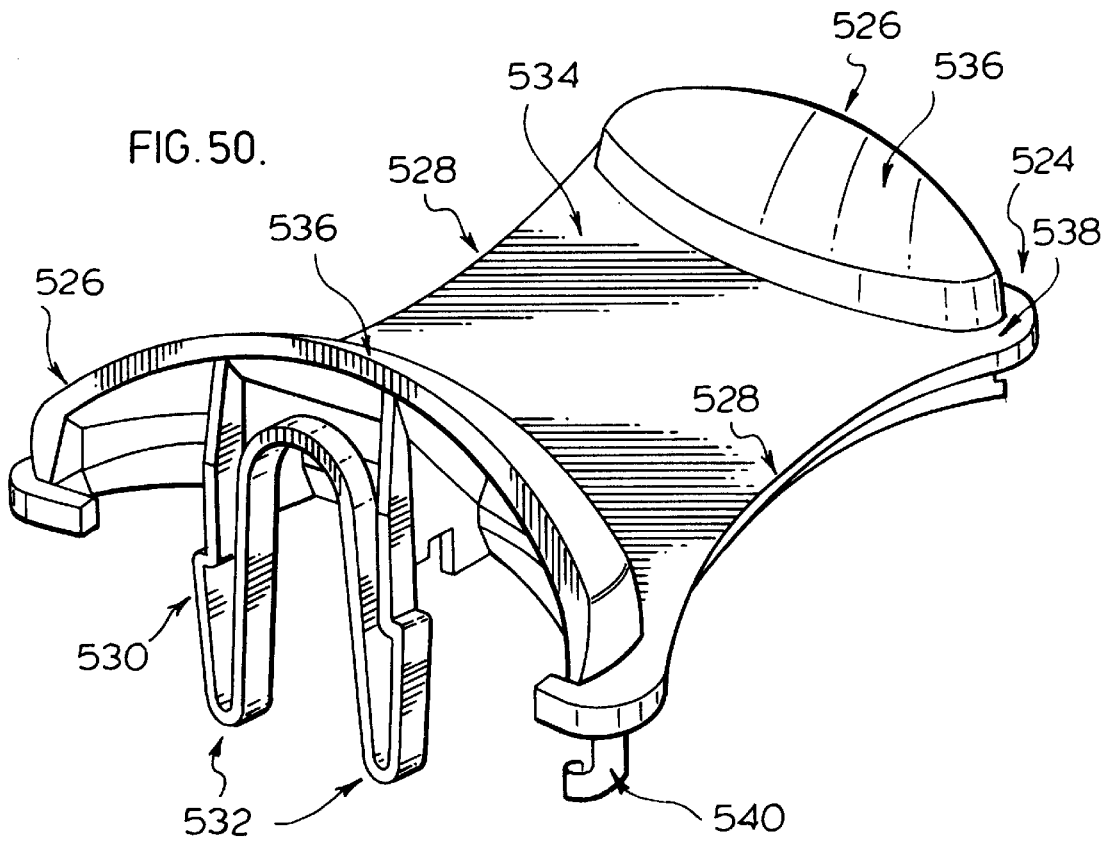
FIG. 50 is a perspective view of the rectangular cover plate retainer shown in FIG. 49.

Although details of the appearance of the rectangular cover plate retainer 524 have been omitted for clarity from FIG. 49, FIG. 50 is a perspective view of a preferred rectangular cover plate retainer 524 according to the present invention, showing that cover plate retainer 524 has bulbous plug connectors 536 having the same configuration as plug connector 204, and having a downwardly extending vertical snap connector 530 identical to snap connector 210 of cover plate retainer 200 described above, having two downwardly extending legs 532 which are adapted to snap into engagement with an end plug 178 by insertion of the legs 532 into a slot 198 as described above. In addition, the rectangular cover plate retainer 524 is provided with a peripheral lip 538 extending outwardly of the bulbous plug connectors and along outward sides 528 to provide support for concave cover plates 280 extending upwardly therefrom. Furthermore, the lower surface of the rectangular cover plate retainer 524 is provided with two resilient spring connectors 540, each preferably being identical to resilient spring connector 272 of triple cover plate retainer 256 described above extending along substantially the entire length of a concave side 528 of rectangular cover plate retainer 524.

Figure 51:
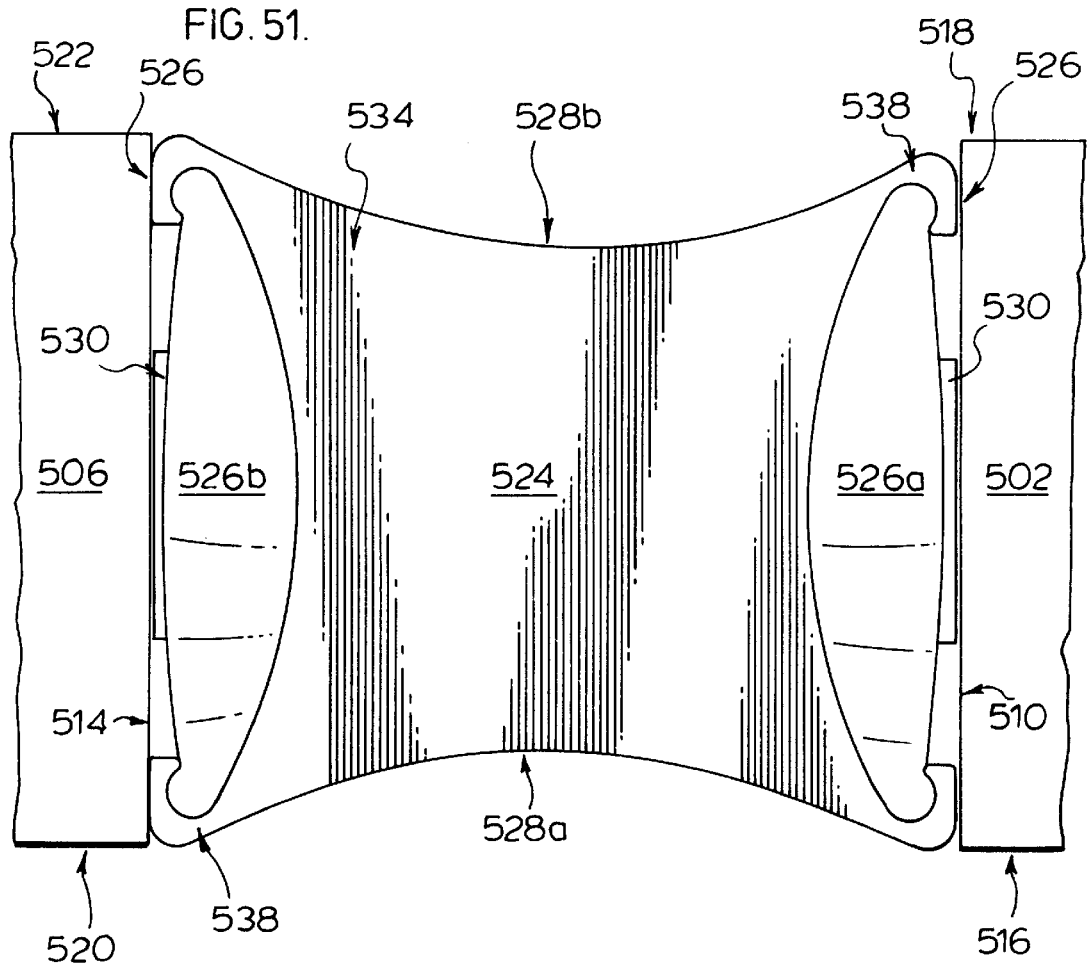
FIG. 51 is a top plan view of rectangular cover plate retainer shown in FIG. 49 as positioned between the two partitions of FIG. 47 which converge in plane A.

FIG. 51 shows rectangular cover plate retainer 524 positioned in the gap between the end surfaces of partitions 502 and 506, however eliminating all detail of the connection of retainer 524 to the partitions. Similarly, FIG. 48 shows a triple cover plate retainer 256 in position at the junction of partitions 500, 502 and 506 at plane B. The attachment of the concave cover plates 280 to the cover plate retainers will now be described.

A first concave cover plate 280 is secured to the rectangular cover plate retainer 524 in plane A and triple cover plate retainer 256 in plane B and extends across the vertical gap between partitions 502 and 506 along the plane of front surfaces 516 and 520 of partitions 502 and 506. This first concave cover plate 280 is secured to cover plate retainer 256 at plane B with its wrap around corners 282 slidingly engaging end point P₁ of bulbous plug connector 268a and end point P₂ of bulbous point connector 268c and curving inwardly of the inward projecting side of bulbous plug connector 268b in an analogous manner as that shown in FIG. 42.

The upper end of cover plate 280 is snapped into engagement with the resilient spring connector 540 on a first outward side 528a of the rectangular cover plate retainer 524 in an identical manner as discussed above with reference to FIGS. 32 and 33. When the concave cover plate 280 is installed, the lip 538 of rectangular cover plate retainer 524 is preferably flush with the outwardly facing surface of concave cover plate connector 280 to provide a decorative appearance.

Second and third concave cover plate retainers 280 are provided along the rear faces 518 and 522 of partitions 502 and 506 respectively to cover the vertical gap therebetween, the second concave cover plate extending between planes A and B, and the third cover plate 280 extending between planes B and C. The lower end of the second cover plate 280 slidingly engages bulbous plug connectors 268a and 268c on the upper surface of the triple cover plate retainer at plane B in an identical manner as that discussed above with reference to FIGS. 32 and 33, such that the wrap around corners 282 of cover plate 280 engage end point P₃ on plug connector 268a and end point P₄ on plug connector 268c. The upper end of cover plate 280 snaps into engagement with a second spring connector 540 on a second outward side 528b of quadruple cover plate retainer 544 in an identical manner as discussed above with reference to the first cover plate 280.

The third concave cover plate 280 is then installed between planes B and C by snapping into engagement with the resilient spring connector 272 of triple cover plate retainer 256 at plane B and slidingly engaging bulbous plug connectors of the triple cover plate retainer 256 at plane C in the manner described above with reference to FIG. 48. Alternatively, the lower triple cover plate retainer 256 at plane C may be installed "upside-down" in the manner shown in FIGS. 27 and 32. In this case, the third cover plate 280 would engage the upwardly extending resilient spring connector 272 of triple cover plate retainer 256 at plane C.

Although partitions 502 and 506 are shown in FIG. 47 as having identical height, the present system may also be adapted to a configuration wherein partition 506 extends upwardly above partition 502. In such configuration, a cover plate retainer 200 is preferably provided on the end surface of partition 506 at the top thereof, and an end face cover plate 224 is provided over the end surface of partition 506 extending upwardly from plane A to the top of partition 506. In such a configuration, the lower end of cover plate 224 would slidingly engage bulbous plug connector 536b of rectangular cover plate retainer 524 and the upper end of cover plate 224 would snap into engagement with resilient spring connector 206 of cover plate retainer 200.

Therefore, the plug connectors 536 of rectangular cover plate retainer 544 are adapted both to provide a decorative appearance at the upper terminal end of a partition or to slidingly engage an end face cover plate 224 or a concave cover plate 280.

Figure 52:
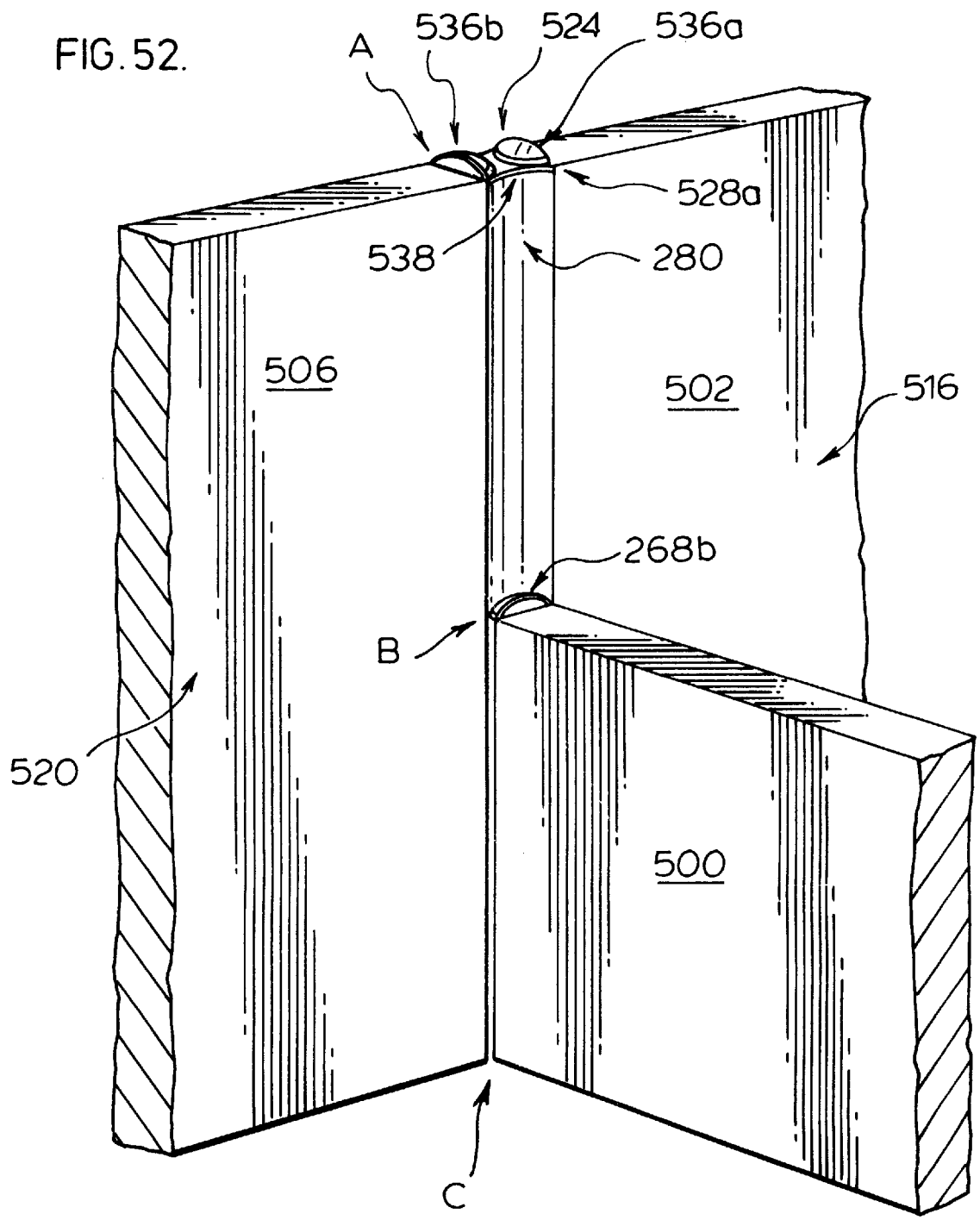
FIG. 52 is a perspective view showing a decorative covering according to the present invention provided on a first side of the junction of the converging partitions of FIG. 47.

FIG. 52 illustrates partitions 500, 502 and 506 having the first concave cover plate 280 installed thereon between planes A and B. The bulbous plug connector 268b of triple cover plate retainer 256 at plane B is visible and provides a decorative transition to the top of partition 500 which may be provided with a top cover plate (not shown) such as that shown in FIG. 25a. Similarly, bulbous plug connectors 536a and 536b of rectangular cover plate retainer 524 provide a decorative transition to the top of partitions 502 and 506. Furthermore, the lip 538 of rectangular cover plate retainer 524 is flush with the outer surface of cover plate 280.

Figure 53:
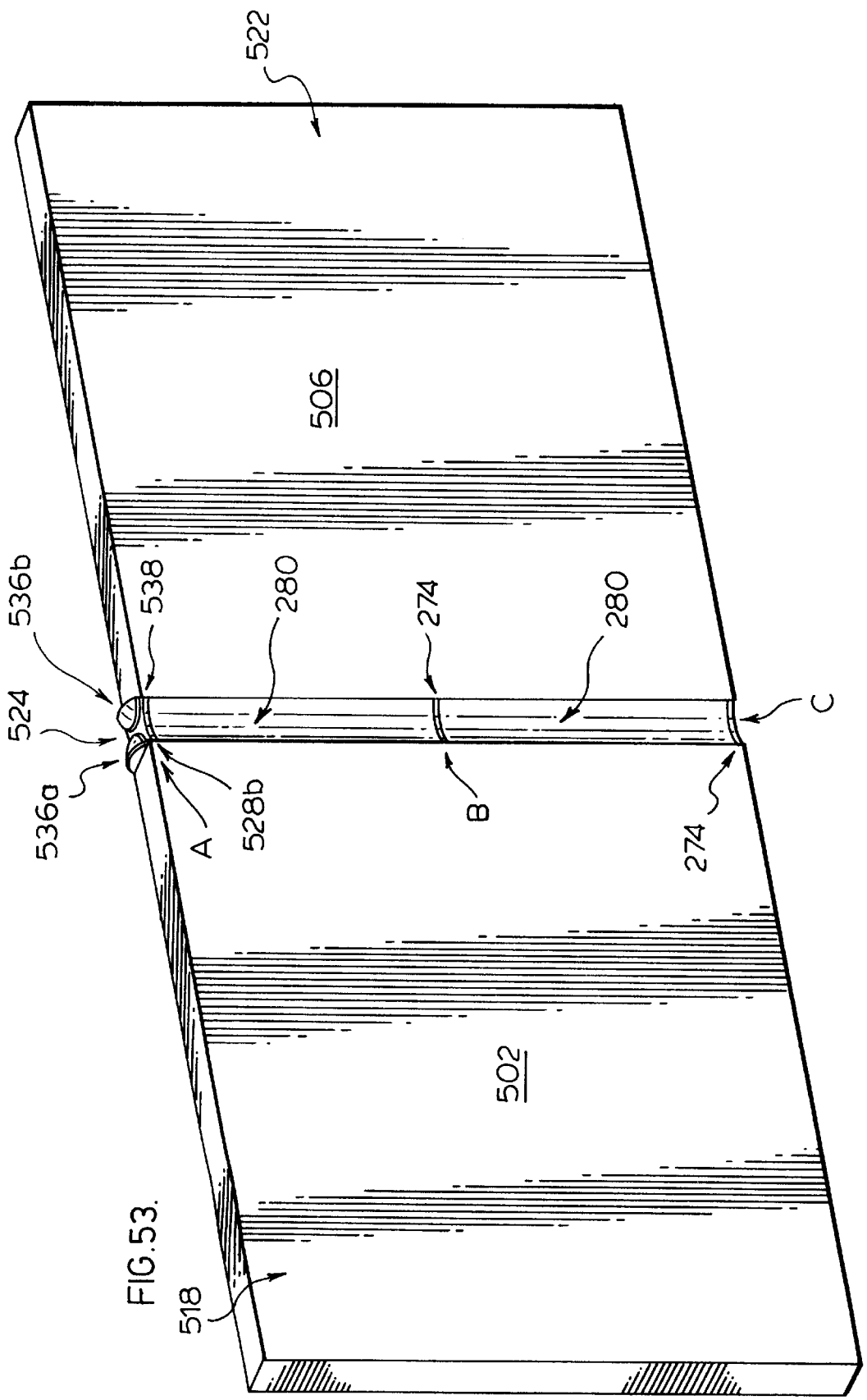
FIG. 53 is a perspective view of a second side of the converging partitions of FIG. 47 showing the decorative covering according to the present invention provided thereon.

FIG. 53 illustrates the reverse side of partitions 502 and 506 to show the second and third cover plates 280. Second cover plate 280 is shown as extending between planes A and B, and third cover plate 280 is shown as extending between planes B and C. Only the lips 274 of triple cover plate retainers 256 are visible at planes B and C and are flush with the outer surface of second and third cover plates 280. At plane A, the lip 538 on second outward side 528b of rectangular cover plate retainer 524 is flush with the outer surface of second cover plate 280.

Although the drawings herein show partitions converging at a preferred preselected angle of 90°, it is to be appreciated that the present invention also includes within its scope modular partition systems in which the partitions converge at a predetermined angle other than 90°. For example, it may be desirable in some systems to have the partitions converging at an angle of 60°. Furthermore, it may be preferred to have a system wherein most of the partitions converge with one another at 90° and some of the partitions converge at another predetermined angle, for example 60°.

Reference is now made to FIGS. 35 and 36 which illustrate one type of preferred modular panel clip 314 according to the present invention useful for coupling cladding panels to a partition. Panel retaining clip 314 is secured between a pair of horizontal beams 2 by firstly, inserting panel clip 314 between beams 2 with its front surface 316 and its rear surface 318 (not shown) substantially parallel to beams 2, as shown in FIG. 35. Panel retaining clip 314 is then rotated by 90° about vertical axis A, shown in FIG. 35, to adopt the orientation shown in FIG. 36, which shows panel retaining clip 314 securely engaged between two beams 2 with its front surface 316 facing end post 1 and transverse to the horizontal beams 2.

As seen in FIG. 35 each beam 2 of partition 304 has a substantially flat inward face 306, a substantially flat outward face 308 opposite the inward face 306, a smoothly rounded upper surface 310 and a smoothly rounded lower surface 312.

As shown in FIG. 36, side surfaces 320 of panel clip 314 form a tight friction fit with horizontal beams 2 to securely retain clip 314 in the position shown in FIG. 36. Side surfaces 320 each have an upper engaging portion 322 which engages the upper surface 310 of a beam 2, a side engaging portion 324 which engages the inward face 306 of a beam 2, and a lower engaging portion 326 which engages the lower surface 312 of a beam 2.

FIG. 36 shows panel clip 314 having a pair of upper resilient arms 328 extending outwardly above beams 2 adapted to securely retain a top cover plate 230, the same as top cover plate 320 shown in FIG. 25a. Top cover plate 230 has a generally C-shaped convex transverse cross-section with wrap around corners 332. Top cover plate 230 is installed by pressing it down over resilient arms 328 until tips 334 of resilient arms 328 snap into engagement with wrap around corners 332, becoming securely engaged therein. This is analogous to the securing of single cover plate 224 discussed above with reference to FIGS. 25a, 25b and 25c. To retain top cover plate 230 in place on top of partition 304, it is to be understood that at least two panel retaining clips 314 must be provided, one clip 314 preferably positioned proximate each end of a pair of beams 2.

FIG. 36 also shows panel clip 314 as having a pair of lower legs 336, each extending under and outwardly of a beam 2. These lower legs 336 function to retain a cladding panel, as more fully discussed below.

As shown in FIG. 37, panel clip 314 preferably comprises an upper section 338 and a lower section 340, which may preferably be easily connected and disconnected. The provision of separate, connectable sections enhances the modularity of panel clips of the present invention. Different sections can be joined together to build panel clips having various functions.

Sections 338 and 340 have respective flat vertical mating surfaces 342 and 344 adapted to abut one another, with upper horizontal mating ledge 346 and lower horizontal mating ledge 348 of upper section 338 abutting upper horizontal mating ledge 350 and lower horizontal mating ledge 352 of lower section 340, respectively.

To retain upper section 338 and lower section 340 against movement relative to one another when they are connected, a key 354 is provided on upper section 338 which is closely received in keyhole 356 in lower section 340.

FIG. 38 illustrates a side perspective view of a partition 358 according to the present invention, partition 358 being joined end to end with another partition 359, preferably in the manner discussed above with reference to FIGS. 15 and 16.

FIG. 39 is a schematic cross-sectional end view through partition 358 along line 39—39 in FIG. 38. Partition 358 comprises end posts 1 and four pairs of horizontal beams 2. FIG. 39 illustrates five different configurations of clips adapted to secure different elements to the partition. These five clips are from top to bottom:

clip 360 between beams 2a;
clip 370 between beams 2b;
clip 390 secured to inner faces of the posts 1;
clip 410 secured between beams 2c; and
clip 422 secured between beams 2d.

Each of the clips are formed from two sections snap fitted together in the same manner as the clip 314 shown in FIG. 37, however with different sections which have different purposes as will become apparent.

Secured to the uppermost pair of beams 2a of partition 358 is a first panel retaining clip 360 having an upper section 338 identical to that shown in FIG. 37 with upwardly extending resilient arms 328 to retain a top cover plate 330 (not shown). Lower section 362 of clip 360 is adapted to retain an upper end of a pane of glass 364, having a slot 366 in which glass 364 is received.

The second panel retaining clip 370 retained between horizontal beams 2b comprises an upper section 372 and lower section 340. The upper section 372 retains the lower end of pane of glass 364 in slot 374 identical to slot 366 in lower section 362 of clip 360. The lower section 340 of clip 370 is identical to the lower section 340 of panel clip 314 shown in FIG. 37. The lower section 340 has lower legs 336 adapted to engage and retain the upper end of a cladding panel as is described below.

As shown in FIGS. 38 and 39, two decorative sashes 368, each of which is an elongate, thin sheet-like cover member, are provided at the upper and lower edges of glass 364 to conceal the clips 360 and 370 and cover the gap between the pairs of beams 2a and 2b, respectively. As shown in FIG. 38, sash 368 preferably extends into and is retained in snap fit in slots 366 and 374 of clips 360 and 370, respectively.

Figure 40:
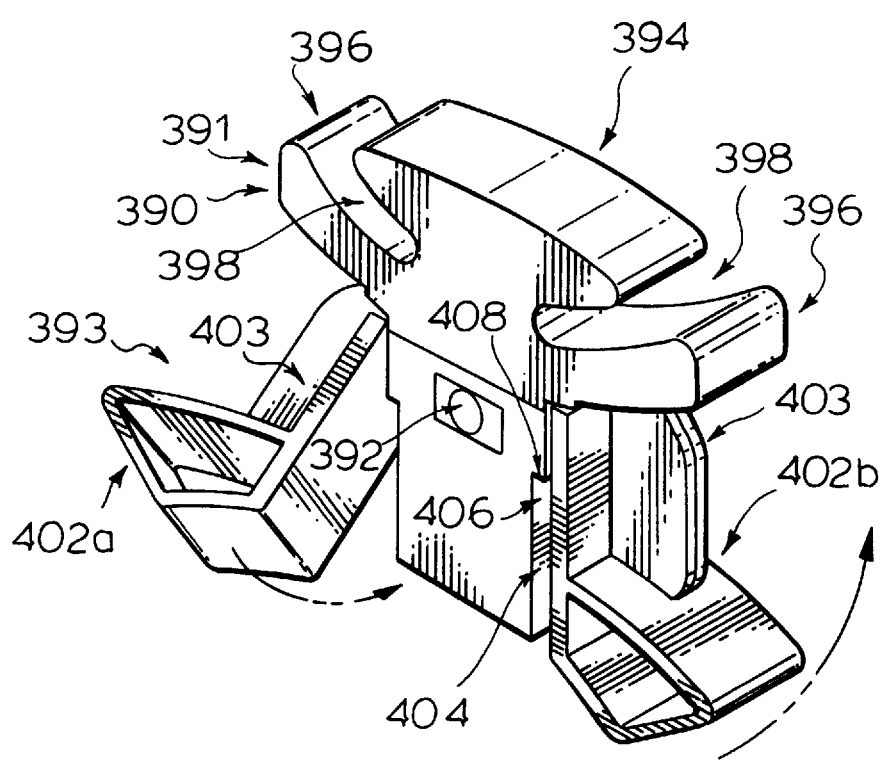
FIG. 40 is a perspective view of a modular panel clip of FIG. 39.

The third panel retaining clip 390 is shown in FIG. 39 as being located between pairs of beams 2b and 2c to secure the lower end of a cladding panel and the upper end of a cladding panel as described below. This panel clip 390 is shown in isolation in FIG. 40. Like panel clip 314, clip 390 may comprise separate upper and lower sections which are snap fitted together. Panel clip 390 is not retained between a pair of horizontal beams 2 and therefore does not have a side surface shaped to secure the retaining clip 390 between a pair of beams 2. Rather, retaining clip 390 has a hole 392 through which a screw (not shown) may preferably be provided to secure panel clip 390 to the inner face of a vertical post, such as an end post 1. Clip 390 has an upper section 391 and a lower section 393. The upper section 391 is adapted to engage a lower end of a cladding panel as is described later. The lower section has a head 394 and a pair of outwardly and upwardly extending arms 396. A downwardly inclined slot 398 is formed between head 394 and each arm 396. The lower section 393 has legs 402 adapted to engage the upper end of a cladding panel.

Clip 410 between beams 2c has an upper section 395 having a head 394 and arms 396 identical to those of upper section 391 of clip 390 adapted to receive the lower end of a cladding panel. Clip 410 has a lower section 397 having lower legs 336 identical to those of lower section 340 of clip 370 and adapted to receive an upper end of a cladding panel.

Clip 422 between beams 2d has an upper section 399 having a head 394 and arms 396 identical to those of upper section 391 of clip 390 and adapted to receive a lower end of a cladding panel. Clip 422 has a lower section 411 specialized for coupling between the post 1 and a cast metal body 4a carrying adjustable legs 4. The clip 422 is not retained in place only by beams 2d. Rather, it is provided with a slot 432 which fits over cast metal body 4a between threaded shaft 4d and upper flange 4c, shown in FIG. 3.

The securement of the cladding panels to the partition through use of the clips is now described with reference to FIG. 39. FIG. 39 shows two cladding panels 5b and 5 similar to the cladding panels shown in FIG. 1. Each cladding panel 5b, 5 carries on its rear surface two vertically extending coupling brackets 401, one located near each end of the panel and adapted for releasable engagement with two correspondingly spaced clips carried on the partition.

For example, cladding panel 5 is shown in FIG. 39 as extending between lowest clip 422 and clip 410 with the coupling bracket 401 of the panel 5 engaging the upper section 399 of clip 422 and the lower section 397 of clip 410.

As shown, the bracket 401 has near its lower end a downwardly extending leg 400 which is adapted to fit into slot 398 between head 394 and an arm 396 on the upper section 399 of clip 422. The bracket 401 has near its upper end a resilient arm 384 which extends rearwardly below a slot 378 having an upper wall 380 and a lower wall 382. The arm 384 ends at an upwardly extending tip 386. The arm 384 is adapted to snap engage under lower legs 336 on the lower section 397 of clip 410 when the legs 336 are received in slot 378.

Both panels 5 and 5b shown in FIG. 39 have similar coupling brackets 401 and each is adapted to be releasably coupled by engagement with similar slots 398 and legs 336 carried on different of the clips. Panel 5 is shown in FIG. 39 in a position secured to the partition. Panel 5b is shown in an intermediate position ready to either be removed or secured. As seen, the leg 400 on the bracket 401 of panel 5b is received in slot 398, with the leg 400 engaging head 394 of the upper section 391 of clip 390 so that the panel 5b is retained in this intermediate position. From this position the panel 5b can be snapped into engagement by pushing its upper end towards the partition to snap arm 384 under leg 336 of clip 370. Alternatively, from this position the panel 5b can be removed by lifting upwardly. While not shown in FIG. 39, another panel 5a as shown in FIG. 1 may be provided with its bracket 401 to be coupled to the upper section 395 of clip 410 and the lower section 393 of clip 390 in the same manner as panels 5 and 5b.

FIG. 39 illustrates a system for coupling of recessed panel 7 utilizing clip 390 which has a specialized lower section 393 to engage the upper end of panel 7 as follows. The lower section 393 of clip 390 has forwardly and rearwardly pivotable legs 402. Left leg 402a shown in FIG. 39 is pivoted forwardly and right leg 402b is shown as being unpivoted, or vertical. Finger tabs 403 re preferably provided on each leg 402 to allow legs 402 to be gripped for pivoting. When the legs 402 are vertical, a narrow slot 404 is formed between the leg 402 and the side surface 406 of clip 390. This narrow slot 404 is adapted to receive the upper end of recessed cladding panel 7 in a tight friction fit.

The upper end of cladding panel 7 is inserted into slot 404 as follows. One leg 402 of clip 390 is pivoted away from its vertical position and the upper end of cladding panel 7 is pushed upwardly against the side surface 406 of clip 390, preferably until it abuts end wall 408. When the cladding panel 7 is in this position, leg 402 is pivoted back to its vertical position to securely retain the upper end of cladding panel 7 in slot 404.

Reference is now made to FIG. 41, which shows an alternate cladding panel 434 which may act as a replacement for panels such as 5. Panel 434 is a simplified panel comprising a thin sheet of metal which hangs from an uppermost pair of horizontal beams 2a of a partition 436 to the next pair of beams 2b, to provide an economical, simple cladding panel. The upper end 438 of cladding panel 434 is shaped to hook over the upper surface 310 of a beam 2a and also has a horizontal tip 440 extending inwardly between pair of beams 2a. When two such panels 434 are installed on opposite sides of partition 436, as shown in FIG. 41, tips 440 meet between beams 2a to provide a top covering for partition 436.

Cladding panel 434 preferably extends downwardly proximate the plane of the outward faces 308 of the horizontal beams 2a to the lower pair of beams 2b. cladding panel 434 preferably has an inwardly extending lower end 442 which engages the outward face 308 of a beam 2b.

Cladding panel 434 is preferably made from an inexpensive material such as sheet metal, which may preferably be perforated to provide a decorative appearance. Although FIGS. 20 to 34 illustrate end covering systems for partitions having pairs of horizontal beams, it is to be appreciated that similar end covering systems may be provided for partitions not having pairs of horizontal beams as shown in FIGS. 20 to 34. For example, an end covering system may be provided wherein cover plate retainers, similar to those shown in FIGS. 20 to 34, are secured directly to the end faces of the end posts of the partitions, for example, by screws. Such a system would not require end plugs such as end plugs 178 shown in FIGS. 20 to 34 and could be used in a partition not having pairs of horizontal beams. The cover plate retainers directly attached to the end posts would preferably have bulbous plug connectors and resilient spring connectors as shown in FIGS. 20 to 34 and would preferably secure the cover plates in an identical manner as that shown in FIGS. 20 to 34.

Although FIG. 1 illustrates a partition having a simplified decorative end covering, it is to be understood that a decorative end covering such as that shown in FIGS. 25 to 38 could be provided on the partition shown in FIG. 1.

Reference is made again to FIGS. 1 to 12 which refers to the upright partition a shaving a frame comprising vertical post 1 and horizontal beams 2. It is to be appreciated that the vertical posts 1 comprise elongated internal frame members and that the horizontal beams 2 comprise elongated external frame members both forward and rearward of the vertical posts or internal frame members. Similarly, the frame comprises the open grid work of posts 1 and beams 2 and, in effect, comprises a skeleton frame in which the posts 1 comprising internal frame members form a central layer and the beams 2 comprise front and rear layers of spaced-apart external frame members. In this context, the central post space 40 is defined between the vertical posts 1 as internal frame members with the central post space 40 extending between the top and the bottom edges of the frame. The raceways 41 defined to the front and to the rear of the posts 1 define front and rear utility management raceways defined between external beams or frame members either as a front layer in front of the posts 1 or as a rear layer in the rear of posts 1. The central space and the front and rear utility management raceways 41 are in communication such that utilities such as wires and cables can be managed and selectively and conveniently routed through the entire cavity comprising the central post space 40 and the front and rear raceways 41 the entire height of the frame, the entire width of the frame and to adjacent partitions.

The invention discloses and teaches a method of constructing a wall for subdividing space including providing a plurality of individual partitions as shown to comprise the frames of posts 1 and beams 2 with their plurality of covers 5, interconnecting the frames of the partitions for form a continuous wall construction with the internal cavities of each partition in communication with the internal cavity of an adjacent partition, selectively routing utilities such as wires and cables and the like through the internal cavities and adjacent partitions and, subsequently, releasably attaching covers to cover the partitions and contain wires and cables therein.

The invention also provides a novel wall construction comprising a plurality of partitions as illustrated in the drawings joined together to adjacent partitions.

In the preferred embodiments of the invention described above, each cover plate support is comprised of one or more end plugs 178 and a cover plate retainer. The end plug 178 is coupled to the end of the partition such that a vertical slot 198 is formed for engagement by the cover plate retainer. In the preferred embodiments, the end plugs 178 are U-shaped and have two parallel legs 180 adjoining a horizontal bight portion 182. The end plug 178 is secured to the end of the partition by inserting legs 180 into the open ends 172 of beams 2. The coupling of the end lug 178 to the end of the partition by the legs 180 being received in the ends of the beams is but one preferred coupling system. It si to be appreciated that end plugs providing such vertical slots 198 may be coupled to the end of a partition by various other mechanisms alternate to the legs 180. For example, the bight portion could be coupled directly to an end post 1 as by screws, rivets or other fasteners or by adapting the bight portion to engage or snap fit into holes provided in the end face of the posts.

The preferred end plugs provide vertical slots 198 to be engaged by the cover plate retainer. It is to be appreciated that other systems for coupling the cover plate retainer to the end plugs could be provided, including fasteners such as screws, rivets and the like to secure the cover plate retainer to the end plugs secured to the end of the frames.

The preferred embodiments illustrate various cover plate supports comprising one or more plugs 178 and a separate cover plate retainer. It is to be appreciated that a unitary cover plate support could be provided which is merely secured in the same manner to the ends of the partition at desired locations as, for example, by screws or other fasteners.

Although the invention has been described in connection with certain preferred embodiments, it is not intended that it be limited thereto. Rather, it is intended that the invention cover all alternate embodiments as may be within the scope of the following claims.

I claim:

1. A system for providing a decorative end covering on a free-standing portable partition having a frame with opposite faces and a top, a bottom and two ends;

said system comprising:

at least two cover plate supports provided on an end of the partition, each cover plate support extending outwardly from said end of the partition and having upper and lower surfaces provided with upper and lower cover plate connecting means, respectively; and at least one cover plate means providing a decorative appearance to said end of the partition, each cover plate means extending vertically between two cover plate supports, the cover plate means having an upper end secured to the lower cover plate connecting means of a first cover plate support and a lower end secured to the upper cover plate connecting means of a second cover plate support.

2. The system of claim 1 for providing a decorative end covering, wherein each cover plate support comprises:

attachment means secured to and extending outwardly from said end of the partition, said attachment means being shaped to provide a vertical slot proximate the end of the partition; and cover plate retainer means comprising horizontal plate means and leg means extending vertically from the plate means, the leg means adapted to be securely received in said vertical slot to secure the cover plate retainer means to the partition.

3. The system of claim 2 for providing a decorative end covering, wherein;
- at least one upper cover plate connecting means comprises a smoothly rounded bulbous plug connector adapted to retain a cover plate means extending vertically upwardly therefrom;
- at least one lower cover plate connecting means comprises snap connecting means adapted to retain a cover plate means extending vertically downward therefrom; and
- each cover plate means has inwardly extending wrap around corners proximate its upper and lower ends, said wrap around corners adapted to slidingly engage the bulbous plug connector of the upper cover plate connecting means and to snap into secured engagement with the snap connecting means of the lower cover plate connecting means.

4. A system for providing a decorative covering according to claim 3, wherein one of the upper and lower surfaces of each said cover plate support is provided with said bulbous plug connector, the other of said upper and lower surfaces being provided with said snap connecting means.

5. The system of claim 2 for providing a decorative end covering, wherein:
- each of the lower cover plate connecting means and one of the upper cover plate connecting means comprise snap connecting means to retain a cover plate means extending vertically therefrom; and
- each cover plate means has inwardly extending wrap around corners proximate its upper and lower ends, said wrap around corners adapted to snap into secured engagement with the snap connecting means.

6. A system for providing a decorative end covering according to claim 1, wherein the at least two cover plate supports comprise identical, modular units.

7. A system for providing a decorative end covering according to claim 6, wherein:
- a first of the upper and lower surfaces providing a decorative surface;
- the one of the upper and lower cover plate connecting means provided on a first of the upper and lower surfaces comprises a smoothly rounded bulbous plug connector adapted to retain a cover plate extending vertically away therefrom, the other of the upper and lower cover plate connecting means comprises snap connecting means to retain a cover plate extending vertically therefrom;
- each cover plate means has inwardly extending wrap around corners proximate both of its ends, the wrap around corners adapted to slidably engage the bulbous plug connector at one end and to snap into engagement with the snap connecting means at the other end.

8. The system of claim 1 for providing a decorative end covering, wherein said partition has a rectangular frame comprising two vertical end posts and a plurality of horizontal beams arranged in pairs, each beam extending between and connected to the two end posts and having hollow, open ends proximate the end posts, the beams of each pair being connected to opposite sides of the end posts, the partition having at least two pairs of beams, one pair proximate its bottom and one pair proximate its top; and
- wherein each cover plate support has end plug means inserted into the open ends of one pair of beams.

9. The system of claim 8, for providing a decorative end covering, wherein each cover plate support comprises:
- end plug means, each comprising a U-shaped end plug provided in the ends of a pair of beams, said end plugs having two parallel legs and a central bight, each leg received in a friction fit in the open end of one beam of a pair of beams, the bight extending horizontally between the pair of beams and forwardly of an end post, a vertical slot being formed between the bight and the end post; and
- cover plate retainer means comprising horizontal plate means and leg means extending vertically from the plate means, the leg means adapted to be securely received in the vertical slot between the end post and the bight of the end plug means to secure the cover plate retainer means to the partition.

10. The system of claim 9 for providing a decorative end covering, wherein:
- at least one upper cover plate connecting means comprises a smoothly rounded bulbous plug connector adapted to retain a cover plate means extending vertically upwardly therefrom;
- at least one lower cover plate connecting means comprises snap connecting means adapted to retain a cover plate means extending vertically downward therefrom; and
- each cover plate means has inwardly extending wrap around corners proximate its upper and lower ends, said wrap around corners adapted to slidingly engage the bulbous plug connector of the upper cover plate connecting means and to snap into secured engagement with the snap connecting means of the lower cover plate connecting means.

11. A system for providing a decorative covering according to claim 10, wherein one of the upper and lower surfaces of each said cover plate support is provided with said bulbous plug connector, the other of said upper and lower surfaces being provided with said snap connecting means.

12. The system of claim 9 for providing a decorative end covering, wherein:
- each of the lower cover plate connecting means and one of the upper cover plate connecting means comprise snap connecting means to retain a cover plate means extending vertically therefrom; and
- each cover plate means has inwardly extending wrap around corners proximate its upper and lower ends, said wrap around corners adapted to snap into secured engagement with the snap connecting means of the lower cover plate connecting means.

13. The system of claim 8 for providing a decorative end covering, wherein:
- the partition has a horizontal upper surface provided with a decorative covering; and
- the cover plate support connected to the pair of beams proximate the top of the partition has an upper surface which provides a smooth transition between the decorative covering on the end of the partition and the decorative covering on the upper surface of the partition.

14. A system for providing a decorative end covering on converging ends of two free-standing portable partitions each having a frame with opposite faces and a top, bottom and two ends;
- said partitions having ends converging at a preselected angle of 90°;
- said system comprising:
- at least two triangular cover plate supports, each cover plate support extending horizontally between, and secured to, the converging ends of each of said partitions, each cover plate support having upper and lower surfaces provided with upper and lower cover plate connecting means, respectively; and at least one cover plate means providing a decorative appearance to the converging ends of the two partitions, each cover plate means extending vertically between two triangular cover plate supports, the cover plate means having an upper end secured to the lower cover plate connecting means of a first triangular cover plate support and a lower end secured to the upper cover plate connecting means of a second triangular cover plate support.

15. The system of claim 14 for providing a decorative covering, wherein each triangular cover plate support comprises:

two attachment means, each attachment means secured to and extending outwardly from an end of one of said partitions, said attachment means being shaped to provide a vertical slot proximate said end of one of said partitions, said attachment means being in vertical alignment with one another; and cover plate retainer means comprising triangular horizontal plate means and leg means extending vertically in the same direction from first and second sides of the plate means, said first and second sides converging at an angle of about 90 degrees, the leg means extending from the first side of the plate means and adapted to be securely received in a vertical slot of one of said attachment means, and the leg means extending from the second side of the plate means adapted to be securely received in the vertical slot of another of said attachment means to secure the cover plate retainer means to the two partitions.

16. The system of claim 15 for providing a decorative covering, wherein:

the upper cover plate connecting means of at least one triangular cover plate support comprises bulbous plug connector means on the upper surface thereof adapted to retain a cover plate means extending vertically upwardly therefrom;

at least one lower cover plate connecting means comprises snap connecting means adapted to retain a cover plate means extending vertically downward therefrom; and each cover plate means has inwardly extending wrap around corners proximate its upper and lower ends, said wrap around corners adapted to slidingly engage the bulbous plug connector means and to snap into secured engagement with the snap connecting means.

17. A system for providing a decorative covering according to claim 16, wherein one of the upper and lower surfaces of each said cover plate support is provided with said bulbous plug connector means, the other of said upper and lower surfaces being provided with said snap connecting means.

18. The system of claim 15 for providing a decorative covering, wherein:

each of the lower cover plate connecting means and one of the upper cover plate connecting means comprise snap connecting means to retain a cover plate means extending vertically therefrom; and each cover plate means has inwardly extending wrap around corners proximate its upper and lower ends, said wrap around corners adapted to snap into secured engagement with the snap connecting means.

19. The system of claim 14 for providing a decorative covering, wherein said partitions each have a rectangular frame comprising two vertical end posts and a plurality of horizontal beams arranged in pairs, each beam extending between and connected to the two end posts and having hollow, open ends proximate the end posts, the beams of each pair being connected to opposite sides of the end posts, each partition having at least two pairs of beams, one pair proximate its bottom and one pair proximate its top;

a first partition of the two partitions having two pairs of beams in vertical alignment with respective pairs of beams of a second partition; and wherein each triangular cover plate support has first end plug means inserted into the open ends of a pair of beams of the first partition and extending horizontally outwardly therefrom, and having second end plug means inserted into the open ends of a vertically aligned pair of beams of the second partition and extending horizontally outwardly therefrom.

20. The system of claim 19 for providing a decorative covering, wherein each triangular cover plate support comprises:

two end plug means, each comprising a U-shaped end plug provided in the ends of a vertically aligned pair of beams, said end plugs having two parallel legs and a central bight, each leg received in a friction fit in the open end of one beam of a pair of beams, the bight extending horizontally between the pair of beams and forwardly of an end post, a vertical slot being formed between the bight and the end post; and cover plate retainer means comprising triangular horizontal plate means and leg means extending vertically in the same direction from first and second sides of the plate means, said first and second sides converging at an angle of about 90°, the leg means extending from the first side of the plate means and adapted to be securely received in the vertical slot proximate the end post of the first partition and the leg means extending from the second side of the plate means adapted to be securely received in the vertical slot proximate the end post of the second partition to secure the cover plate retainer means to the two partitions.

21. The system of claim 20 for providing a decorative covering, wherein:

the upper cover plate connecting means of at least one triangular cover plate support comprises bulbous plug connector means on the upper surface thereof adapted to retain a cover plate means extending vertically upwardly therefrom;

at least one lower cover plate connecting means comprises snap connecting means adapted to retain a cover plate means extending vertically downward therefrom; and each cover plate means has inwardly extending wrap around corners proximate its upper and lower ends, said wrap around corners adapted to slidingly engage the bulbous plug connector means and to snap into secured engagement with the snap connecting means.

22. The system of claim 20 for providing a decorative covering, wherein:

each of the lower cover plate connecting means and one of the upper cover plate connecting means comprise snap connecting means to retain a cover plate means extending vertically therefrom; and each cover plate means has inwardly extending wrap around corners proximate its upper and lower ends, said wrap around corners adapted to snap into secured engagement with the snap connecting means.

23. A system for providing a decorative end covering according to claim 14, wherein the at least two triangular cover plate supports comprise identical, modular units.

24. A system for providing a decorative end covering according to claim 23, wherein:
- a first of the upper and lower surfaces providing a decorative surface;
- the one of the upper and lower cover plate connecting means provided on a first of the upper and lower surfaces comprises smoothly rounded bulbous plug connector means adapted to retain a cover plate extending vertically away therefrom, the other of the upper and lower cover plate connecting means comprises snap connecting means to retain a cover plate extending vertically therefrom;
- each cover plate means has inwardly extending wrap around corners proximate both of its ends, the wrap around corners adapted to slidably engage the bulbous plug connector means at one end and to snap into engagement with the snap connecting means at the other end.

25. A system for providing a decorative end covering on converging ends of three free-standing portable partitions each having a frame with opposite faces and a top, bottom and two ends;
- each partition having one end converging at a preselected angle of 90 degrees with an end of an adjacent partition;
- said system comprising:
  - at least two rectangular cover plate supports, each extending horizontally between, and secured to, said converging end of each partition, each cover plate support having upper and lower surfaces provided with upper and lower cover plate connecting means, respectively; and
  - at least one cover plate means providing a decorative appearance to the converging ends of the three partitions, each cover plate means extending vertically between two rectangular cover plate supports, the cover plate means having an upper end secured to the lower cover plate connecting means of a first rectangular cover plate support and a lower end secured to the upper cover plate connecting means of a second rectangular cover plate support.

26. The system of claim 25 for providing a decorative covering, wherein each rectangular cover plate support comprises:
- three attachment means, each attachment means secured to and extending outwardly from an end of one of said partitions, said attachment means being shaped to provide a vertical slot proximate said end of one of said partitions, said attachment means being in vertical alignment with each other; and
- cover plate retainer means comprising rectangular horizontal plate means and leg means extending vertically in the same direction from three sides of the plate means, the leg means each being adapted to be securely received in said vertical slot proximate said end of each partition.

27. The system of claim 26 for providing a decorative covering, wherein:
- the upper cover plate connecting means of at least one rectangular cover plate support comprises bulbous plug connector means on the upper surface thereof adapted to retain a cover plate means extending vertically upwardly therefrom; and
- at least one lower cover plate connecting means comprises snap connecting means adapted to retain a cover plate means extending vertically downwardly therefrom; and
- each cover plate means has inwardly extending wrap around corners proximate its upper and lower ends, said wrap around corners adapted to slidingly engage the bulbous plug connector means and to snap into secured engagement with the snap connecting means.

28. A system for providing a decorative covering according to claim 27, wherein one of the upper and lower surfaces of each said cover plate support is provided with said bulbous plug connector means, the other of said upper and lower surfaces being provided with said snap connecting means.

29. The system of claim 26 for providing a decorative covering, wherein:
- each of the lower cover plate connecting means and one of the upper cover plate connecting means comprise snap connecting means to retain a cover plate means extending vertically therefrom; and
- each cover plate means has inwardly extending wrap around corners proximate its upper and lower ends, said wrap around corners adapted to snap into secured engagement with the snap connecting means.

30. The system of claim 25 or providing a decorative covering, wherein each of said partitions has a rectangular frame comprising two vertical end posts and a plurality of horizontal beams arranged in pairs, each beam extending between and connected to the two end posts and having hollow, open ends proximate the end posts, the beams of each pair being connected to opposite sides of the end post, each partition having at least two pairs of beams, one pair proximate its bottom and one pair proximate its top;
- each partition of the three partitions having two pairs of beams in vertical alignment with respective pairs of beams of each other partition of the three partitions; and
- wherein each cover plate support has end plug means inserted into the open ends of a vertically aligned pair of beams of each of the three partitions.

31. The system of claim 30 for providing a decorative covering, wherein each rectangular cover plate support comprises:
- three end plug means, each comprising a U-shaped end plug provided in the ends of a vertically aligned pair of beams, said end plugs having two parallel legs and a central bight, each leg received in a friction fit in the open end of one beam of a pair of beams, the bight extending horizontally between the pair of beams and forwardly of an end post, a vertical slot being formed between the bight and the end post; and
- cover plate retainer means comprising rectangular horizontal plate means and leg means extending vertically in the same direction from three sides of the plate means, the leg means each being adapted to be securely received in the vertical slot between the bight of an end plug and an end post of one of the three partitions.

32. The system of claim 30 for providing a decorative covering, wherein:
- the upper cover plate connecting means of at least one rectangular cover plate support comprises bulbous plug connector means on the upper surface thereof adapted to retain a cover plate means extending vertically upwardly therefrom; and
- at least one lower cover plate connecting means comprises snap connecting means adapted to retain a cover plate means extending vertically downwardly therefrom; and each cover plate means has inwardly extending wrap around corners proximate its upper and lower ends, said wrap around corners adapted to slidingly engage the bulbous plug connector means and to snap into secured engagement with the snap connecting means.

33. A system for providing a decorative covering according to claim 32, wherein one of the upper and lower surfaces of each said cover plate support is provided with said bulbous plug connector means, the other of said upper and lower surfaces being provided with said snap connecting means.

34. The system of claim 30 for providing a decorative covering, wherein:

each of the lower cover plate connecting means and one of the upper cover plate connecting means comprise snap connecting means to retain a cover plate means extending vertically therefrom; and each cover plate means has inwardly extending wrap around corners proximate its upper and lower ends, said wrap around corners adapted to snap into secured engagement with the snap connecting means.

35. A system for providing a decorative end covering according to claim 25, wherein the at least two rectangular cover plate supports comprise identical, modular units.

36. A system for providing a decorative end covering according to claim 35, wherein:

a first of the upper and lower surfaces providing a decorative surface;

the one of the upper and lower cover plate connecting means provided on said first of the upper and lower surfaces comprises smoothly rounded bulbous plug connector means adapted to retain a cover plate extending vertically therefrom;

the other of the upper and lower cover plate connecting means comprises snap connecting means to retain a cover plate extending vertically therefrom;

each cover plate means has inwardly extending wrap around corners proximate both its ends, the wrap around corners adapted to slidably engage the bulbous plug connector means at one end and to snap into engagement with the snap connecting means at the other end.

37. A system for providing a decorative covering over a gap between converging ends of four free-standing portable partitions each having a frame with opposite faces and a top, a bottom and two ends;

each partition having one end converging with ends of two adjacent partitions at a preselected angle of 90°;

said system comprising:

a rectangular horizontal cover plate extending between, and secured to, said converging end of each partition, the cover plate having an upper decorative surface which is provided with connecting means adapted to retain at least one vertical cover plate means extending vertically upwardly therefrom, said vertical cover plate means providing a decorative vertical covering over the ends of any of the four partitions extending upwardly above the rectangular horizontal cover plate.

38. The system of claim 37 for providing a decorative covering, wherein the rectangular horizontal cover plate comprises:

four attachment means, each attachment means secured to and extending outwardly from the end of one of said partitions, said attachment means being shaped to provide a vertical slot proximate the end of said partition, said attachment means being in vertical alignment with each other; and rectangular horizontal plate means having an upper surface comprising the upper decorative surface of the rectangular horizontal cover plate, and a lower surface provided with vertically downwardly directed leg means extending from each side thereof, the leg means each being adapted to be securely received in one of said vertical slots proximate an end of one of said partitions.

39. The system of claim 37 for providing a decorative covering, wherein the upper surface of the rectangular horizontal cover plate is provided with connecting means adapted to retain at least one vertical cover plate means extending vertically upwardly therefrom, said vertical cover plate means providing a decorative vertical covering over the ends of any of the four partitions extending upwardly above the rectangular horizontal cover plate.

40. The system of claim 37 for providing a decorative covering, wherein said partitions each have a rectangular frame comprising two vertical end posts and a plurality of horizontal beams arranged in pairs, each beam extending between and connected to the two end posts and having hollow, open ends proximate the end posts, each partition having at least two pairs of beams, one pair proximate its bottom and one pair proximate its top;

a first partition having one pair of beams in vertical alignment with a pair of beams of each other partition, the vertically aligned pair of beams of the first partition being proximate the top of the first partition; and wherein said rectangular horizontal cover plate has end plug means inserted into the open ends of a vertically aligned pair of beams of each partition.

41. The system of claim 40 for providing a decorative covering, wherein the rectangular horizontal cover plate comprises:

four end plug means, each comprising a U-shaped end plug provided in the ends of a vertically aligned pair of beams, said end plugs having two parallel legs and a central bight, each leg received in friction fit in the open end of one beam of a pair of beams, the bight extending horizontally between the pair of beams and forwardly of an end post, a vertical slot being formed between the bight and the end post; and rectangular horizontal plate means having an upper surface comprising the upper decorative surface of the rectangular horizontal cover plate, and a lower surface provided with vertical downwardly directed leg means extending from each side thereof, the leg means each being adapted to be securely received in the vertical slot between the bight of an end plug and an end post of one of the four partitions.

42. In a modular partition system comprising a plurality of rectangular wall partitions each having a bottom, a top and two end surfaces, a plurality of said partitions converging at a junction with vertically extending gaps between end surfaces of converging partitions, each converging partition converging at a preselected angle with either one or two other converging partitions, the top and bottom of each converging partition defining a horizontal plane;

a system for providing a decorative covering at said junction, comprising:

cover plate supports located in said horizontal planes at said junction, each cover plate support comprising horizontal plate means releasably connected to an end surface of at least one partition and having upper and lower surfaces, one of said surfaces having a decorative appearance and at least one of said surfaces adapted to releasably couple to one or more vertical cover plates, said cover plates extending vertically between adjacent cover plate supports and being selected from end face cover plates adapted to provide a decorative covering over an end surface of a partition, and vertical gap cover plates adapted to provide a decorative covering over said vertical gap between end surfaces of two converging partitions, said cover plate supports and cover plates together providing a decorative covering over the junction formed by the converging partitions, wherein:

(a) in a horizontal plane which is defined by the top or bottom of only one converging partition said partition not converging with any other partitions in said plane, a cover plate support is provided connected to and extending horizontally outwardly from the end surface of said partition, said cover plate support having one facet substantially abutting the end surface of a partition, and having upper and lower surfaces both adapted to releasably couple to a vertical end face cover plate, one of said upper and lower surfaces having a decorative appearance; and (b) in a horizontal plane in which only two partitions converge, said two partitions converging at the preselected angle, one cover plate support is provided comprising horizontal plate means having two facets, each said facet substantially abutting an end surface of one of said two partitions and at least one outward side which horizontally spans the vertical gap between said two partitions, the upper and lower surfaces of said cover plate support being adapted to releasably couple to a vertical gap cover plate adapted to provide a decorative covering over said vertical gap, one of said upper and lower surfaces further having a decorative appearance and being adapted to releasably couple to one or more of said end face cover plates.

43. A system for providing a decorative covering according to claim 42 wherein two partitions converge in said horizontal plane of (b) at said preselected angle, and said cover plate support has one outward side extending across said vertically extending gap between the end surfaces of said two partitions.

44. A system for providing a decorative covering according to claim 43, wherein said two partitions converge in said horizontal plane of (b) in a L-shaped configuration with said preselected angle being about 90 degrees, and said cover plate support has a generally triangular shape with said facets being oriented at about 90 degrees to one another;

both of the upper and lower surfaces of said cover plate support having coupling means adapted to releasably couple a vertical gap cover plate along the outward side of the cover plate support, each said vertical gap cover plate adapted to extend vertically from one of said surfaces and provide a decorative covering over the vertical gap between said two partitions;

one of the upper and lower surfaces further having a decorative appearance and having coupling means adapted to releasably couple an end face cover plate along each of the facets of the cover plate support, each said end face cover plate adapted to extend vertically from said one surface and provide a decorative covering over the end surface of one of said two partitions.

45. A system for providing a decorative covering according to claim 42, wherein two partitions converge in said horizontal plane of (b) with said preselected angle being about 180 degrees, and said cover plate support comprises a rectangular horizontal plate means having two opposing facets, each facet substantially abutting an end surface of one of said two partitions, said cover plate support further having two opposing outward sides extending across a vertically extending gap between the end surfaces of the two converging partitions, both of the upper and lower surfaces of said cover plate support having coupling means adapted to releasably couple a vertical gap cover plate along each of the outward sides of the cover plate support, each said vertical gap cover plate adapted to extend vertically from one of said surfaces and provide a decorative covering over the vertical gap between said two partitions;

one of the upper and lower surfaces further having a decorative appearance and having coupling means adapted to releasably couple an end face cover plate along each of the facets of the cover plate support, each said end face cover plate adapted to extend vertically from said surface and provide a decorative covering over the end surface of one of said two partitions.

46. A system for providing a decorative covering according to claim 45, further comprising:

(d) a horizontal plane in which three or more partitions converge such that each converging partition converges with two other partitions at the preselected angle, wherein the cover plate support in said horizontal plane comprises horizontal plate means connected to and extending between the end surfaces of the partitions converging in said horizontal plane, said cover plate support having a plurality of facets, each facet abutting the end surface of a partition, one of said upper and lower surfaces of said cover plate retainer having a decorative appearance and adapted to releasably couple to one or more vertical cover plates selected from vertical gap cover plates and end face cover plates.

47. A system for providing a decorative covering according to claim 46, wherein four partitions converge in said horizontal plane of (d), each of said four partitions converging with two other of said partitions such that the preselected angle is 90°, said cover plate support comprising a rectangular horizontal plate means having four facets, each facet substantially abutting an end surface of one of said four partitions, one of the upper and lower surfaces of said cover plate support having a decorative appearance and having coupling means adapted to releasably couple said cover plate support to:

(a) a vertical gap cover plate adapted to extend vertically from said one surface and provide a decorative covering over a vertical gap between two opposing end surfaces;

(b) a vertical gap cover plate adapted to extend vertically from said one surface and provide a decorative covering over a vertical gap between two end surfaces oriented at 90° to one another; and (c) end face cover plates adapted to extend vertically from said one surface and provide decorative coverings over the end surfaces of said four converging partitions.

48. A system for providing a decorative covering according to claim 42, further comprising:

(c) a horizontal plane in which only three partitions converge such that a first partition and a second partition each converge at the preselected angle only with a third partition, wherein one cover plate support is provided comprising horizontal plate means having three facets, each facet substantially abutting an end surface of one of said three partitions, and an outward side which horizontally spans a first vertical gap between said first and second partitions, the upper and lower surfaces of said cover plate support being adapted to releasably couple to a vertical gap cover plate adapted to provide a decorative covering over said first vertical gap, one of the upper and lower surfaces further having a decorative appearance and being adapted to releasably couple to one or more vertical cover plates selected from end face cover plates and vertical gap cover plates adapted to cover a vertical gap between the end surfaces of any two partitions.

49. A system for providing a decorative covering according to claim 48 wherein three partitions converge in said horizontal plane of (c), with first and second partitions each converging at said preselected angle with a third partition, the first and second partitions converging with each other at an angle other than said preselected angle, a first vertical gap being formed between the end surfaces of said first and second partitions, said cover plate support comprises a horizontal plate means having three facets, each facet substantially abutting an end surface of one of said three partitions, said cover plate support further having an outward side extending across the first vertical gap between the end surfaces of said first and second partitions, one of the upper and lower surfaces of said cover plate support having coupling means adapted to releasably couple said cover plate support to a vertical gap cover plate adapted to extend vertically from said one surface and provide a decorative covering over the first vertical gap between said first and second partitions;

the other of the upper and lower surfaces of said cover plate support having a decorative appearance and having coupling means adapted to:
(a) releasably couple said cover plate support to a vertical gap cover plate adapted to extend vertically from said other surface and provide a decorative covering over the first vertical gap between said first and second partitions;
(b) releasably couple said cover plate support to a vertical gap cover plate adapted to extend vertically from said other surface and provide a decorative covering over a second vertical gap between said third partition and said first partition; and
(c) releasably couple said cover plate support to three end face cover plates providing decorative coverings over each of the three converging partitions.

50. A system for providing a decorative covering according to claim 49, wherein the preselected angle is 90 degrees and the angle between the first and second partitions is 180 degrees, such that said three partitions converge in a T-shaped configuration and the cover plate support comprises a rectangular horizontal plate means;

both of the upper and lower surfaces of said cover plate support having coupling means adapted to releasably couple a vertical gap cover plate along the outward side of the cover plate support;

one of the upper and lower surfaces further having a decorative appearance and having coupling means adapted to releasably couple an end face cover plate along each of the facets of the cover plate support.

* * * * *